(12) United States Patent
Koyama

(10) Patent No.: US 8,132,026 B2
(45) Date of Patent: Mar. 6, 2012

(54) POWER STORAGE DEVICE AND MOBILE ELECTRONIC DEVICE HAVING THE SAME

(75) Inventor: Jun Koyama, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1167 days.

(21) Appl. No.: 11/802,826

(22) Filed: May 25, 2007

(65) Prior Publication Data

US 2007/0278998 A1 Dec. 6, 2007

(30) Foreign Application Priority Data

Jun. 2, 2006 (JP) ................................ 2006-154422

(51) Int. Cl.
*G05F 1/00* (2006.01)
(52) U.S. Cl. ......... 713/300; 320/137; 320/138; 320/141
(58) Field of Classification Search .................. 713/300; 320/137, 138, 141
See application file for complete search history.

(56) References Cited

U.S. PATENT DOCUMENTS 3,029,310 A * 4/1962 Heiser ........................... 370/430

(Continued)

FOREIGN PATENT DOCUMENTS

GB 2292866 3/1996

(Continued)

OTHER PUBLICATIONS

International Search Report (Application No. PCT/JP2007/061146) Dated Aug. 21, 2007.

(Continued)

*Primary Examiner* — M Elamin
(74) *Attorney, Agent, or Firm* — Eric J. Robinson; Robinson Intellectual Property Law Office, P.C.

(57) ABSTRACT

To provide a power storage device for regularly supplying power to a mobile electronic device, in which charging of a battery by a power feeder can be simplified and even when power stored in the battery is not enough, power can be regularly supplied to the mobile electronic device. The mobile electronic device includes an antenna circuit which receives power supply via radio signals, a battery which stores power, and a power supply control circuit which includes a switch circuit for intermittently supplying power to a load. Power supply to the load is intermittently controlled by controlling the switch circuit, which is provided in the power supply control circuit for controlling the supply of power stored in the battery, using a signal from a low-frequency-signal generating circuit.

34 Claims, 34 Drawing Sheets

U.S. PATENT DOCUMENTS

| | | | |
|---|---|---|---|
| 5,300,875 A | 4/1994 | Tuttle | |
| 5,524,044 A | 6/1996 | Takeda | |
| 6,026,921 A | 2/2000 | Aoyama et al. | |
| 7,284,703 B2 | 10/2007 | Powell et al. | |
| 7,571,007 B2 * | 8/2009 | Erickson et al. | 607/61 |
| 2002/0157881 A1 | 10/2002 | Bakholdin et al. | |
| 2005/0162131 A1 | 7/2005 | Sennami et al. | |
| 2005/0254183 A1 | 11/2005 | Ishida et al. | |
| 2006/0255767 A1 * | 11/2006 | Wong et al. | 320/130 |
| 2006/0259098 A1 * | 11/2006 | Erickson | 607/61 |
| 2006/0284593 A1 * | 12/2006 | Nagy et al. | 320/109 |
| 2007/0216348 A1 * | 9/2007 | Shionoiri et al. | 320/107 |
| 2007/0229228 A1 | 10/2007 | Yamazaki et al. | |
| 2007/0229279 A1 | 10/2007 | Yamazaki et al. | |
| 2007/0229281 A1 * | 10/2007 | Shionoiri et al. | 340/572.7 |
| 2007/0281756 A1 * | 12/2007 | Hyatt et al. | 455/573 |
| 2007/0285246 A1 * | 12/2007 | Koyama | 340/572.1 |
| 2008/0278338 A1 * | 11/2008 | Krell | 340/573.6 |
| 2008/0297117 A1 * | 12/2008 | Wong et al. | 320/138 |

FOREIGN PATENT DOCUMENTS

| | | | |
|---|---|---|---|
| JP | 08-069513 A | | 3/1996 |
| JP | 10-307898 A | | 11/1998 |
| JP | 11-338984 A | | 12/1999 |
| JP | 11-345292 A | | 12/1999 |
| JP | 2000-166129 A | | 6/2000 |
| JP | 2001067446 | * | 3/2001 |
| JP | 2002-057617 A | | 2/2002 |
| JP | 2003-006592 A | | 1/2003 |
| JP | 2003-070187 A | | 3/2003 |
| JP | 2003-218624 A | | 7/2003 |
| JP | 2003-299255 A | | 10/2003 |
| JP | 2004-343410 A | | 12/2004 |
| JP | 2005-150022 | | 6/2005 |
| JP | 2005-210843 A | | 8/2005 |
| JP | 2005-293485 A | | 10/2005 |
| JP | 2005-316724 A | | 11/2005 |
| JP | 2006-004015 A | | 1/2006 |
| JP | 2006-503376 | | 1/2006 |

OTHER PUBLICATIONS

Written Opinion (Application No. PCT/JP2007/061146) Dated Aug. 21, 2007.

* cited by examiner

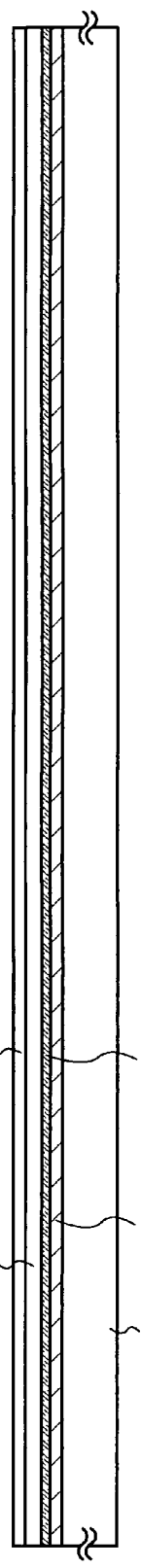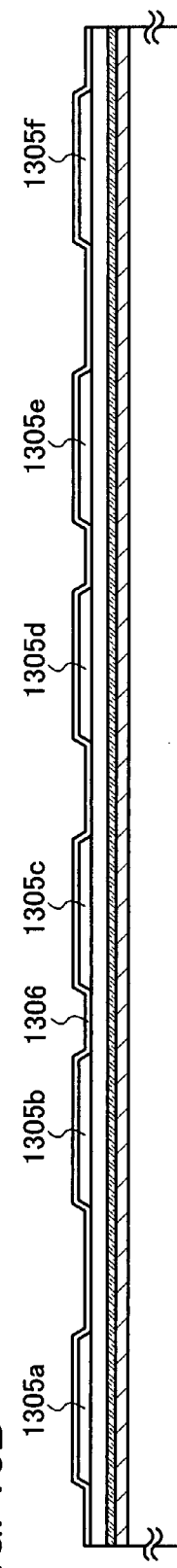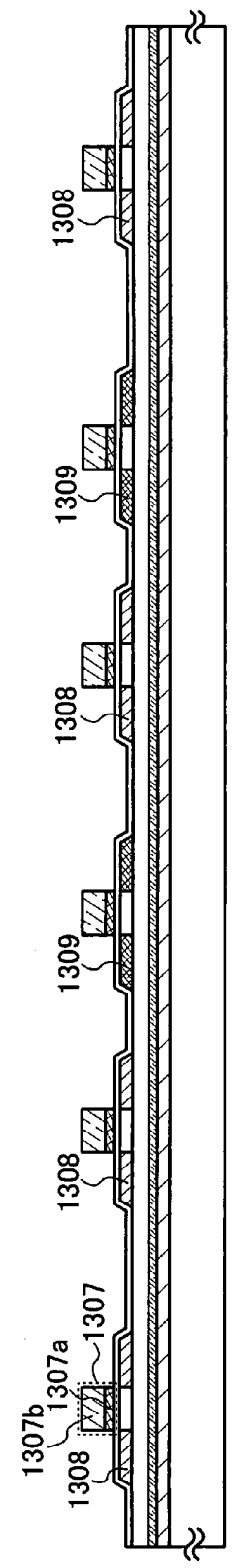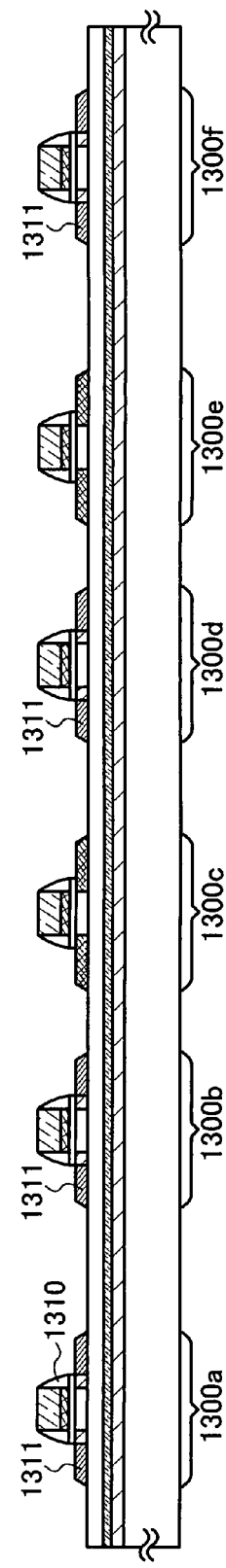

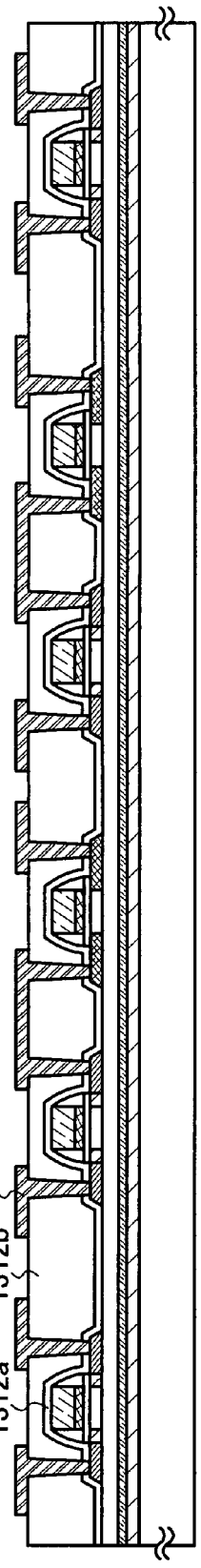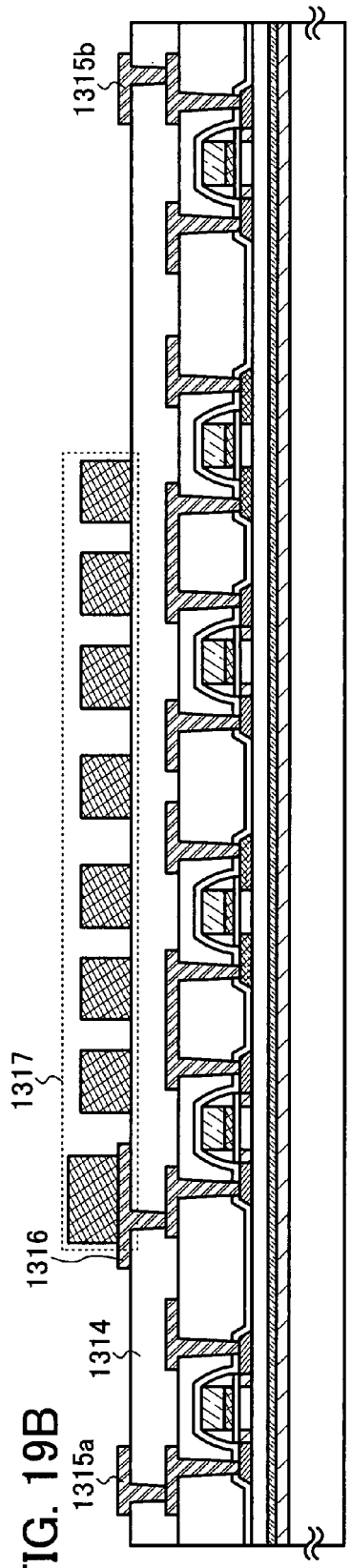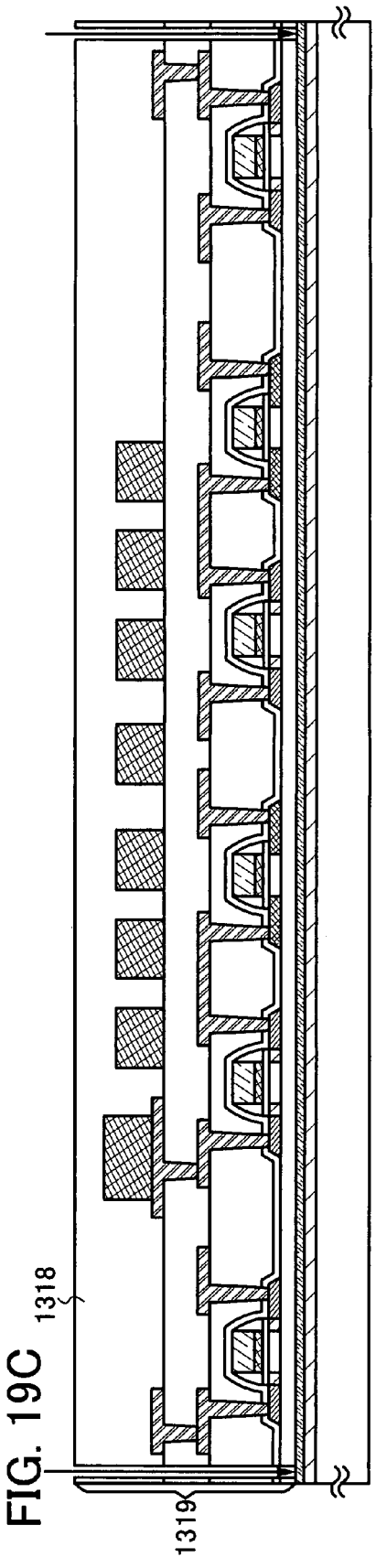

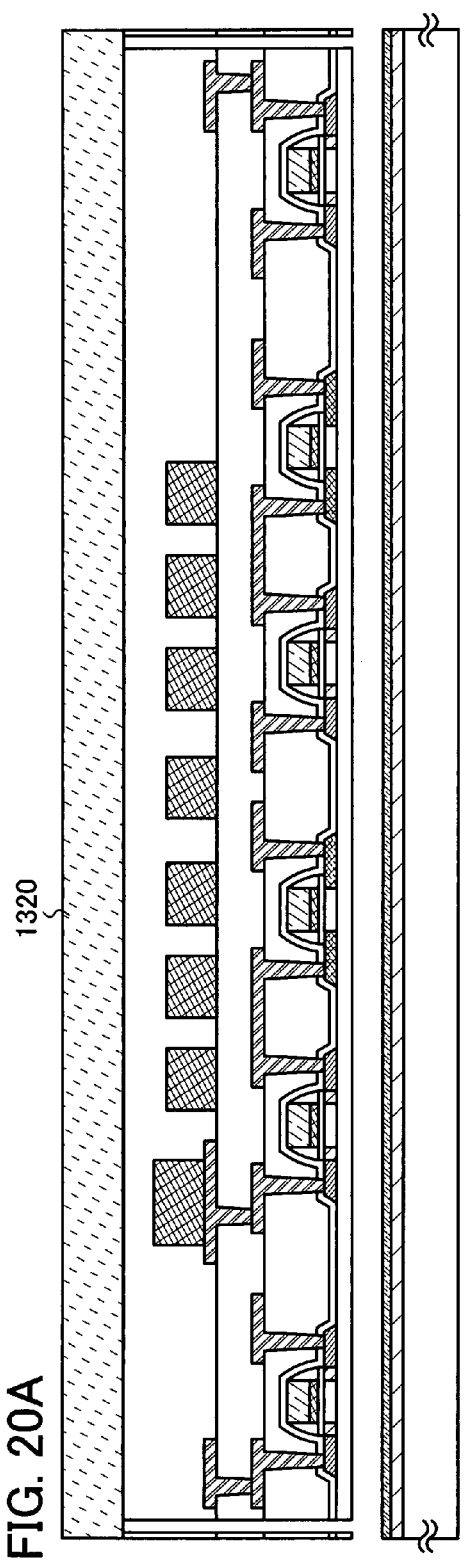
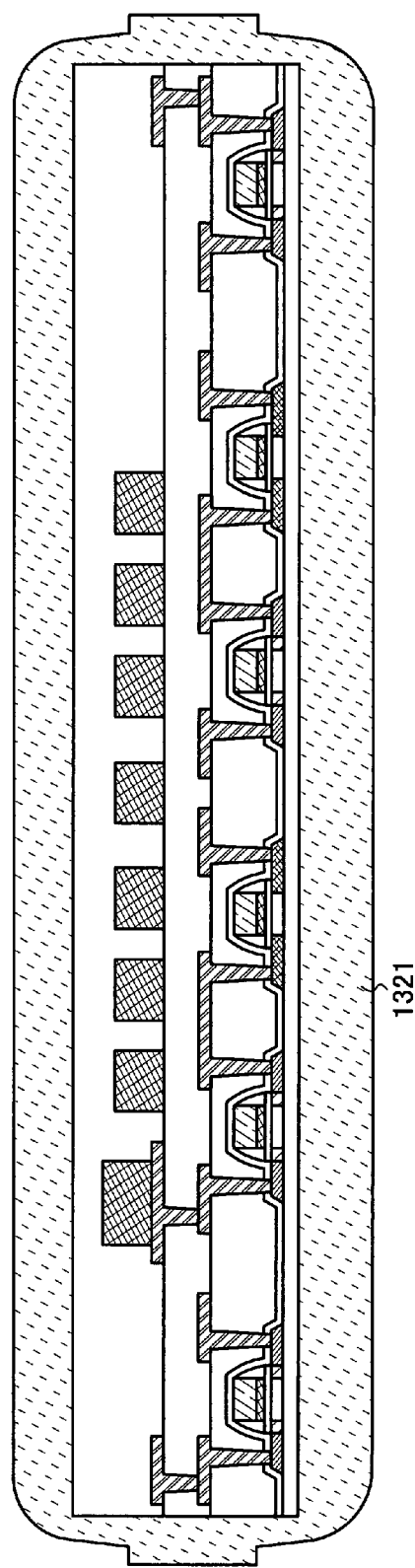
FIG. 20A
FIG. 20B

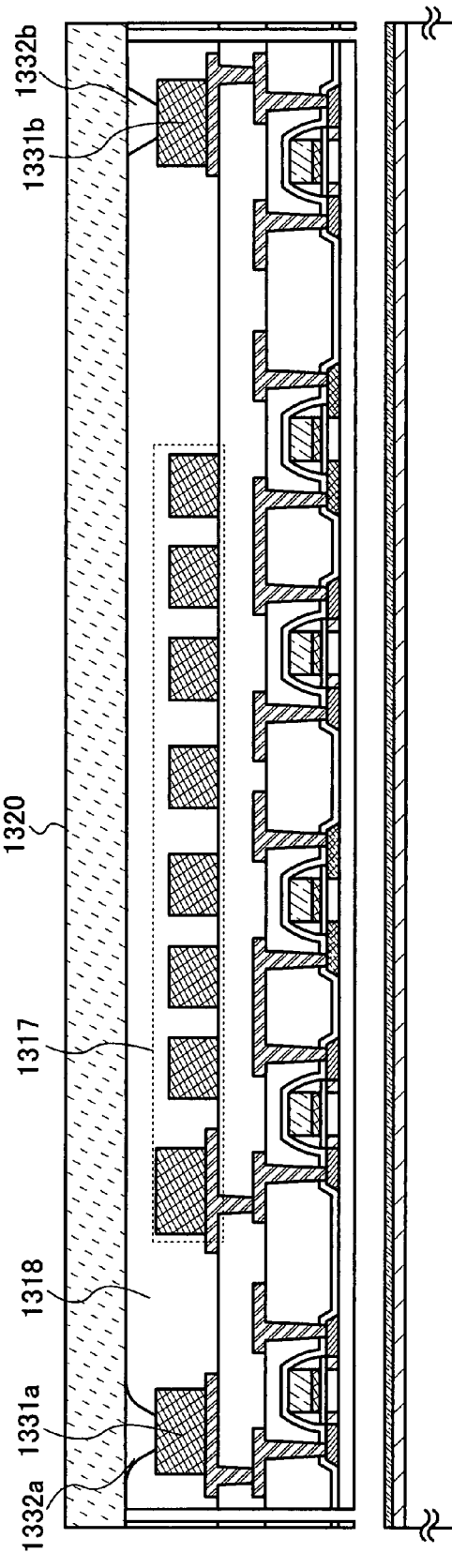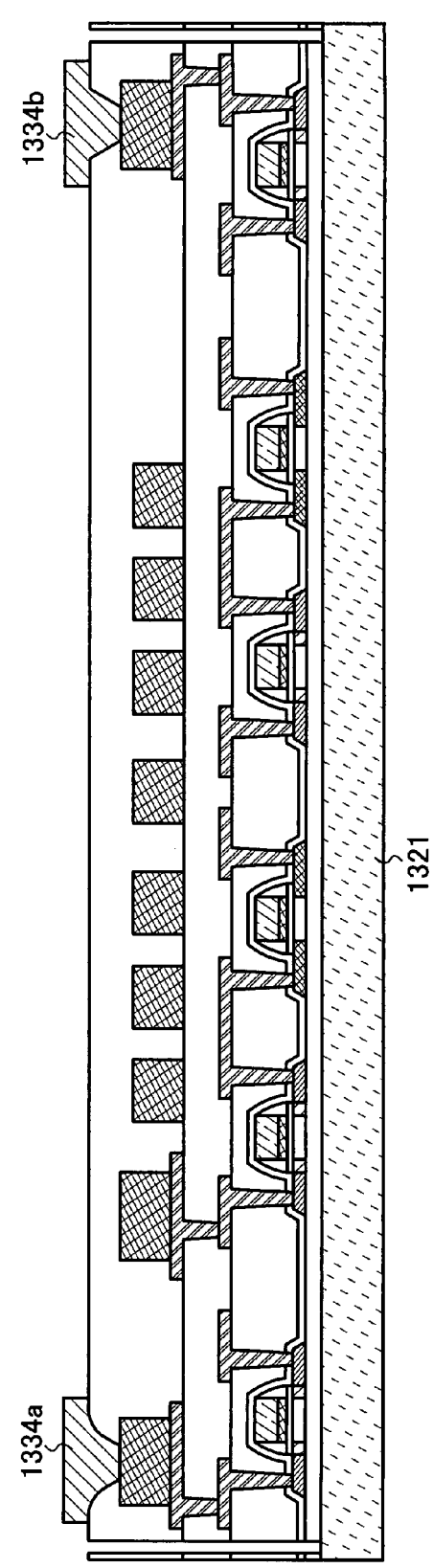

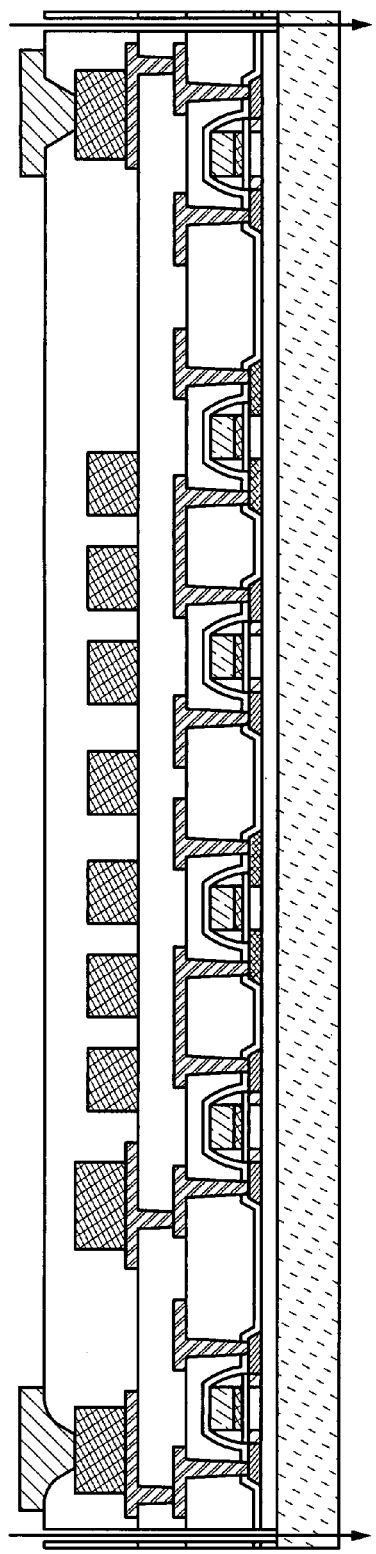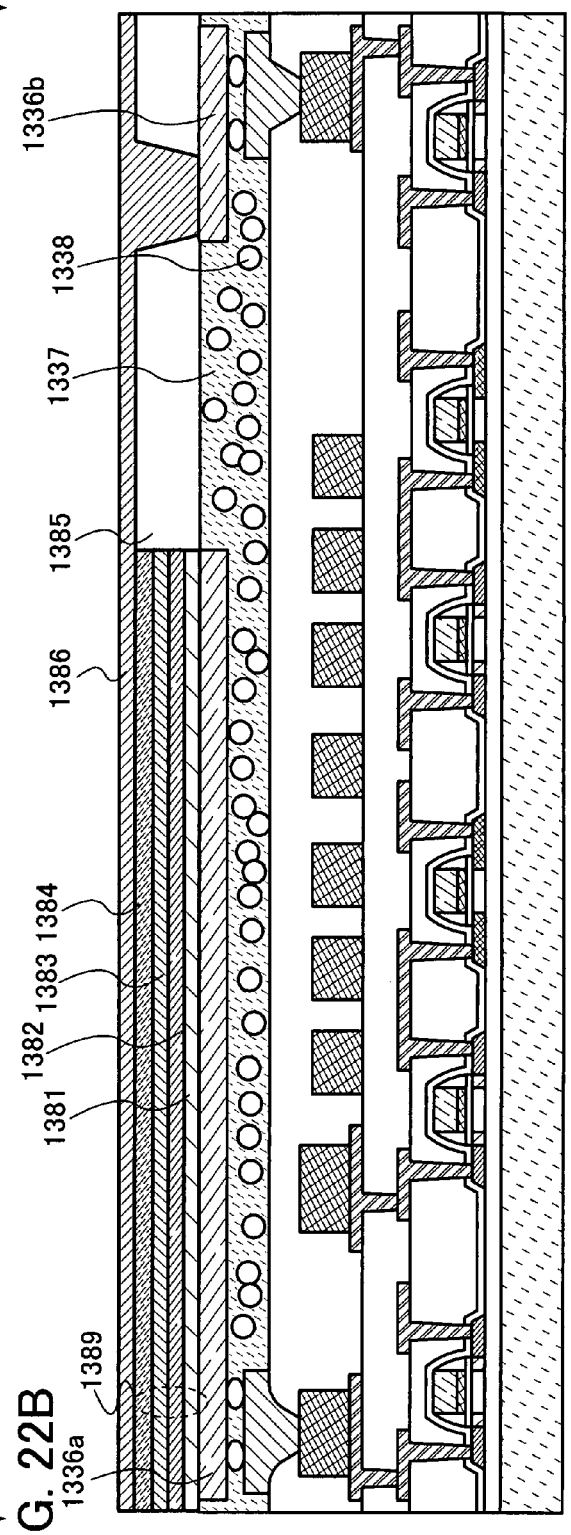
FIG. 22A
FIG. 22B

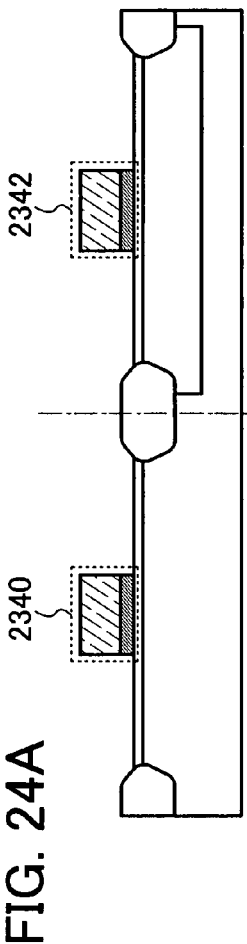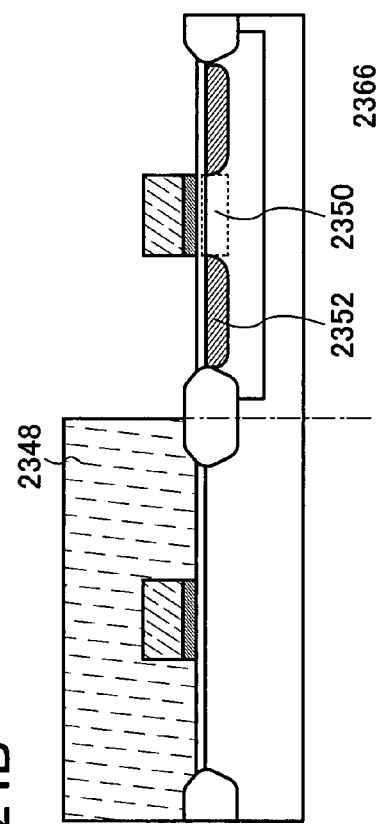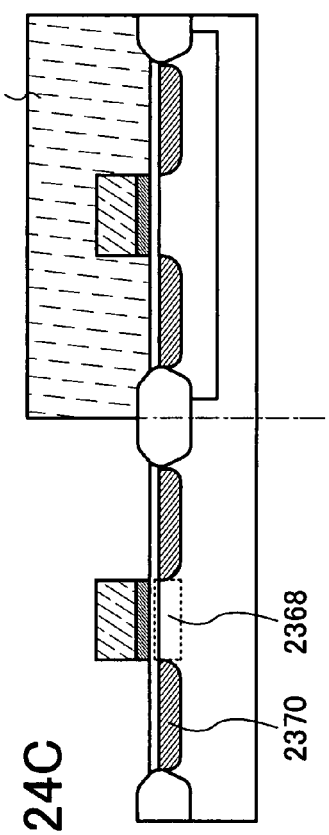

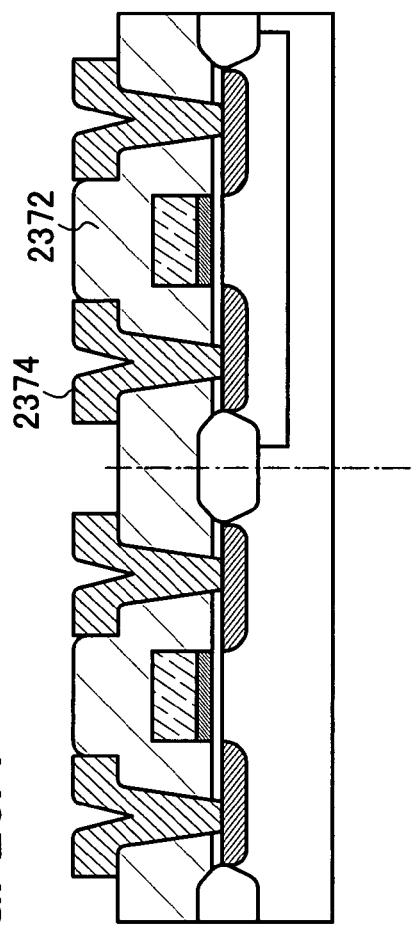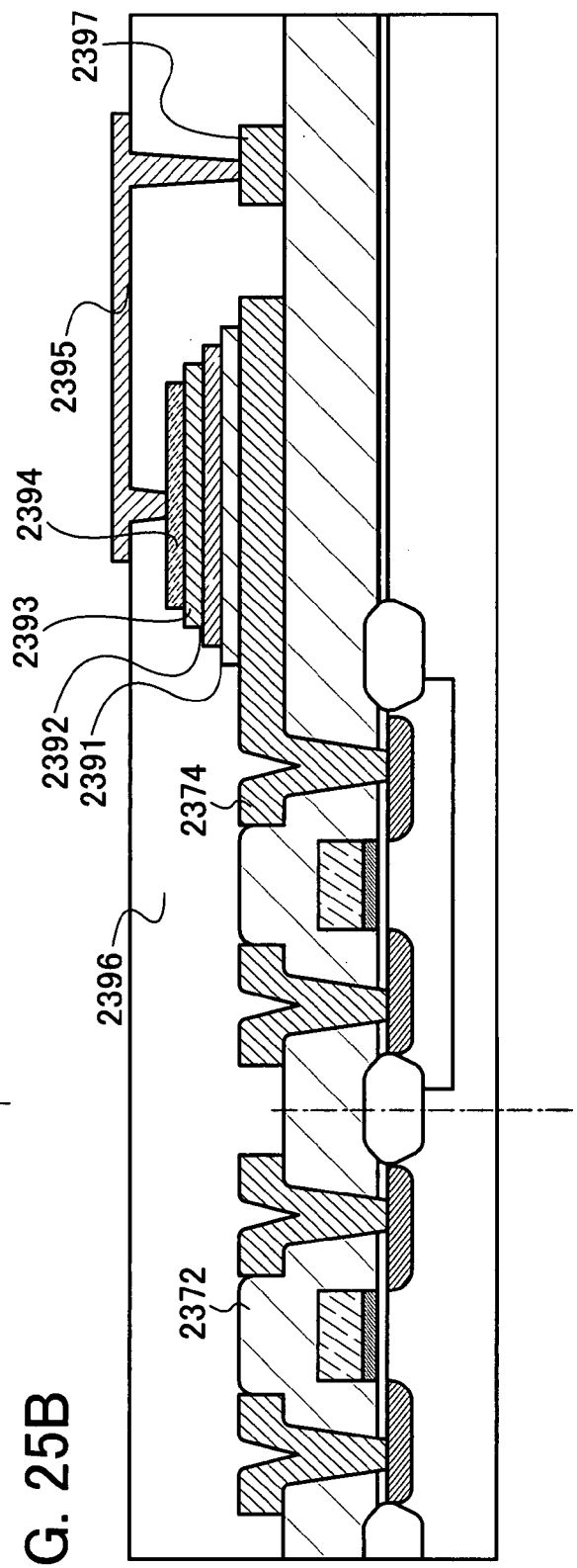

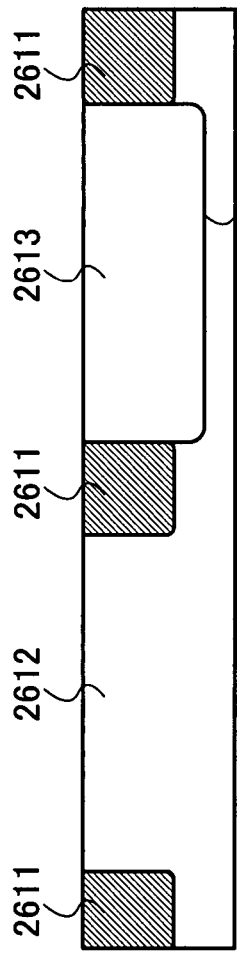
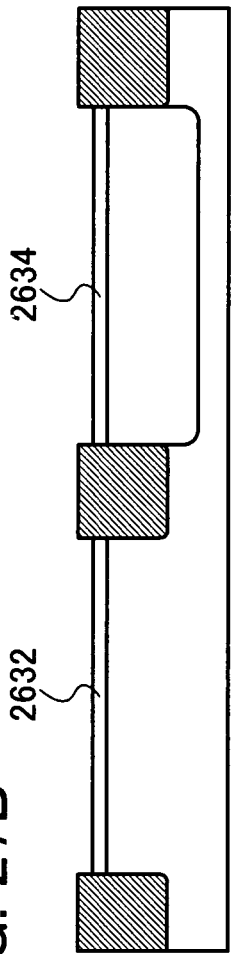
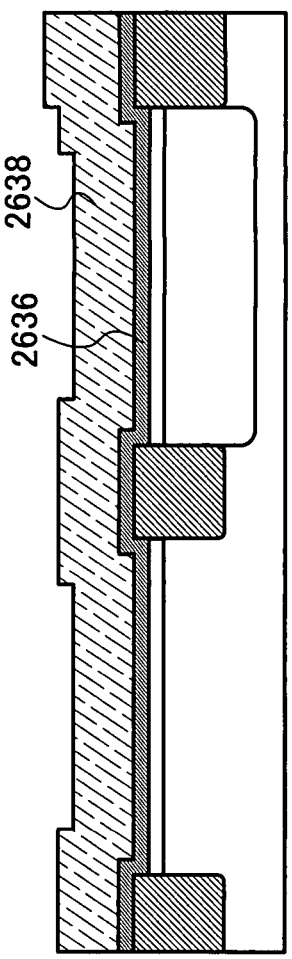
FIG. 27A
FIG. 27B
FIG. 27C

POWER STORAGE DEVICE AND MOBILE ELECTRONIC DEVICE HAVING THE SAME

BACKGROUND OF THE INVENTION

1. Field of the Invention

The present invention relates to power storage devices. In particular, the invention relates to a power storage device which stores power through reception of radio signals.

Note that "power storage device" as referred to in this specification means devices in general which store power through reception of radio signals from an external electric power supply device (a power feeder).

2. Description of the Related Art

Various electronic devices are coming into wide use and a wide variety of devices are on the market. In particular, in recent years, the spread of portable electronic devices has been marked. As an example, portable telephones, digital video cameras, and the like have become very convenient, having display portions with high definition, batteries that are more durable, and low power consumption. A portable electronic device has a built-in battery which is a power storage means. Thus, a power supply for driving the portable electronic device is secured from the battery. As a battery, a secondary battery (hereinafter also referred to as a "battery") such as a lithium ion battery is used. As matters now stand, the battery is directly charged from an AC adaptor which is plugged into a household AC power supply, which is a power supply means (see Reference 1: Japanese Published Patent Application No. 2005-150022).

Note that in this specification, portable electronic devices having the battery of the invention are distinguished from other electronic devices which operate with power supplied from a fixed power source, and are referred to as "mobile electronic devices" ("mobile devices").

SUMMARY OF THE INVENTION

However, the frequency of usage of mobile electronic devices such as portable telephones and digital video cameras has risen steadily, and there is a limit to improving the durability of batteries and reducing the power consumption for coping with the operating time. Further, for charging batteries which are a power source built in portable telephones, digital video cameras, and the like, there have not been any methods other than charging from a household AC power supply through an AC adaptor or from a commercially available primary battery. Therefore, charging has been troublesome for users, and it has been necessary for users to take an AC adaptor or a primary battery which is a power supply means with them when they are moving about outdoors, which is burdensome.

In addition, for charging from a household AC power supply through an AC adaptor or charging from a commercially available primary battery, it has been necessary to provide a relay terminal as a portion which conducts electricity to the battery in the mobile electronic device. Therefore, the relay terminal is exposed or exposed through a protective portion. Thus, there has been a problem in that malfunctions could occur when the relay terminal is damaged or defective.

In addition, in a mobile electronic device having a battery, power is continuously supplied to a load of the electronic device from the battery through a power supply circuit. In such a mobile electronic device, power consumption of the battery increases significantly when power is continuously and constantly supplied to the load from the battery, unlike the power supply from a fixed power source. Therefore, there has been a problem in that the usage of the mobile electronic device for a long time is limited when a power supply to the battery cannot be secured.

Therefore, an object of the invention is to provide a power storage device for regularly supplying power to a mobile electronic device and provide a mobile electronic device having the power storage device, in which charging of a battery by a power feeder which is a power supply means is simplified; in which there is no possibility of malfunctions which could occur if a relay terminal for directly connecting the battery and the power supply means is provided, and no possibility of damage to the relay terminal itself; and in which power consumption of the battery along with the usage for a long time can be mitigated.

In order to solve the foregoing problems, the invention provides a mobile electronic device with an antenna circuit for supplying power to the mobile electronic device. In addition, in the invention, power is supplied to the antenna circuit via radio signals such as electromagnetic waves, and the radio signals are supplied as power to a battery portion through a power supply control circuit, so that the battery portion is charged. In addition to the above structure of the invention in which the battery is charged with radio signals, a switch circuit is provided in the power supply control circuit which controls the power supply from the battery, so that the power supply to a load is controlled intermittently. Specific structures of the invention will be described below.

One feature of a power storage device of the invention includes an antenna circuit, a power supply control circuit, and a battery portion. The power supply control circuit includes a rectifier circuit which rectifies a signal received at the antenna circuit, a switch circuit, a low-frequency-signal generating circuit, and a power supply circuit. The battery portion includes a battery which is charged with a signal rectified by the rectifier circuit. The switch circuit is a circuit which controls power supplied to the power supply circuit from the battery or from the antenna circuit, using a signal from the low-frequency-signal generating circuit.

One feature of a power storage device of the invention includes an antenna circuit, a power supply control circuit, and a battery portion. The power supply control circuit includes a rectifier circuit which rectifies a signal received at the antenna circuit, a control circuit, a switch circuit, a low-frequency-signal generating circuit, and a power supply circuit. The battery portion includes a battery which is charged with a signal rectified by the rectifier circuit. The control circuit is a circuit which selects power to be supplied to the switch circuit by comparing power supplied from the antenna circuit with power supplied from the battery. The switch circuit is a circuit which controls the power selected by the control circuit to be output to the power supply circuit, using a signal from the low-frequency-signal generating circuit.

One feature of a power storage device of the invention includes an antenna circuit, a power supply control circuit, and a battery portion. The power supply control circuit includes a rectifier circuit which rectifies a signal received at the antenna circuit, a switch circuit, a low-frequency-signal generating circuit, and a power supply circuit. The battery portion includes a battery which is charged with a signal rectified by the rectifier circuit, and a charging management circuit. The charging management circuit is a circuit which manages a charged amount of the battery. The switch circuit is a circuit which controls power supplied to the power supply circuit from the battery or from the antenna circuit, using a signal from the low-frequency-signal generating circuit.

One feature of a power storage device of the invention includes an antenna circuit, a power supply control circuit, and a battery portion. The power supply control circuit includes a rectifier circuit which rectifies a signal received at the antenna circuit, a control circuit, a switch circuit, a low-frequency-signal generating circuit, and a power supply circuit. The battery portion includes a battery which is charged with a signal rectified by the rectifier circuit, and a charging management circuit. The charging management circuit is a circuit which manages a charged amount of the battery. The control circuit is a circuit which selects power to be supplied to the switch circuit by comparing power supplied from the antenna circuit with power supplied from the battery. The switch circuit is a circuit which controls the power selected by the control circuit to be output to the power supply circuit, using a signal from the low-frequency-signal generating circuit.

The control circuit of the invention may be a circuit which connects the battery and the switch circuit when power from the antenna circuit is lower than the power from the battery, and which does not connect the battery and the switch circuit when the power from the battery is lower than the power from the antenna circuit.

The battery of the invention may be a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, or a capacitor.

The battery of the invention may include a current-collecting thin film, a negative electrode active material layer over the current-collecting thin film, a solid electrolyte layer over the negative electrode active material layer, a positive electrode active material layer over the solid electrolyte layer, and a current-collecting thin film over the positive electrode active material layer.

The antenna circuit of the invention may be a circuit which receives a radio signal by an electromagnetic induction method.

The power storage device of the invention may further include a booster antenna, and the antenna circuit may receive a signal for charging the battery via the booster antenna.

The antenna circuit of the invention may include a plurality of antennas.

The low-frequency-signal generating circuit of the invention may be a circuit which generates a signal to be output to the switch circuit by dividing a frequency of a generated clock signal.

The invention includes a mobile electronic device which includes the above-described power storage device of the invention.

The power storage device of the invention has an antenna circuit. Therefore, there is no need to provide a relay terminal as a portion which conducts electricity to a battery, and there is no possibility of malfunctions occurring due to breakdown or defects of the relay terminal, so that the battery can be charged by using radio signals.

In addition to the above advantages obtained by providing the battery in the power storage device of the invention, a switch circuit is provided in the power supply control circuit which supplies power to the load, so that the power supply to the load is regularly controlled. By controlling the power supply to the load using the switch circuit provided in the power supply control circuit, the power supply to the load can be conducted intermittently. Therefore, reduction in power consumption of the battery can be achieved, and further, the load can be operated for a long time even when there is no power supply via radio signals.

BRIEF DESCRIPTION OF THE DRAWINGS

In the accompanying drawings:
FIGS. 18A to 18D illustrate structures of Embodiment 2;
FIGS. 19A to 19C illustrate structures of Embodiment 2;
FIGS. 20A and 20B illustrate structures of Embodiment 2;
FIGS. 21A and 21B illustrate structures of Embodiment 2;
FIGS. 22A and 22B illustrate structures of Embodiment 2;
FIGS. 24A to 24C illustrate structures of Embodiment 3;
FIGS. 25A and 25B illustrate structures of Embodiment 3;
FIGS. 27A to 27C illustrate structures of Embodiment 4.

DETAILED DESCRIPTION OF THE INVENTION

Figure 1:
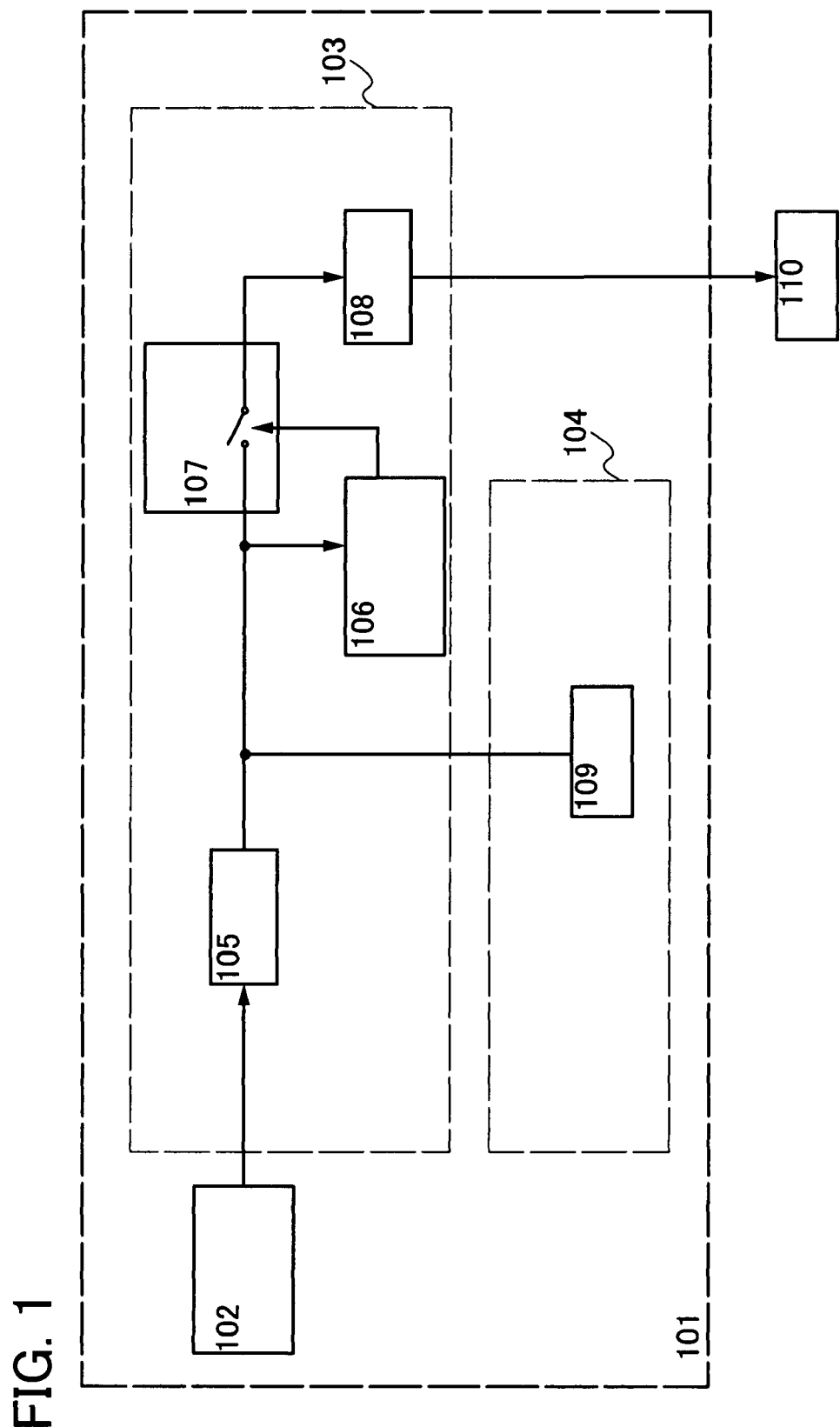
FIG. 1 illustrates a structure of Embodiment Mode 1.

Embodiment modes and embodiments of the invention will be described below with reference to the accompanying drawings. Note that the invention can be implemented in various different ways, and it will be easily understood by those skilled in the art that various changes and modifications can be made without departing from the spirit and scope of the invention. Therefore, the invention should not be construed as being limited to the description in the following embodiment modes and embodiments. In the structure of the invention described below, like reference numerals are used to designate portions which are identical in different drawings.

Embodiment Mode 1

Structural examples of a power storage device of the invention will be described with reference to the block diagrams of FIGS. 1 and 2.

A power storage device 101 in FIG. 1 includes an antenna circuit 102, a power supply control circuit 103, and a battery portion 104. The power supply control circuit 103 includes a rectifier circuit 105, a low-frequency-signal generating circuit 106, a switch circuit 107, and a power supply circuit 108. The battery portion 104 includes a battery 109. Note that the power supply circuit 108 in the power supply control circuit 103 outputs power to a load 110 which is located outside the power storage device 101.

Note that the structure of the load 110 in FIG. 1 differs from mobile electronic device to mobile electronic device. For example, as an example of a load in a portable telephone or a digital video camera, a display portion, an integrated circuit portion, and the like can be given. As an example of a load in a temperature sensor, a pressure sensor, or the like, a power output portion for driving the sensor, a data signal transmission portion, and the like can be given. As an example of a load in an RFID (Radio Frequency IDentification), a demodulating circuit, a modulating circuit, and the like can be given.

Figure 2:
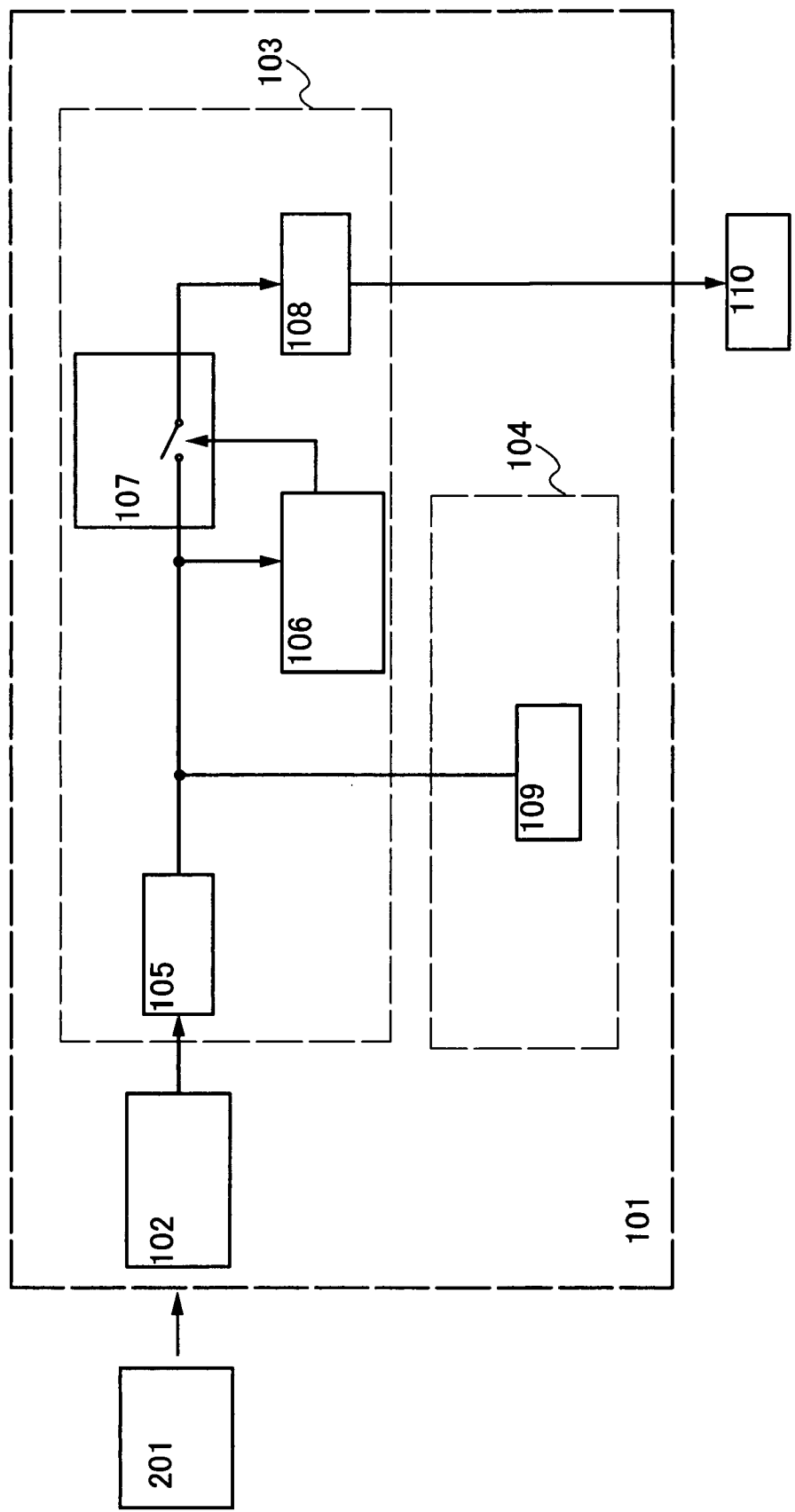
FIG. 2 illustrates a structure of Embodiment Mode 1.

FIG. 2 is a block diagram in which the antenna circuit 102 in the power storage device 101 receives a radio signal from a power feeder 201. In FIG. 2, power obtained by the antenna circuit 102 upon receiving a radio signal is input to the battery 109 in the battery portion 104 through the rectifier circuit 105. In addition, in FIG. 2, the power obtained by the antenna circuit 102 upon receiving a radio signal is input to the low-frequency-signal generating circuit 106 through the rectifier circuit 105. Further, in FIG. 2, the power obtained by the antenna circuit 102 upon receiving a radio signal is input to the power supply circuit 108 through the rectifier circuit 105 and the switch circuit 107. The low-frequency-signal generating circuit 106 outputs a signal which turns on/off the switch circuit 107 by using the input power.

Figure 4A:
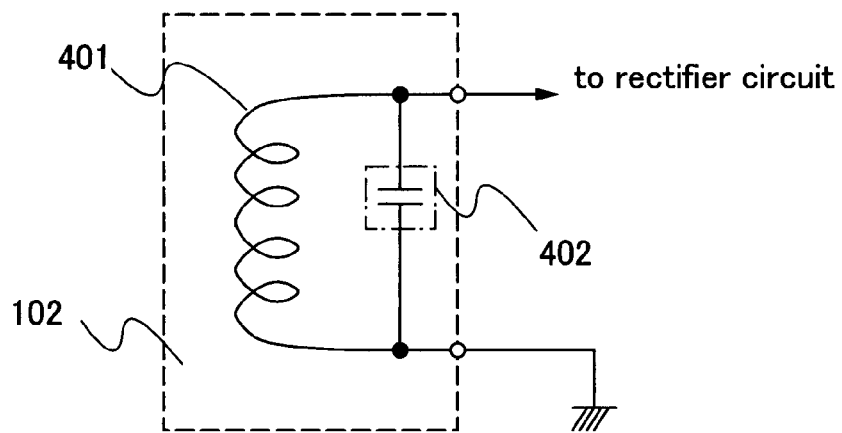
FIGS. 4A and 4B illustrate structures of Embodiment Mode 1.
Figure 4B:
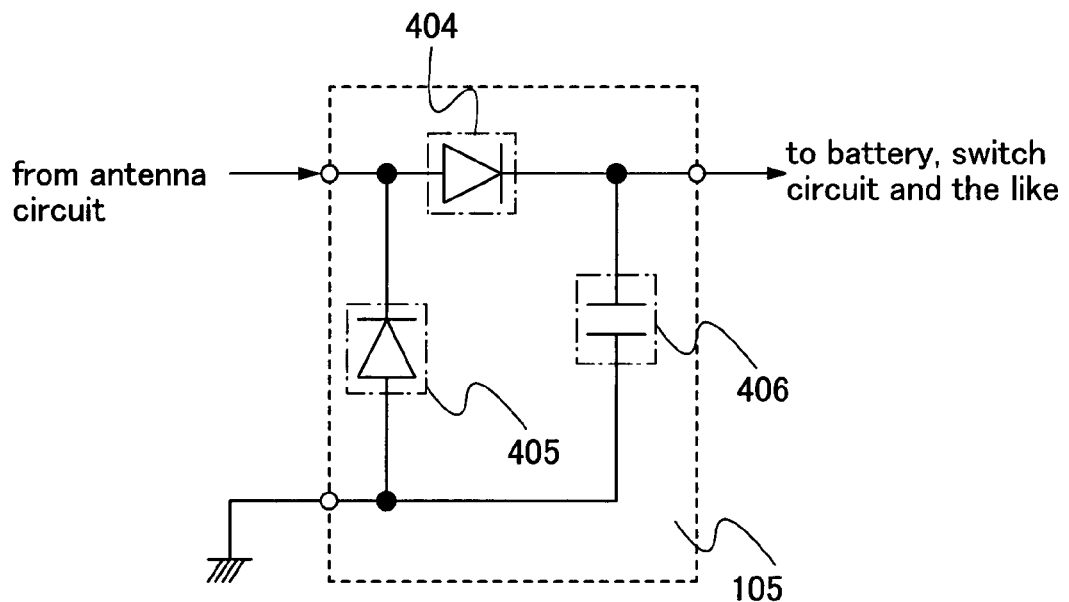

Note that description will be made on the assumption that the antenna circuit 102 includes an antenna 401 and a resonant capacitor 402 as shown in FIG. 4A, and thus, a set of the antenna 401 and the resonant capacitor 402 will be referred to as the antenna circuit 102. In addition, the rectifier circuit 105 may be any circuit as long as it can convert AC signals, which have been induced by electromagnetic waves received at that the antenna circuit 102, into DC signals through a rectification and smoothing process. For example, as shown in FIG. 4B, the rectifier circuit 105 may be constructed from a diode 404, a diode 405, and a smoothing capacitor 406.

In FIGS. 1 and 2, the battery 109 is charged with the power supplied to the battery portion 104. When it is difficult for sufficient power to be supplied by radio signals, power from the battery 109 is supplied to the power supply circuit 108 through the switch circuit 107.

There is no particular limitation on the form of the antenna provided in the antenna circuit 102 in FIGS. 1 and 2. That is, the transmission method of radio signals that can be applied to the antenna circuit 102 in the power storage device 101 can be any of an electromagnetic coupling method, an electromagnetic induction method, a microwave method, and the like. The transmission method may be appropriately selected by a practitioner according to the intended use of the device, and an antenna with a length and shape that are suitable for the selected transmission method may be provided.

In the structures shown in FIGS. 1 and 2, signals that are for the antenna circuit 102 to receive are not limited to radio signals from the power feeder 201. Other radio signals in the space may also be received at the antenna 102 so as to be supplied to the power supply control circuit 103. For example, as a radio signal (an electric wave) that the antenna circuit 102 receives in order to charge the battery 109 in the power storage device 101, electric waves of the relay station of portable telephones (e.g., 800 to 900 MHz, 1.5 GHz, or 1.9 to 2.1 GHz), electric waves emitted from portable telephones, electric waves of radio wave clocks (e.g., 40 kHz), noise of a household AC power supply (e.g., 60 Hz), electric waves that are randomly generated from other radio signal output means, and the like can be utilized.

The frequency of signals that are transmitted from the power feeder 201 to the antenna circuit 102 is not limited to specific ranges. For example, any of the following frequencies can be used: 300 GHz to 3 THz (submillimeter waves), 30 GHz to 300 GHz (millimeter waves), 3 GHz to 30 GHz (microwaves), 300 MHz to 3 GHz (ultrahigh frequency waves), 30 MHz to 300 MHz (very high frequency waves), 3 MHz to 30 MHz (high frequency waves), 300 kHz to 3 MHz (medium frequency waves), 30 kHz to 300 kHz (low frequency waves), and 3 kHz to 30 kHz (very low frequency waves).

Figure 3A:
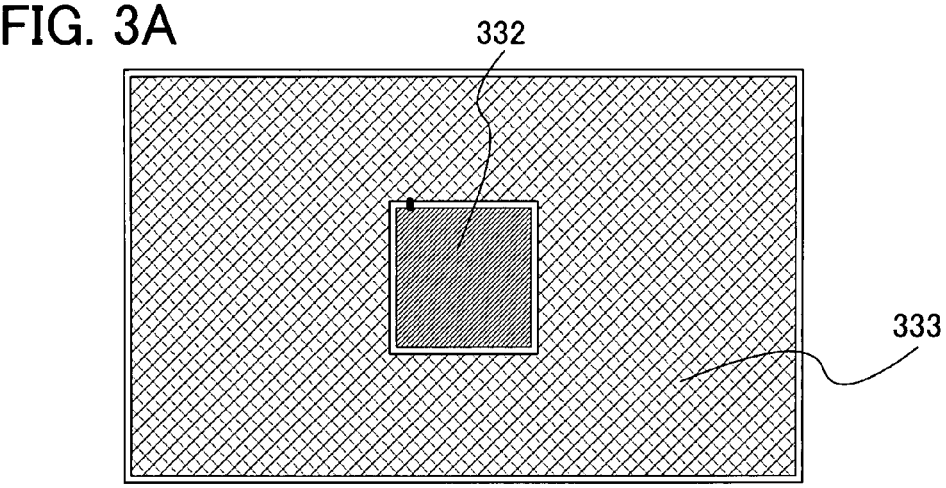
FIGS. 3A to 3E illustrate structures of Embodiment Mode 1.
Figure 3B:
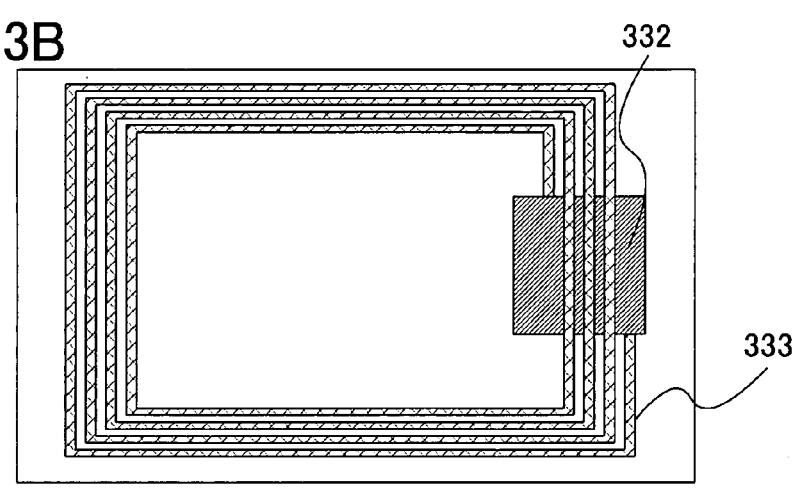
Figure 3C:
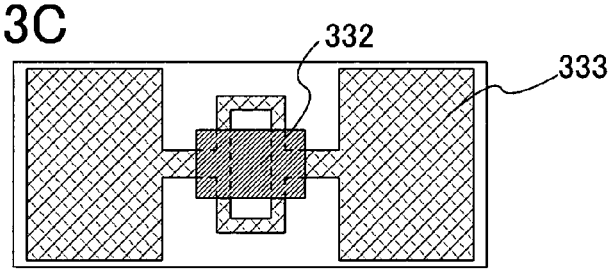
Figure 3D:
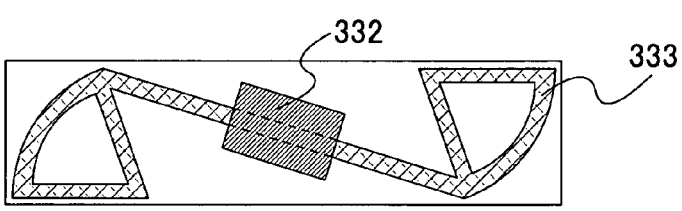
Figure 3E:
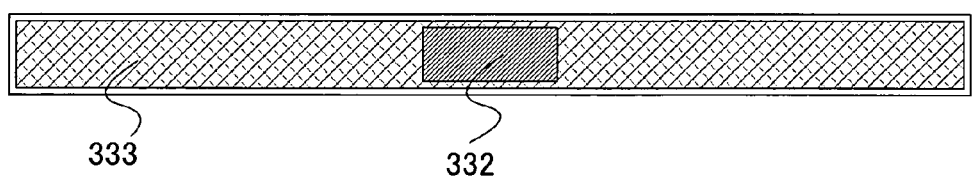

Examples of the shape of the antenna provided in the antenna circuit 102 are shown in FIGS. 3A to 3E. For example, a structure shown in FIG. 3A may be used in which an antenna 333 is disposed all around a chip 332 having a power supply control circuit. Alternatively, as shown in FIG. 3B, a structure may be used in which the chip 332 having the power supply control circuit is surrounded by the thin antenna 333. Further, a layout shown in FIG. 3C may be used in which the chip 332 having the power supply control circuit is disposed, and the antenna 333 has a form suited to receiving high-frequency electromagnetic waves. Alternatively, a layout shown in FIG. 3D may be used in which the chip 332 having the power supply control circuit is disposed, and the antenna 333 which is 180-degree omnidirectional (such that it can receive signals equally from any direction) is disposed. Further alternatively, a layout shown in FIG. 3E may be used in which the chip 332 having the power supply control circuit is disposed, and the antenna circuit 333 has a long rod-shape. The antennas with the above-described shapes can be used for the antenna circuit 102 in FIGS. 1 and 2.

In FIGS. 3A to 3E, the length of the antenna varies depending on the frequency of a signal received. Therefore, the length of the antenna is generally set to be a submultiple of the wavelength. For example, when a frequency of 2.45 GHz is used, an antenna may have a length of about 60 nm (½ the wavelength) or about 30 mm (¼ wavelength).

Note that the power feeder 201 in FIG. 2 will be described with reference to FIG. 5. The power feeder 201 in FIG. 5 includes a power transmission control portion 601 and an antenna circuit 602. The power transmission control portion 601 modulates an electric signal for power transmission which is to be transmitted to the power storage device 101 in the mobile electronic device, and the antenna circuit 602 outputs a radio signal for power transmission.

Figure 5:
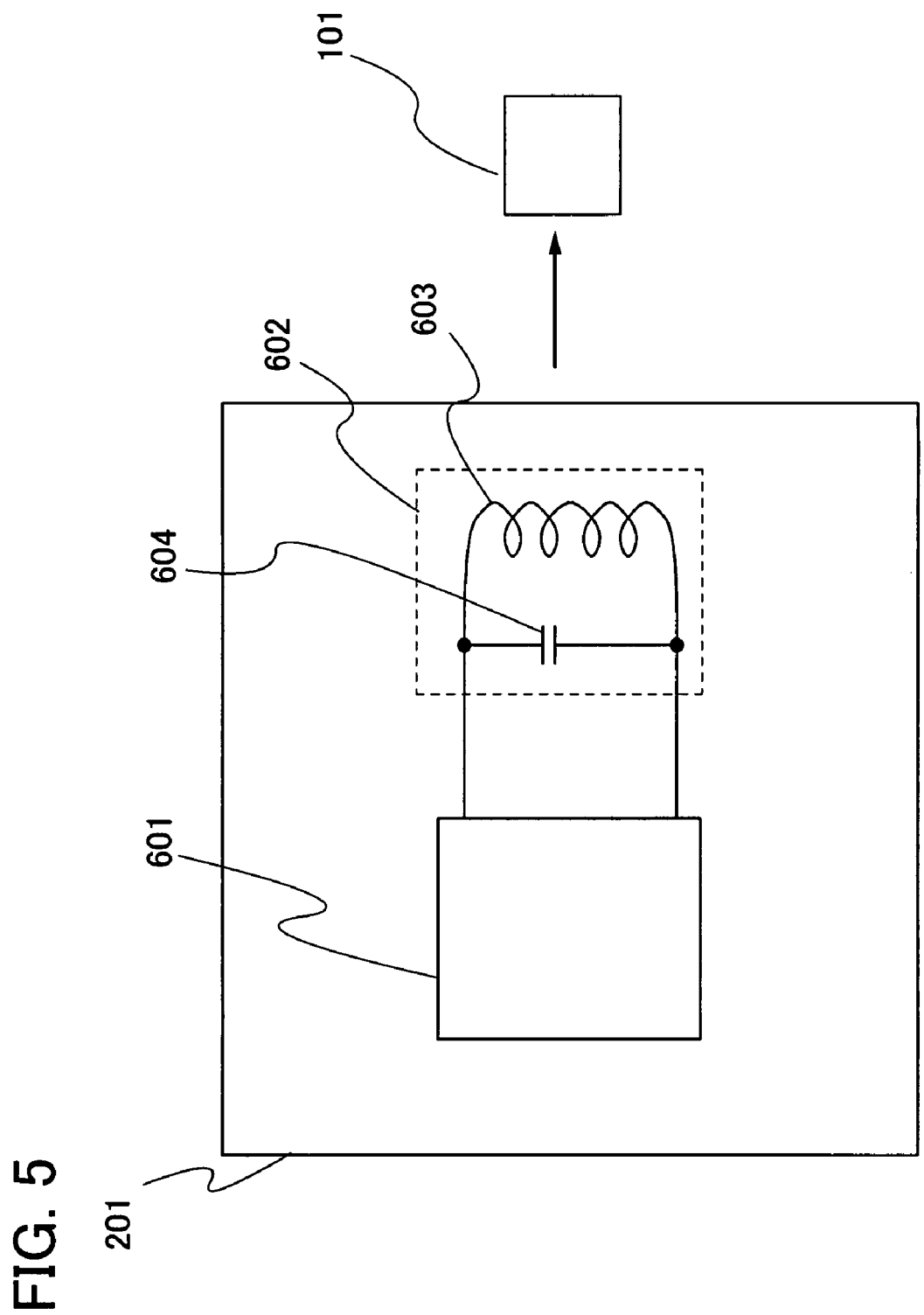
FIG. 5 illustrates a structure of Embodiment Mode 1.

In this embodiment mode, the antenna circuit 602 in the power feeder 201 shown in FIG. 5 is connected to the power transmission control portion 601, and includes an antenna 603 and a resonant capacitor 604 which form an LC parallel resonant circuit, similarly to the antenna circuit 102 in the power storage device 101. In transmitting power to the power storage device 101, the power transmission control portion 601 supplies an induced current to the antenna circuit 602, so that the antenna 603 outputs a radio signal for power transmission to the power storage device 101.

Figure 6:
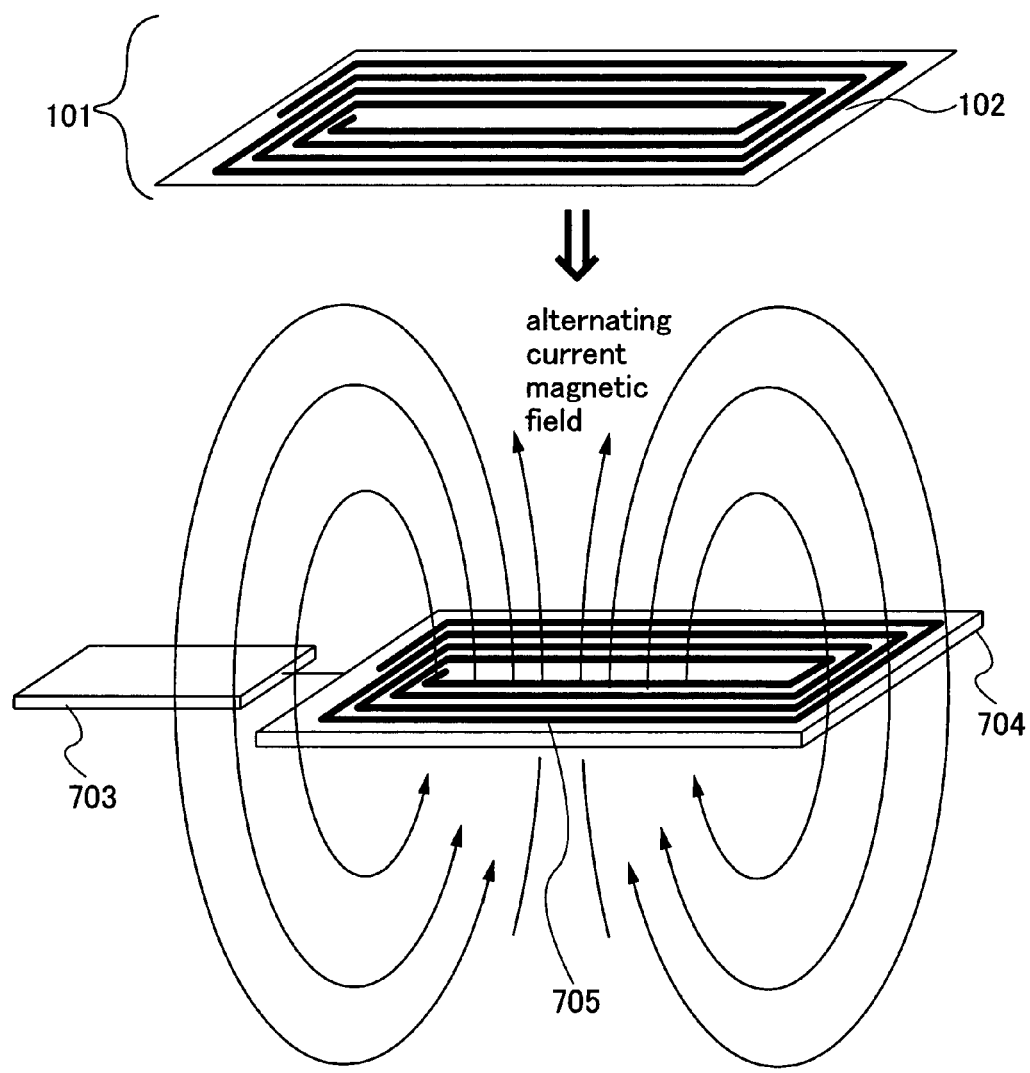
FIG. 6 illustrates a structure of Embodiment Mode 1.

Note that in this embodiment mode, description will be made on the assumption that radio signals that are for the antenna circuit 102 to receive are supplied by an electromagnetic induction method. Therefore, the power storage device 101 in FIGS. 1 and 2 has the coiled antenna circuit 102. For example, FIG. 6 shows the positional relationship between the antenna circuit in the power storage device and the antenna circuit in the power feeder, and the forms of the antennas. In FIG. 6, a structure is shown in which the antenna circuit in the power storage device receives a radio signal for power transmission from the antenna in the power feeder.

In FIG. 6, when the antenna circuit 102 in the power storage device 101 is brought close to a coiled antenna 705 in an antenna circuit 704 which is connected to a power transmission control portion 703 in the power feeder 201, an alternating current magnetic field is generated from the coiled antenna 705 in the antenna circuit 704 in the power feeder 201. The alternating current magnetic field goes through the coiled antenna circuit 102 in the power storage device 101, and then an electromotive force is generated between terminals (between one terminal of the antenna and the other) of the coiled antenna circuit 102 inside the power storage device 101 by electromagnetic induction. A battery inside the power storage device 101 can be charged by the electromotive force. Note that charging from the power feeder can be conducted even when some parts of the antenna circuit 102 in the power storage device 101 overlap one another, or when there are a plurality of antenna circuits 102 in the power storage device 101 within the alternating current magnetic field.

Next, the operation when the battery in the power storage device 101 in FIGS. 1 and 2 is charged by a radio signal from the power feeder, and power is supplied to the power supply circuit will be described. A radio signal from outside which is received at the antenna circuit 102 is half-wave rectified and smoothed by the rectifier circuit 105. The power output from the rectifier circuit 105 is supplied to the power supply circuit 108 through the switch circuit 107, and surplus power is stored in the battery 109.

In the invention, reduction in power consumption is achieved by intermittently operating the power storage device as described above. Generally, power storage devices constantly supply power to a load, but there are cases where a constant power supply is not always required depending on the intended use of the device. In such a case, the power consumption of the battery can be reduced by stopping the operation of supplying power to the load from the power storage device. In the invention, a circuit that is constantly operating is only the low-frequency-signal generating circuit 106 in FIGS. 1 and 2. The low-frequency-signal generating circuit 106 operates based on the power stored in the battery 109. The output waveform of the low-frequency-signal generating circuit 106 will be described, with reference to FIG. 7.

Figure 7:
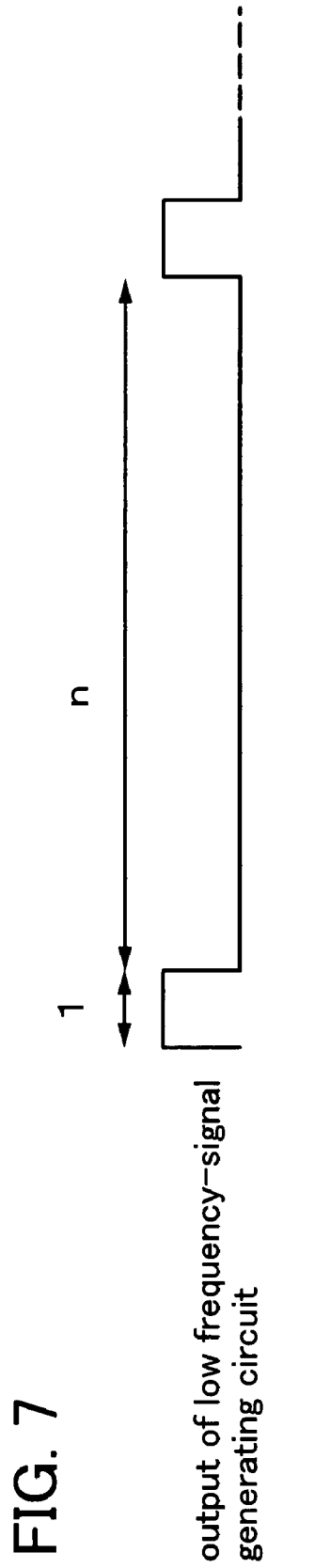
FIG. 7 illustrates a structure of Embodiment Mode 1.

FIG. 7 shows the waveform of a signal which is output from the low-frequency-signal generating circuit 106 to the switch circuit 107. In the example of FIG. 7, power consumption can be reduced to about 1/(n+1) by setting the duty of the output waveform at 1:n (n is an integer). The switch circuit 107 is driven based on the signal. The switch circuit 107 connects the battery 109 and the power supply circuit 108 only in the period when the output signal of the low-frequency-signal generating circuit 106 is at high. Accordingly, power is supplied to the load 110 from the battery 109 through the power supply circuit 108 in the power storage device only in that period.

Figure 8:
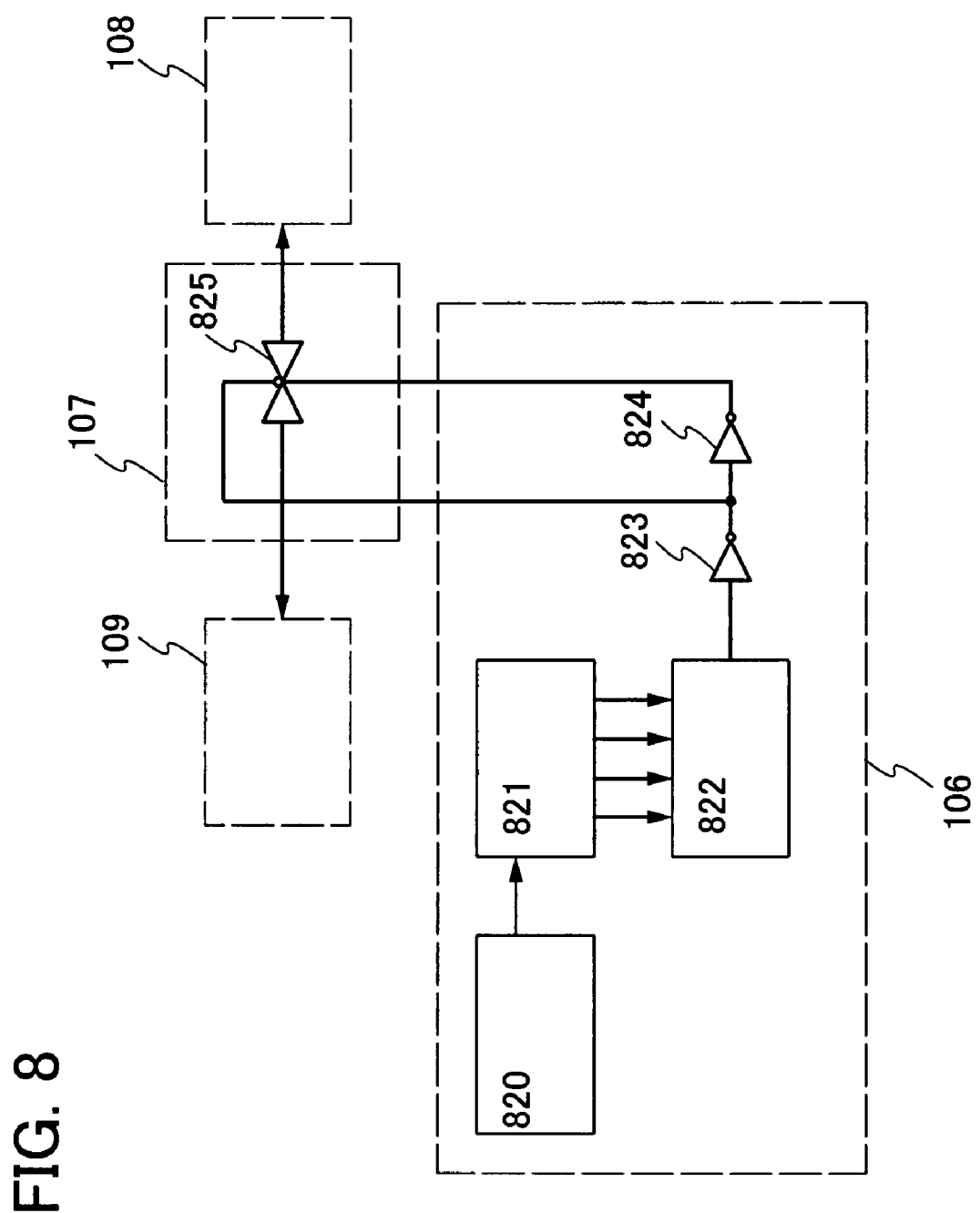
FIG. 8 illustrates a structure of Embodiment Mode 1.

FIG. 8 illustrates a specific structural example of the low-frequency-signal generating circuit 106 in FIGS. 1 and 2. The low-frequency-signal generating circuit 106 in FIG. 8 includes a ring oscillator 820, a divider circuit 821, an AND circuit 822, and inverters 823 and 824. The frequency of a signal which has been oscillated by the ring oscillator 820 is divided by the divider circuit 821, and the output of the divider circuit 821 is input to the AND circuit 822. Then, the AND circuit 822 generates low-duty signals. Further, the output of the AND circuit 822 is input to the switch circuit 107 which includes a transmission gate 825 through the inverters 823 and 824. The ring oscillator 820 is a ring oscillator which oscillates at a low frequency, for example 1 kHz.

Figure 9:
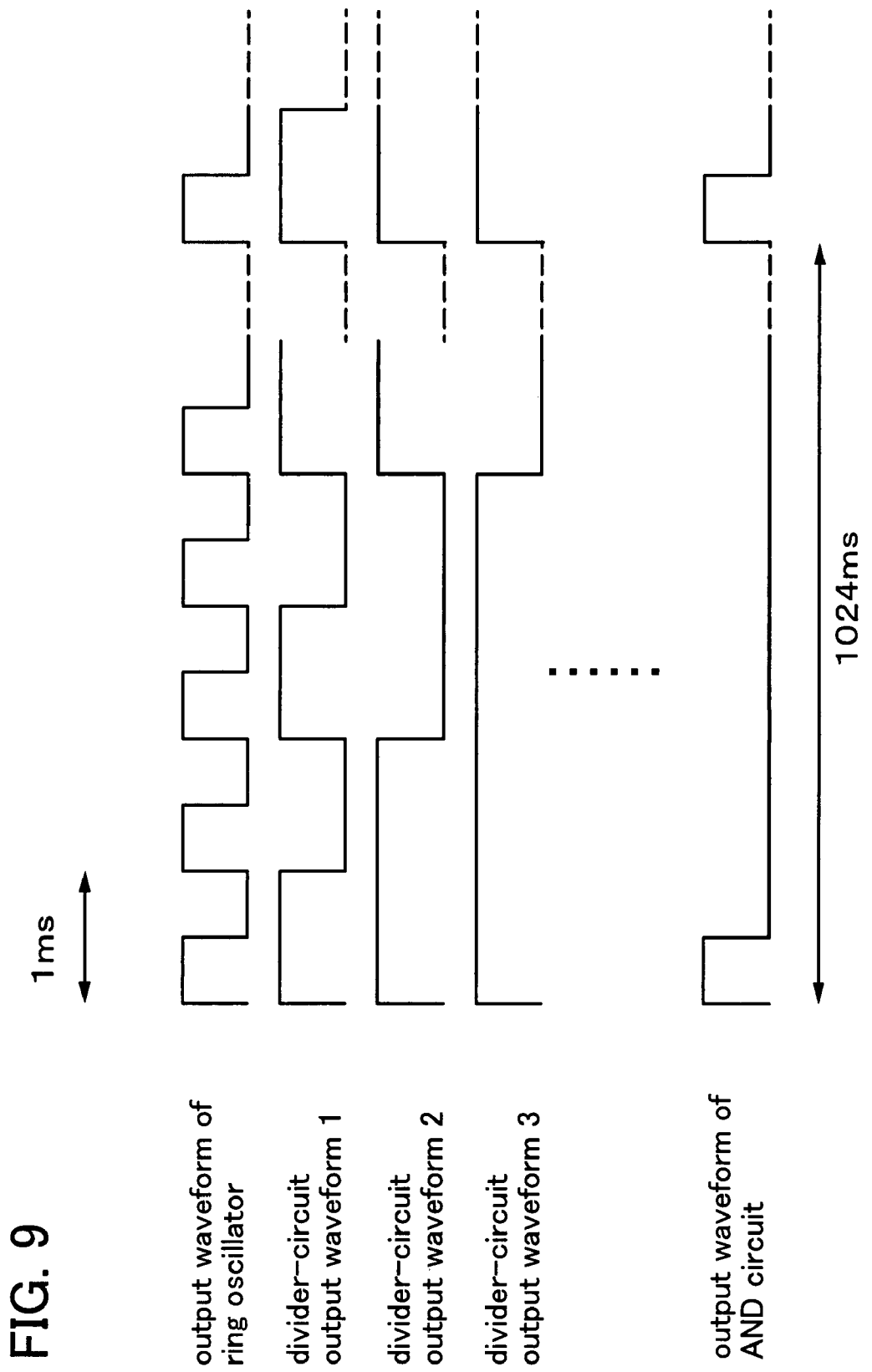
FIG. 9 illustrates a structure of Embodiment Mode 1.

FIG. 9 shows a timing chart of the signal output from each unit of the low-frequency-signal generating circuit 106. In FIG. 9, output waveforms of the ring oscillator 820, the divider circuit 821, and the AND circuit 822 are shown. When a 1/1024 divider circuit is used for the divider circuit 821, signals whose frequencies are divided, which are a divider-circuit output waveform 1, a divider-circuit output waveform 2, and a divider-circuit output waveform 3 as illustrated in FIG. 9, are sequentially output. In this embodiment mode, assuming that the divider circuit 821 is a 1/1024 divider circuit, a signal output from the AND circuit 822, which has received a plurality of signals output from the divider circuit 821, can be formed as a signal having a duty of 1:1024. At this time, when the oscillation frequency of the ring oscillator 820 is 1 kHz, the operation period and non-operation period in one cycle are 0.5 µs and 512 µm, respectively. The oscillation frequency of the ring oscillator is not limited to 1 kHz, and a different frequency may be employed. In addition, the division number of the frequency is not limited to 1024 and a different value may be used.

The signals which are output from the low-frequency-signal generating circuit 106 in the invention regularly control on/off of the transmission gate 825 in the switch circuit 107, thereby controlling the power supply to the power supply circuit 108 from the battery 109. Thus, the power supply to the load 110 from the power storage device 101 can be controlled. That is, by intermittently supplying power to the load 110 from the battery 109, the operation of supplying power to the load 110 from the power storage device 110 can be reduced, which results in low power consumption.

An example of the power supply circuit in FIGS. 1 and 2 will be described with reference to FIG. 10. The power supply circuit includes a reference voltage generating circuit and a buffer amplifier. The reference voltage generating circuit includes a resistor 1000 and diode-connected transistors 1002 and 1003, and generates a reference voltage corresponding to the sum of VGS of the two transistors. The buffer amplifier circuit includes a differential circuit which includes transistors 1005 and 1006; a current mirror circuit which includes transistors 1007 and 1008; and a common source amplifier which includes a current-supply resistor 1004, a transistor 1009, and a resistor 1010.

Figure 10:
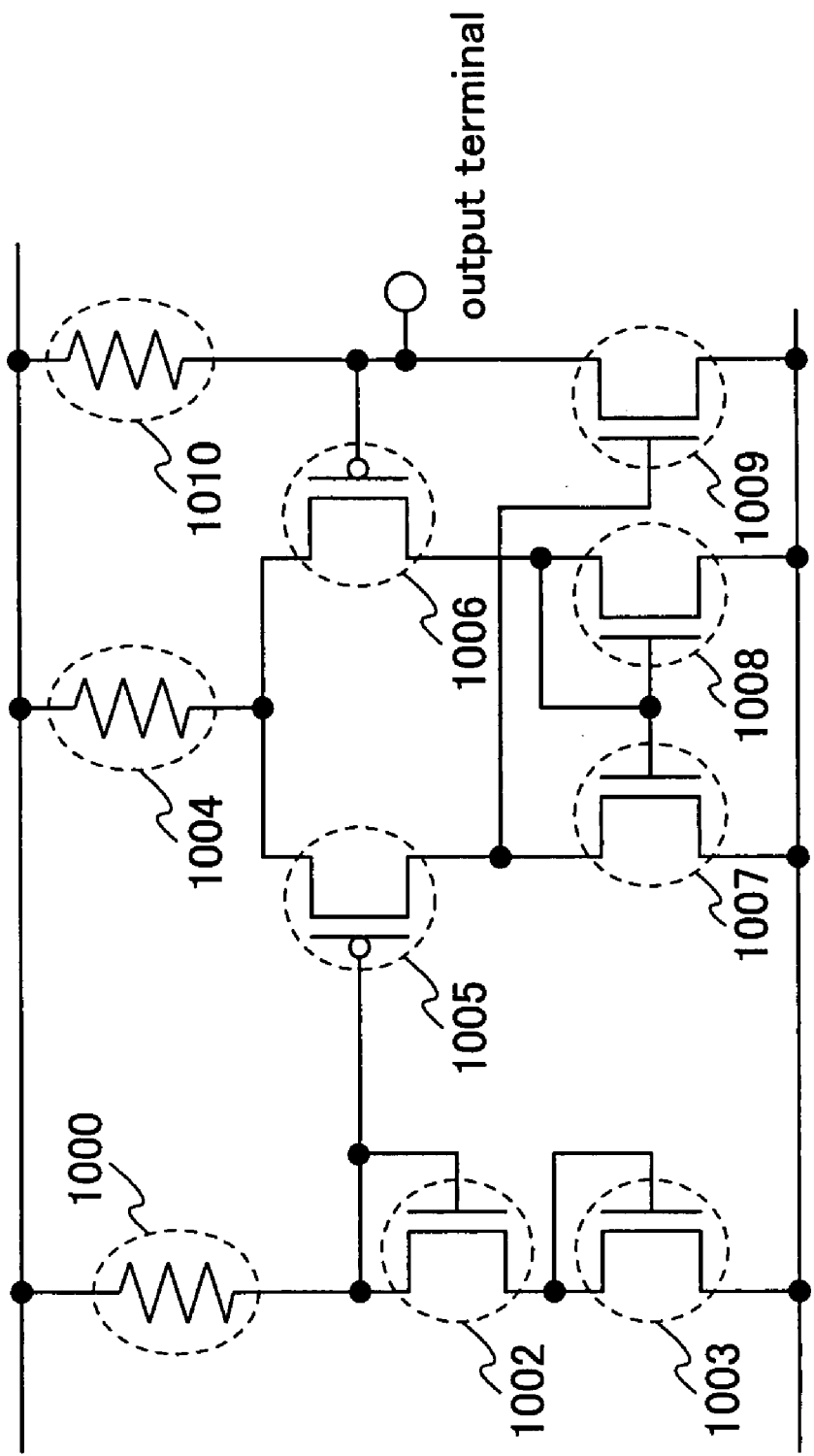
FIG. 10 illustrates a structure of Embodiment Mode 1.

The power supply circuit shown in FIG. 10 operates in such a manner that when a large amount of current is output from an output terminal, the amount of current that flows through the transistor 1009 becomes small, whereas when a small amount of current is output from the output terminal, the amount of current that flows through the transistor 1009 becomes large. Thus, a current which flows through the resistor 1010 is almost constant. In addition, the potential of the output terminal is almost the same as that of the reference voltage generating circuit. In this embodiment mode, although the power supply circuit which includes the reference voltage generating circuit and the buffer amplifier is shown, the power supply circuit used in the invention is not limited to the structure in FIG. 10, and a power supply circuit with a different structure may be used.

Note that "battery" as referred to in this specification means a battery whose continuous operating time can be restored by charging. Further, as a battery, a battery formed in a sheet-like form is preferably used although the type of the battery may differ depending on the intended use of the device. For example, by using a lithium battery, preferably a lithium polymer battery that uses a gel electrolyte, a lithium ion battery, or the like, miniaturization is possible. Needless to say, any battery may be used as long as it is chargeable. For example, the following batteries that are chargeable and dischargeable can be used: a nickel metal hydride battery, a nickel cadmium battery, an organic radical battery, a lead-acid battery, an air secondary battery, a nickel-zinc battery. Alternatively, a high-capacity capacitor or the like may be used.

Note that as a high-capacity capacitor that can be used as a battery of the invention, it is preferable to use a capacitor having electrodes whose opposed areas are large. In particular, it is preferable to use a double-layer electrolytic capacitor which is formed from an electrode material having a large specific surface area such as activated carbon, fullerene, or a carbon nanotube. A capacitor has a simpler structure than a battery. Further, a capacitor can be easily formed to be thin and formed by stacking layers. A double-layer electrolytic capacitor has a function of storing power and will not deteriorate much even after it is charged and discharged a number of times. Further, the double-layer electrolytic capacitor has an excellent property in that it can be charged rapidly.

Figure 11:
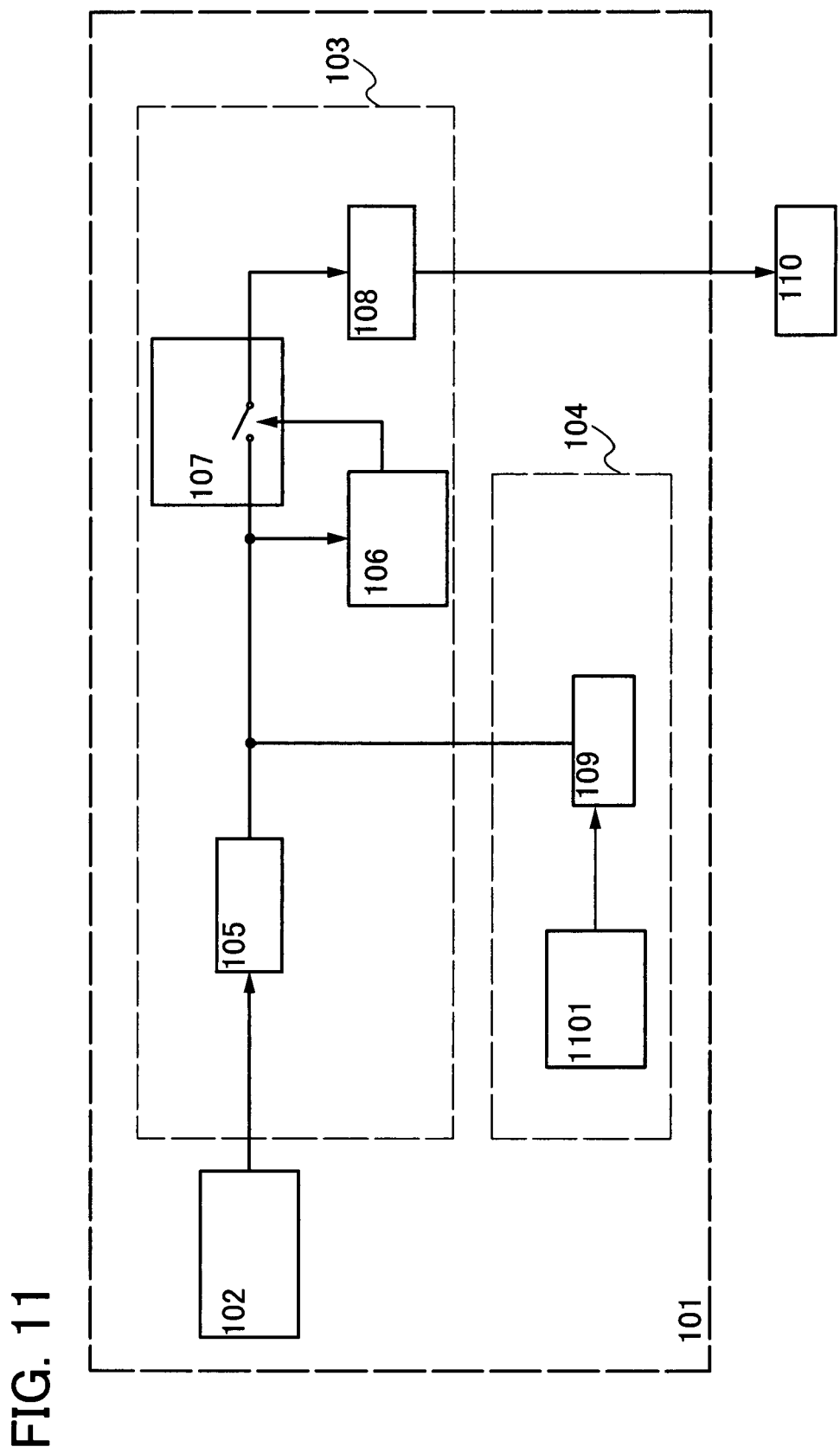
FIG. 11 illustrates a structure of Embodiment Mode 1.

Note that in this embodiment mode, power that is stored in the battery is not limited to a radio signal output from the power feeder 201. In addition, it is also possible to employ a structure where a power generation element is supplementarily provided in a part of the power storage device. FIG. 11 shows a structure where a power generation element is provided in a part of the battery portion 104 in the power storage device 101. The structure in FIG. 11 differs from that in FIG. 1 in that a power generation element 1101 for supplying power to the battery is provided. Using the structure including the power generation element 1101 is advantageous in that the amount of power supplied for storage in the battery 109 can be increased and the charging rate can be increased.

Note that as the power generation element 1101 in FIG. 11, for example, a power generation element using a solar cell, a power generation element using a piezoelectric element, or a power generation element using a micro electro mechanical system (MEMS) may be used. Note also that the structure of the power generation element in FIG. 11 is not limited to the structure described above.

Figure 12:
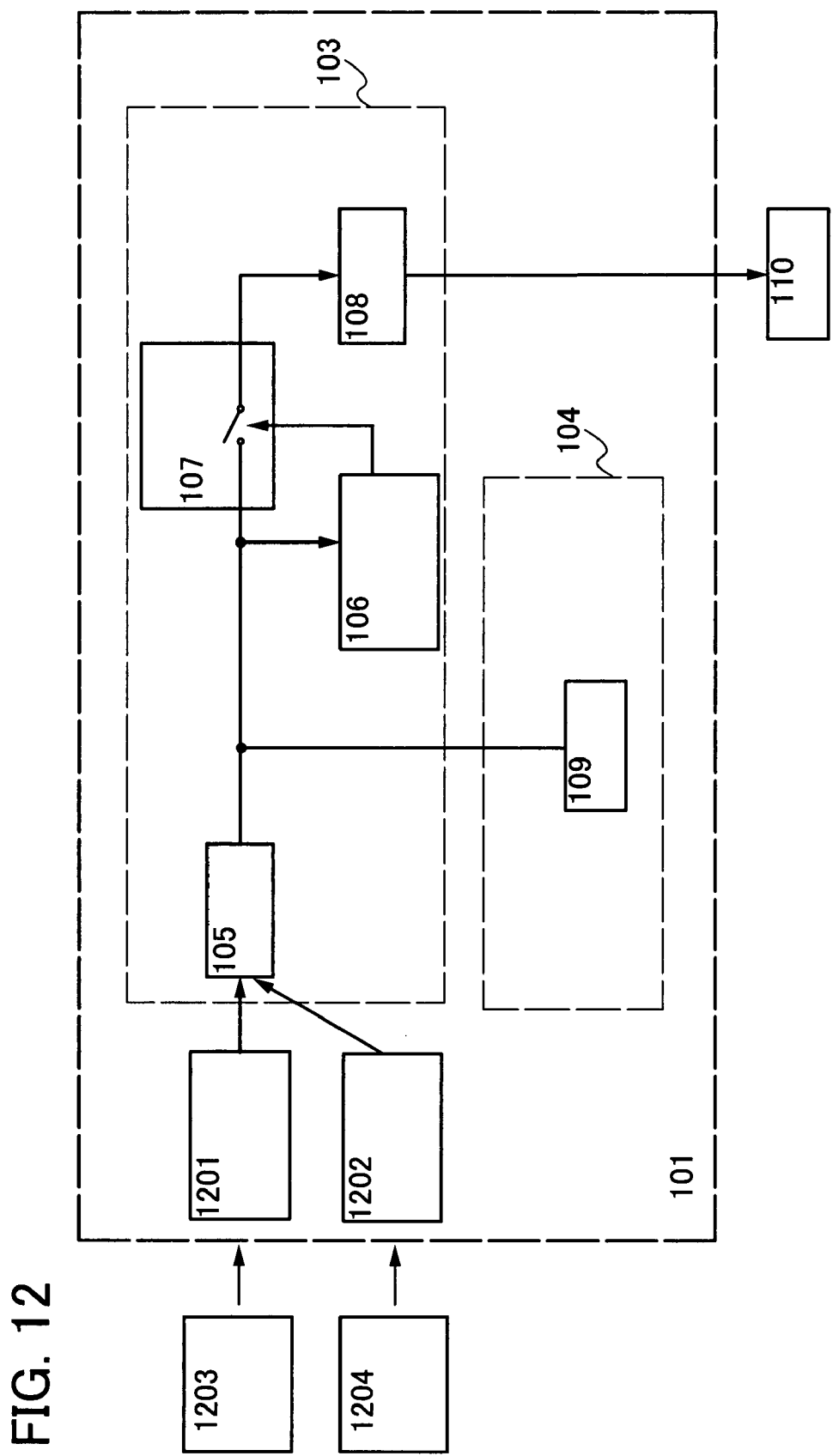
FIG. 12 illustrates a structure of Embodiment Mode 1.

Note that a structure may be used in which a plurality of antenna circuits 102 in FIGS. 1 and 2 are provided so that signals with a plurality of frequencies are received. FIG. 12 shows a structure of a power storage device which has a plurality of antenna circuits. The structure shown in FIG. 12 differs from those shown in FIGS. 1 and 2 in that it has a first antenna circuit 1201 and a second antenna circuit 1202 as a plurality of antenna circuits. By providing the structure with the plurality of antenna circuits as shown in FIG. 12, radio signals with a plurality of frequencies can be efficiently received, and power obtained from the received signals can be used for charging the battery, which is advantageous. In addition, in the structure where the plurality of antenna circuits is provided, a plurality of radio signals can be received by providing a plurality of power feeders. For example, as shown in FIG. 12, by providing a first power feeder 1203 which outputs radio signals to the first antenna circuit 1201 and providing a second power feeder 1204 which outputs radio signals to the second antenna circuit 1202, charging of the battery in the power storage device 101 becomes easier, which is advantageous.

Although the structure shown in FIG. 12 includes the first antenna circuit 1201, the second antenna circuit 1202, the first power feeder 1203, and the second power feeder 1204, the invention is not limited to this, and it is also possible to employ a structure where more than two antenna circuits and power feeders are provided, for example, by adding a third antenna circuit, a third power feeder, and the like.

In the power storage device of the invention, power consumption can be sufficiently reduced by intermittently supplying power to the load from the battery through the power supply circuit. In addition, when radio signals that are input from outside of the power storage device are received at the antenna circuit and power obtained thereby is stored in the battery of the power storage device, it is not required to regularly supply power to the load from the antenna circuit. Further, by comparing the power of a signal received at the antenna circuit with the power stored in the battery using the control circuit, and thereby selecting one of the power from the antenna circuit and the power from the battery to be supplied to the power supply circuit, further reduction in power consumption can be achieved, which is advantageous.

As described above, the power storage device of the invention includes the antenna circuit. Therefore, there is no need to provide a relay terminal as a portion which conducts electricity to the battery, and there is no possibility of malfunctions occurring due to breakdown or defects of the relay terminal which would otherwise be caused if the relay terminal is directly connected to the battery and the battery is charged through the relay terminal. Thus, the battery can be charged by using radio signals. In addition to the above advantages obtained by providing the battery in the power storage device of the invention, a switch circuit is provided in the power supply control circuit which supplies power to the load, so that the power supply to the load is regularly controlled. By controlling the power supply to the load using the switch circuit provided in the power supply control circuit, the power supply to the load can be conducted intermittently. Therefore, reduction in power consumption of the battery can be achieved, and further, the load can be operated for a long time even when there is no power supply via radio signals.

Note that this embodiment mode can be freely implemented in combination with any of the other embodiment modes in this specification.

Embodiment Mode 2

This embodiment mode will describe a structure where the power storage device shown in Embodiment Mode 1 further includes a control circuit which selects one of the power from the antenna circuit and the power from the battery to be supplied to the power supply circuit in the power supply control circuit, with reference to the drawings. Note that in the drawings used in this embodiment mode, parts that are the same as those in Embodiment Mode 1 are denoted by the same reference numerals as those in Embodiment Mode 1.

One structural example of the power storage device of the invention in accordance with this embodiment mode will be described with reference to the block diagrams of FIGS. 13 and 14.

Figure 13:
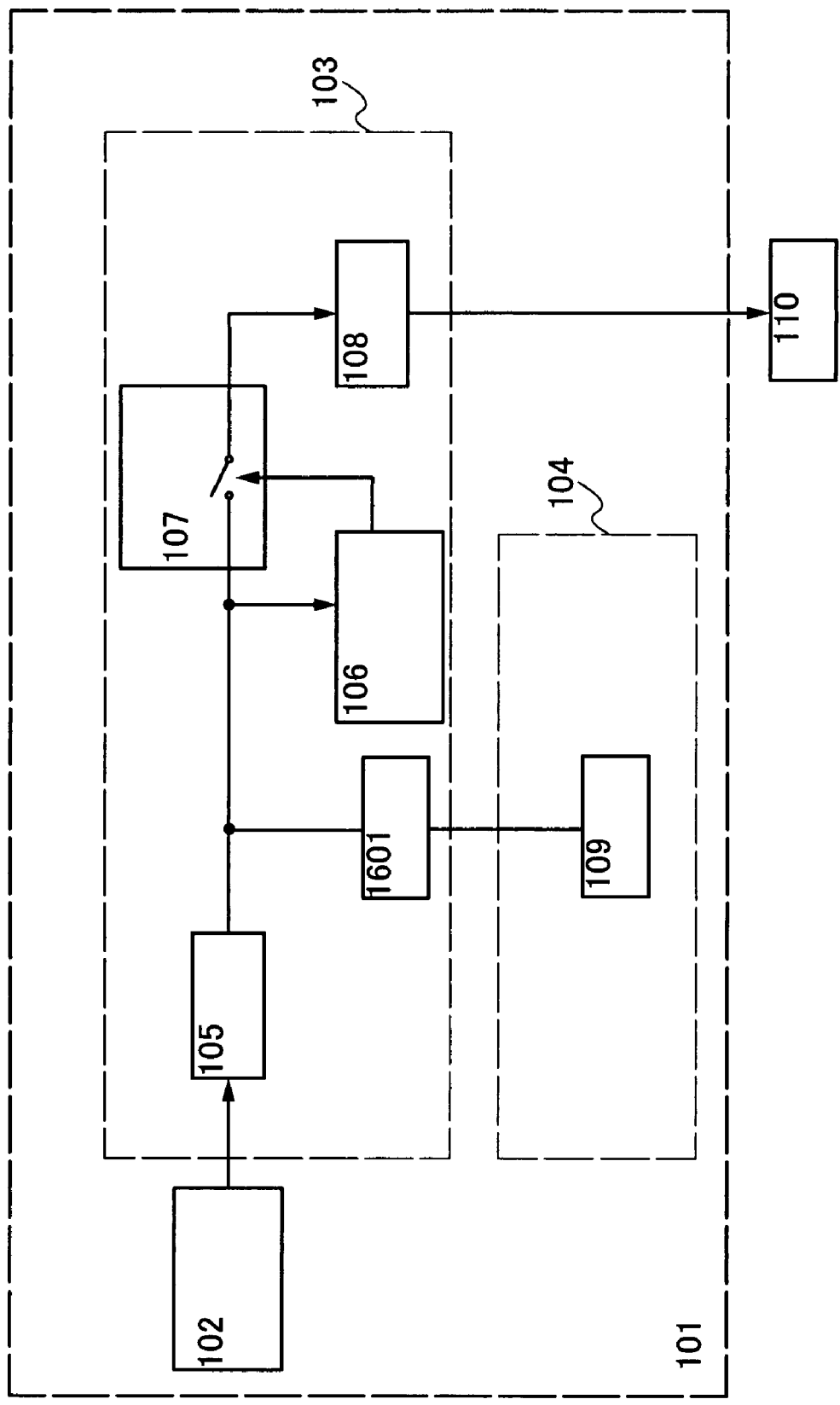
FIG. 13 illustrates a structure of Embodiment Mode 2.

The power storage device 101 in FIG. 13 includes an antenna circuit 102, a power supply control circuit 103, and a battery portion 104. The power supply control circuit 103 includes a rectifier circuit 105, a control circuit 1601, a low-frequency-signal generating circuit 106, a switch circuit 107, and a power supply circuit 108. The battery portion 104 includes a battery 109. Note that the power supply circuit 108 in the power supply control circuit 103 outputs power to a load 110 which is located outside the power storage device 101. The power storage device 101 shown in FIG. 13 differs from the structure in FIG. 1 in that the control circuit 1601 is provided between the rectifier circuit 105 and the battery 109.

Note that the structure of the load 110 in FIG. 13 differs from mobile electronic device to mobile electronic device. For example, as an example of a load in a portable telephone or a digital video camera, a display portion, an integrated circuit portion, and the like can be given. As an example of a load in a temperature sensor, a pressure sensor, or the like, a power output portion for driving the sensor, a data signal transmission portion, and the like can be given. As an example of a load in an RFID (Radio Frequency IDentification), a demodulating circuit, a modulating circuit, and the like can be given.

Figure 14:
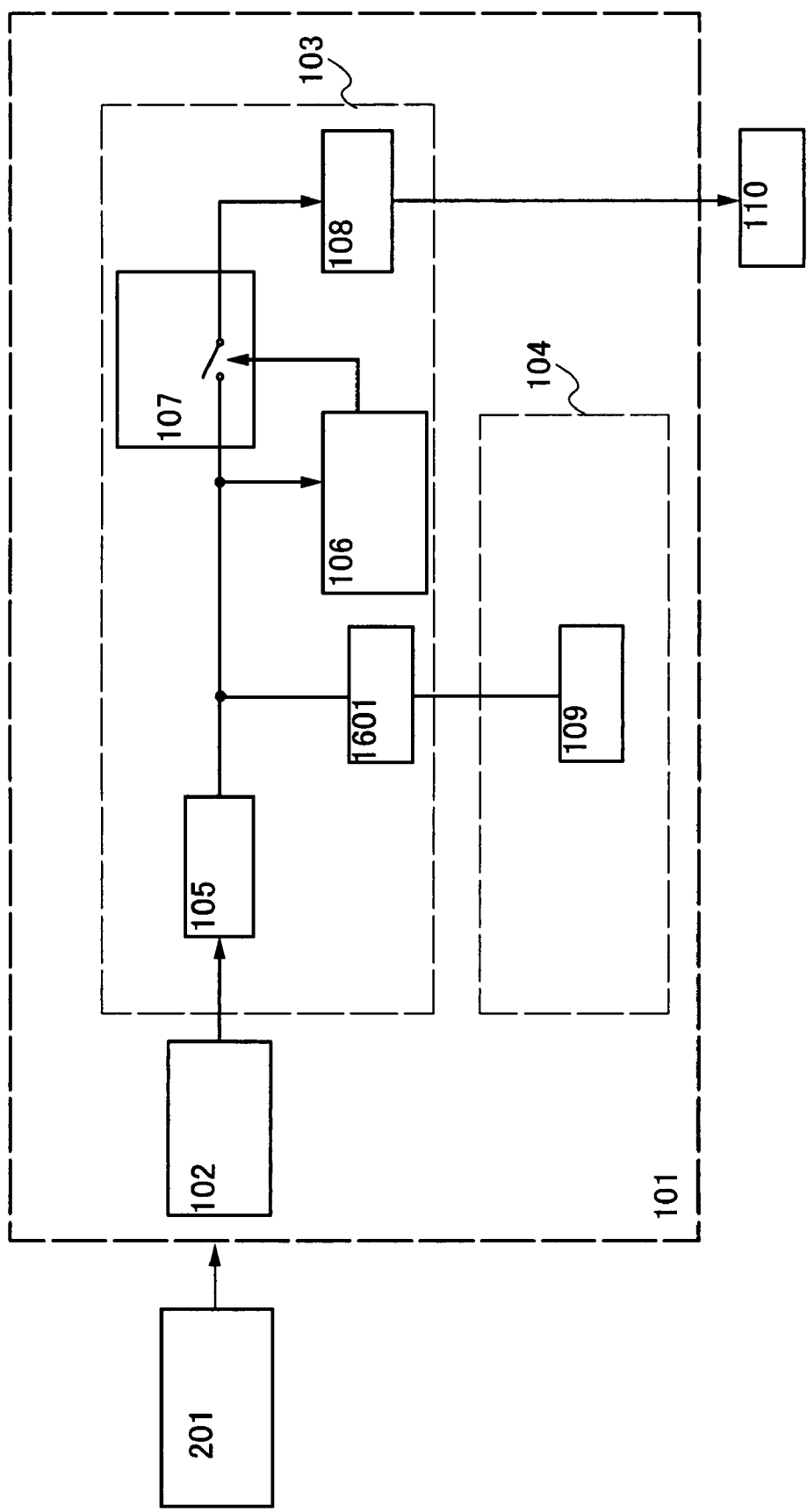
FIG. 14 illustrates a structure of Embodiment Mode 2.

FIG. 14 is a block diagram in which the antenna circuit 102 conducts charging based on a radio signal from a power feeder 201. In FIG. 14, the power obtained by the antenna circuit 102 upon receiving a radio signal is input to the battery 109 in the battery portion 104 through the rectifier circuit 105 and the control circuit 1601. In addition, in FIG. 14, the power obtained by the antenna circuit 102 upon receiving a radio signal is input to the low-frequency-signal generating circuit 106 through the rectifier circuit 105. Further, in FIG. 14, the power obtained by the antenna circuit 102 upon receiving a radio signal is input to the power supply circuit 108 through the rectifier circuit 105 and the switch circuit 107. The low-frequency-signal generating circuit 106 outputs a signal which turns on/off the switch circuit 107 by using the input power.

Note that the antenna circuit 102 in FIGS. 13 and 14 may have the structure shown in FIG. 4A in Embodiment Mode 1. In addition, the rectifier circuit 105 may have the structure shown in FIG. 4B in Embodiment Mode 1.

In addition, since the antenna circuit 102 in FIGS. 13 and 14 is similar to the antenna circuit 102 described in Embodiment Mode 1, description thereof will be omitted.

Note also that the form of the antenna provided in the antenna circuit 102 may be the same as that shown in FIG. 3 in Embodiment Mode 1, for example. Therefore, description thereof will be omitted.

In addition, in the structures shown in FIGS. 13 and 14, a plurality of antenna circuits and power feeders may be provided like the structure shown in FIG. 12 in Embodiment Mode 1.

In addition, since the structure of the power supply circuit 108 in FIGS. 13 and 14 is similar to the structure of the power supply circuit 108 described in Embodiment Mode 1, description thereof will be omitted.

In this embodiment mode, the power supply control circuit 103 includes the control circuit 1601 which stores surplus power of the power output from the rectifier circuit 105 in the battery 109 when the power output from the rectifier circuit 105 is sufficiently higher than the power required for operating the load 110, and supplies power to the power supply circuit 108 from the battery 109 when the power output from the rectifier circuit 105 is not high enough to operate the load 110.

The control circuit 1601 in this embodiment mode can be realized by connecting a control circuit between the rectifier circuit 105 and the battery 109. By connecting the battery 109 to the control circuit 1601, surplus power can be stored in the battery 109, and when the power output from the rectifier circuit 105 has decreased, power is supplied to the power supply circuit 108 from the battery 109.

An example of the control circuit 1601 in FIGS. 13 and 14 will be described with reference to FIG. 15.

Figure 15:
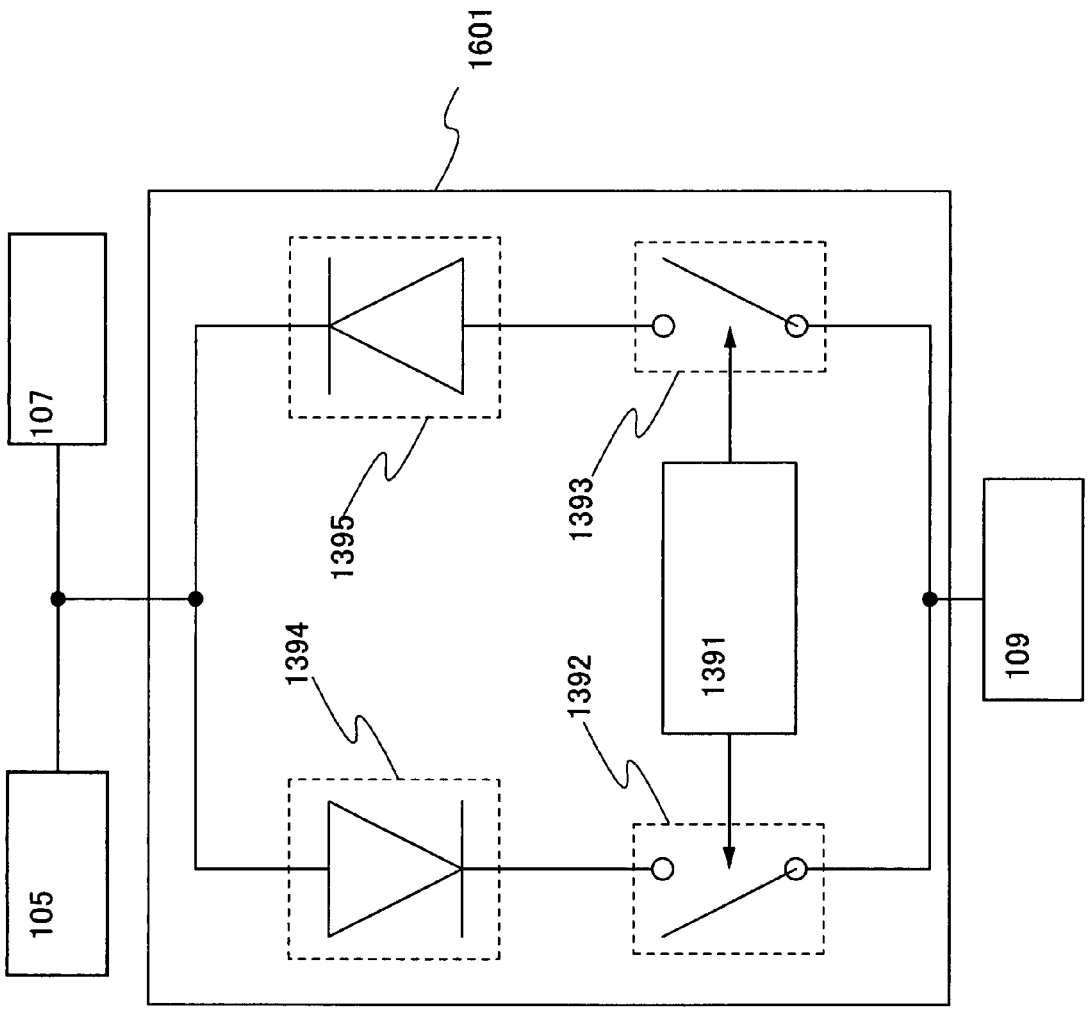
FIG. 15 illustrates a structure of Embodiment Mode 2.

In FIG. 15, the control circuit 1601 includes a rectifying element 1394, a rectifying element 1395, a voltage comparator circuit 1391, a switch 1392, and a switch 1393.

In FIG. 15, the voltage comparator circuit 1391 compares a voltage output from the battery 109 with a voltage output from the rectifier circuit 105. When the voltage output from the rectifier circuit 105 is sufficiently higher than the voltage output from the battery 109, the voltage comparator circuit 1391 turns on the switch 1392 and turns off the switch 1393. Then, a current flows into the battery 109 from the rectifier circuit 105 through the rectifying element 1394 and the switch 1392. On the other hand, when the voltage output from the rectifier circuit 105 becomes not sufficiently higher than the voltage output from the voltage output from the battery 109, the voltage comparator circuit 1391 turns off the switch 1392 and turns on the switch 1393. At this time, although current does not flow through the rectifier element 1395 when the voltage output from the rectifier circuit 105 is higher than the voltage output from the battery 109, when the voltage output from the rectifier circuit 105 is lower than the voltage output from the battery 109, a current flows from the battery 109 to the power supply circuit 108 through the switch 1393 and the rectifying element 1395 and further through the switch circuit 107.

Note that the control circuit 1601 not limited to the structure described in this embodiment mode, and a control circuit with a different structure may be used.

An example of the voltage comparator circuit 1391 shown in FIG. 15 will be described with reference to FIG. 16.

Figure 16:
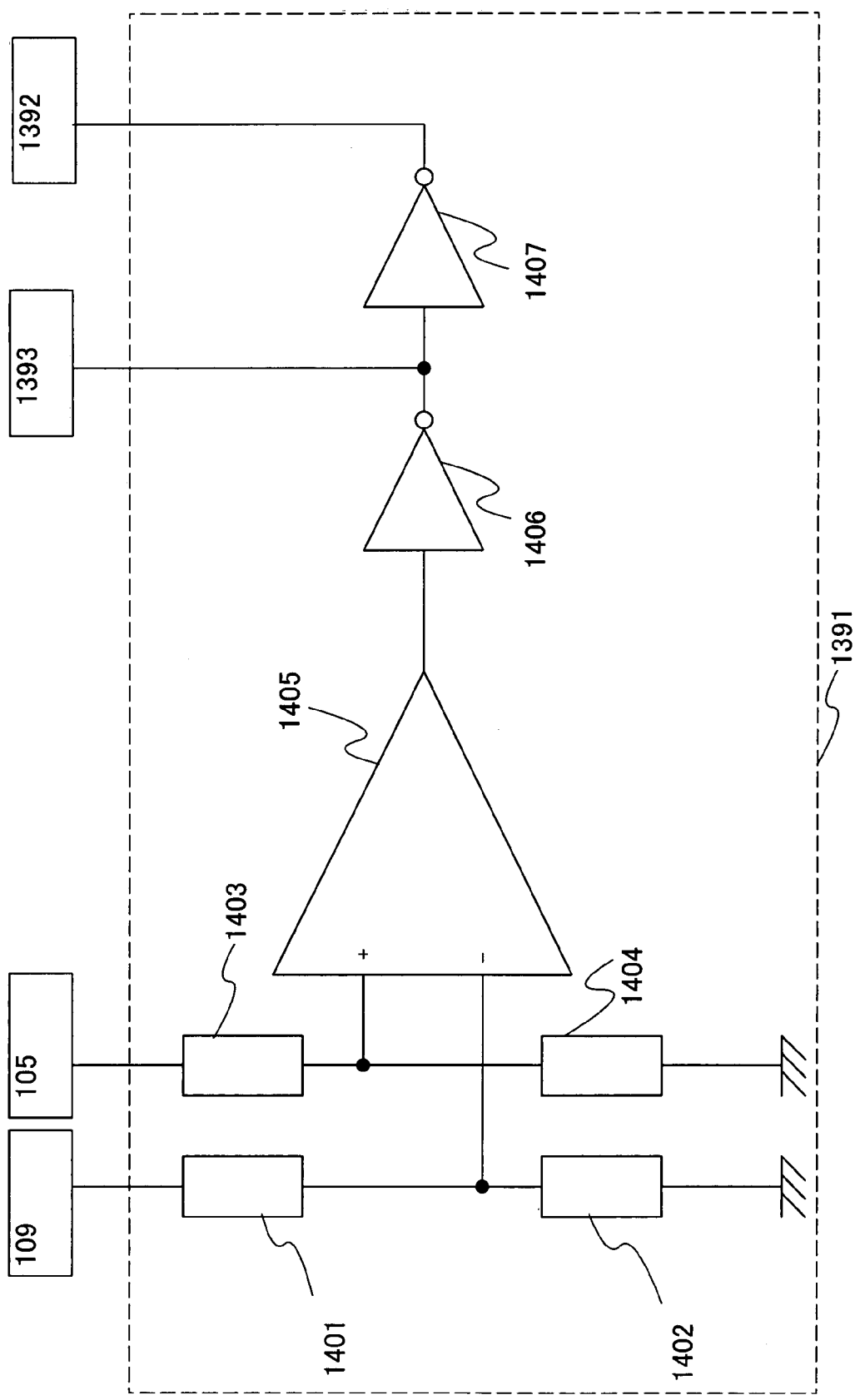
FIG. 16 illustrates a structure of Embodiment Mode 2.

In the structure of the voltage comparator circuit 1391 shown in FIG. 16, a voltage output from the battery 109 is divided by resistors 1401 and 1402, and a voltage output from the rectifier circuit 105 is divided by resistors 1403 and 1404. Then, the voltages divided by the resistors are input to a comparator 1405. Buffer circuits 1406 and 1407 of inverter topologies are connected in series with an output of the comparator 1405. Then, an output of the buffer circuit 1406 is input to a control terminal of the switch 1393 in FIG. 15, and an output of the buffer circuit 1407 is input to a control terminal of the switch 1392 in FIG. 15, whereby on/off of the switches 1392 and 1393 in FIG. 15 is controlled. Note that when H-level signals are input to the control terminals of the switches 1392 and 1393 in FIG. 15, the switches 1392 and 1393 are turned on, whereas when L-level signals are input, the switches 1392 and 1393 are turned off.

In the structure shown in FIG. 16, by regulating a voltage input to the comparator 1405 by dividing an incoming voltage with the resistors, it becomes possible to control the on/off timings of the switches 1392 and 1393 at a point when the voltage output from the rectifier circuit 105 becomes higher than the voltage output from the battery 109 by a certain level.

Note that the voltage comparator circuit 1391 is not limited to the structure described in this embodiment mode, and a voltage comparator circuit with a different structure may be used.

Next, the operation of supplying power to the power storage device 101 shown in FIGS. 13 and 14 via a radio signal will be described below. A radio signal from outside which is received at the antenna circuit 102 is half-wave rectified and smoothed by the rectifier circuit 105.

Then, a voltage output from the battery 109 is compared with a voltage output from the rectifier circuit 105 in the control circuit 1601. When the voltage output from the rectifier circuit 105 is sufficiently higher than the voltage output from the battery 109, the rectifier circuit 105 is connected to the battery 109. At this time, the power output from the rectifier circuit 105 is supplied to both the battery 109 and the power supply circuit 108, and surplus power is stored in the battery 109.

When the voltage output from the rectifier circuit 105 becomes lower than the voltage output from the battery 109, the control circuit 1601 connects the power supply circuit 108 and the battery 109. When the voltage output from the rectifier circuit 105 is higher than the voltage output from the battery 109, power output from the rectifier circuit 105 is supplied to the power supply circuit 108, and the battery 109 is not charged and does not consume power. When the voltage output from the rectifier circuit 105 becomes lower than the voltage output from the battery 109, power is supplied to the power supply circuit 108 from the battery 109. That is, the control circuit 1601 controls a current flow direction in accordance with the voltage output from the rectifier circuit 105 and the voltage output from the battery 109.

As described above, in the power storage device of the invention, power consumption can be sufficiently reduced by intermittently supplying power to the load from the battery through the power supply circuit. In addition, when radio signals that are input from outside of the power storage device are received at the antenna circuit and power obtained thereby is stored in the battery of the power storage device, it is not required to regularly supply power to the load from the antenna circuit. Further, by comparing the power of a signal received at the antenna circuit with the power stored in the battery using the control circuit, and thereby selecting one of the power from the antenna circuit and the power from the battery to be supplied to the power supply circuit, further reduction in power consumption can be achieved, which is advantageous.

Note that the structure and the timing chart of the low-frequency-signal generating circuit in this embodiment mode are similar to those shown in FIGS. 7, 8, and 9 in Embodiment Mode 1. Therefore, description thereof will be omitted in this embodiment mode.

As described above, the power storage device of the invention includes the antenna circuit. Therefore, there is no need to provide a relay terminal as a portion which conducts electricity to the battery, and there is no possibility of malfunctions occurring due to breakdown or defects of the relay terminal which would otherwise be caused if the relay terminal is directly connected to the battery and the battery is charged through the relay terminal. Thus, the battery can be charged by using radio signals. In addition to the above advantages obtained by providing the battery in the power storage device of the invention, a switch circuit is provided in the power supply control circuit which supplies power to the load, so that the power supply to the load is regularly controlled. By controlling the power supply to the load using the switch circuit provided in the power supply control circuit, the power supply to the load can be conducted intermittently. Therefore, reduction in power consumption of the battery can be achieved, and further, the load can be operated for a long time even when there is no power supply via radio signals.

Note that this embodiment mode can be freely implemented in combination with any of the other embodiment modes in this specification.

Embodiment Mode 3

This embodiment mode will describe a structure where a booster antenna circuit (hereinafter referred to as a booster antenna) is provided in the power storage device shown in Embodiment Mode 1, with reference to the drawings. Note that in the drawings used in this embodiment mode, parts that are the same as those in Embodiment Mode 1 are denoted by the same reference numerals as those in Embodiment Mode 1.

Note that "booster antenna" as referred to in this embodiment mode means an antenna having a larger size than the antenna provided in the power storage device which receives radio signals from a power feeder. The booster antenna refers to an antenna which can efficiently transmit signals supplied from a power feeder to a target power receiving device, by resonating the signals from the power feeder at a particular frequency band and magnetically coupling the antenna circuit provided in the power receiving device with the booster antenna itself. Since the booster antenna is magnetically coupled with the antenna circuit, there is no need to directly connect the antenna circuit and the power supply control circuit, which is advantageous.

The structure of the power storage device in this embodiment mode will be described with reference to the block diagram of FIG. 17.

Figure 17:
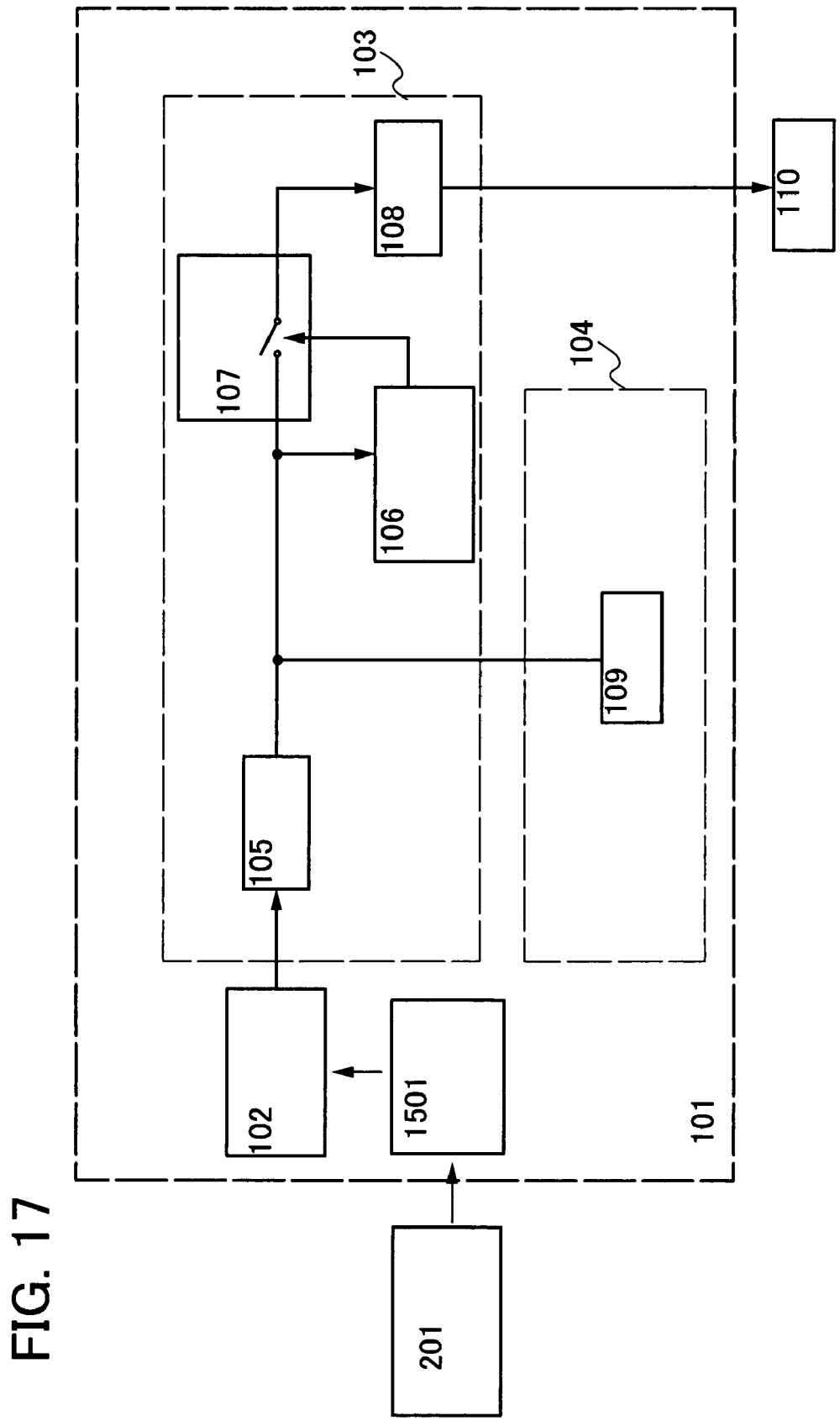
FIG. 17 illustrates a structure of Embodiment Mode 3.

The power storage device 101 in FIG. 17 includes an antenna circuit 102, a booster antenna 1501, a power supply control circuit 103, and a battery portion 104. The power supply control circuit 103 includes a rectifier circuit 105, a low-frequency-signal generating circuit 106, a switch circuit 107, and a power supply circuit 108. The battery portion 104 includes a battery 109. Note that the booster antenna 1501 receives radio signals from a power feeder 201. Note also that the power supply circuit 108 in the power supply control circuit 103 outputs power to a load 110 which is located outside the power storage device 101. The power storage device 101 shown in FIG. 17 differs from the structure in FIG. 2 of Embodiment Mode 1 in that the booster antenna 1501 is disposed between the power feeder 201 and the antenna circuit 102.

In the power storage device 101 in FIG. 17, upon receiving a radio signal from the power feeder 201, the booster antenna 1501 is magnetically coupled with the antenna circuit 102, so that the radio signal from the power feeder 201 is transmitted to the antenna circuit 102. In FIG. 17, a signal input to the power supply control circuit 103 from the antenna circuit 102 is input to the power supply circuit 108 through the rectifier circuit 105 and the switch circuit 107. In addition, in FIG. 17, the signal received at the antenna circuit 102 is input to the battery 109 through the rectifier circuit 105, so that the battery 109 is charged.

Note that the antenna 102 may have the structure shown in FIG. 4A in Embodiment Mode 1. In addition, the rectifier circuit 105 may have the structure shown in FIG. 4B in Embodiment Mode 1.

In addition, since the antenna circuit 102 in FIG. 17 is similar to the antenna circuit 102 described in Embodiment Mode 1, description thereof will be omitted.

In this embodiment mode, radio signals that are for the antenna circuit 102 and the booster antenna 1501 to receive are supplied by an electromagnetic induction method. Therefore, the power storage device 101 in FIG. 17 includes the coiled antenna circuit 102 and the booster antenna 1501. In FIG. 17, when a coiled antenna in an antenna circuit of the power feeder 201 is brought close to the booster antenna 1501 of the power storage device 101, an alternating current magnetic field is generated from the coiled antenna in the antenna circuit of the power feeder 201. The alternating current magnetic field goes through the coiled booster antenna 1501 of the power storage device 101, and an electromotive force is generated between terminals (between one terminal of the antenna and the other) of the coiled booster antenna 1501 inside the power storage device 101 by electromagnetic induction. While the electromotive force is generated in the coiled booster antenna 1501 by electromagnetic induction, an alternating current magnetic field is generated from the booster antenna itself. Then, the alternating current magnetic field generated from the booster antenna 1501 goes through the coiled antenna circuit 102 of the power storage device 101, and an electromotive force is generated between terminals (between one terminal of the antenna and the other) of the coiled antenna circuit 102 inside the power storage device 101 by electromagnetic induction. The battery 109 inside the power storage device 101 can be charged by the electromotive force.

Note that in this embodiment mode, power that is stored in the battery is not limited to a radio signal output from the power feeder 201. In addition, it is also possible to employ a structure where a power generation element is supplementarily provided in a part of the battery portion 104 of the power storage device, as shown in FIG. 11 in Embodiment Mode 1. Providing the power generation element is advantageous in that the amount of power supplied for storage in the battery 109 can be increased and the charging rate can be increased.

In this embodiment mode, the structure having the booster antenna shown in FIG. 17 is advantageous in that a communication distance between the power feeder 201 and the power storage device 101 for signal transmission/reception can be increased, and signal exchange can be conducted more surely.

In addition, in the structure shown in FIG. 17, a plurality of antenna circuits and power feeders may be provided like the structure shown in FIG. 12 in Embodiment Mode 1. In that case, by resonating signals from the power feeder 2001 at a particular frequency band in the booster antenna and magnetically coupling the antenna circuit with the booster antenna, signals supplied from the power feeder 201 or other radio signals can be efficiently transmitted to the power storage device 101, which is advantageous. In addition, in the structure shown in FIG. 17, when a plurality of antenna circuits is provided as a first antenna and a second antenna, the booster antenna 1501 may be magnetically coupled not only with the first antenna circuit but with the other antenna, by changing the frequency range that the booster antenna 105 is tuned with.

Note that the operation of charging the battery 109 in the power storage device 101 shown in FIG. 17 by using external radio signals is similar to the operation described in Embodiment Mode 1 with reference to FIG. 2. Therefore, description thereof will be omitted in this embodiment mode.

In addition, the structure and the timing chart of the low-frequency-signal generating circuit in this embodiment mode are similar to those shown in FIGS. 7, 8, and 9 in Embodiment Mode 1. Therefore, description thereof will be omitted in this embodiment mode.

Note also that this embodiment mode may employ a structure with the control circuit which is provided in the power supply control circuit 103 described in Embodiment Mode 2. When the control circuit is provided in this embodiment mode, not only can the advantageous effects of providing the booster antenna be obtained, but also another advantage can be provided in that power consumption of the battery can be reduced more by comparing the power of a signal received at the antenna circuit with the power stored in the battery using the control circuit, and thereby selecting one of the power from the antenna circuit and the power from the battery to be supplied to the power supply circuit.

As described above, in the power storage device of the invention, power consumption can be sufficiently reduced by intermittently supplying power to the load from the battery through the power supply circuit. In addition, when radio signals that are input from outside of the power storage device are received at the antenna circuit and power obtained thereby is stored in the battery of the power storage device, it is not required to regularly supply power to the load from the antenna circuit. Further, by comparing the power of a signal received at the antenna circuit with the power stored in the battery using the control circuit, and thereby selecting one of the power from the antenna circuit and the power from the battery to be supplied to the power supply circuit, further reduction in power consumption can be achieved, which is advantageous.

Note that in this embodiment mode, a booster antenna is provided in addition to the structure of Embodiment Mode 1. Therefore, transmission of radio signals between the power storage device and the power feeder can be conducted more surely, which is advantageous.

Note also that this embodiment mode can be freely implemented in combination with any of the other embodiment modes in this specification.

Embodiment Mode 4

This embodiment mode will describe a structure where a charging management circuit is provided in the power storage device shown in Embodiment Mode 1, with reference to the drawings. Note that in the drawings used in this embodiment mode, parts that are the same as those in Embodiment Mode 1 are denoted by the same reference numerals as those in Embodiment Mode 1.

Note that "charging management circuit" as referred to in this embodiment mode means a circuit that is dedicated to managing the charging/discharging of a battery. When using a battery, it is generally necessary to manage the charging/discharging of the battery. When charging a battery, it is necessary to conduct charging while at the same time monitoring the charged state of the battery in order to prevent overcharging. For the battery used in the invention, a dedicated circuit is necessary when conducting management of charging.

The power storage device in this embodiment mode will be described with reference to the block diagram shown in FIG. 30.

Figure 30:
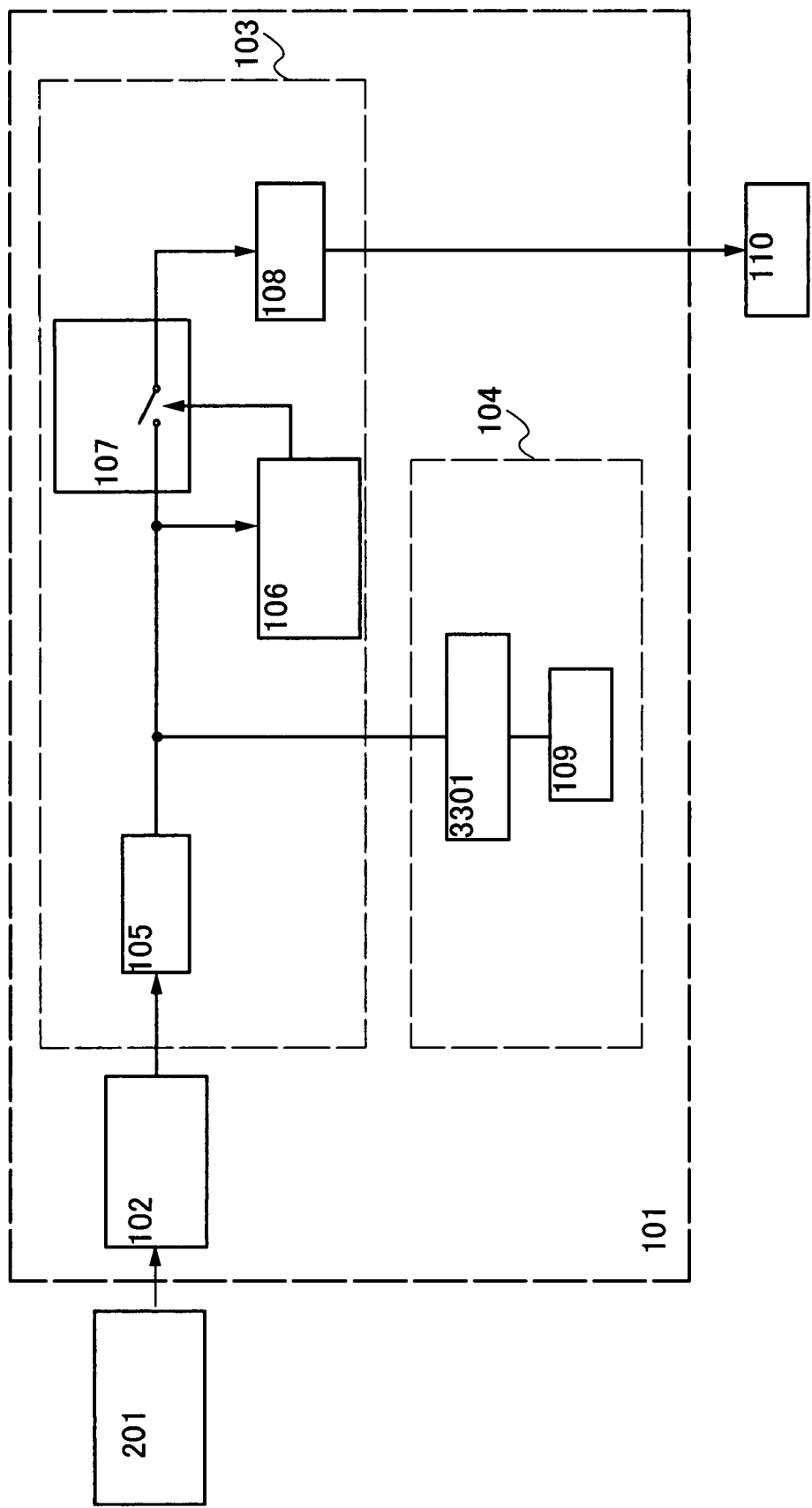
FIG. 30 illustrates a structure of Embodiment Mode 4.

A power storage device in FIG. 30 includes an antenna circuit 102, a power supply control circuit 103, and a battery portion 104. The power supply control circuit 103 includes a rectifier circuit 105, a low-frequency-signal generating circuit 106, a switch circuit 107, and a power supply circuit 108. The battery portion 104 includes a battery 109 and a charging management circuit 3301. Note that the power supply circuit 108 in the power supply control circuit 103 outputs power to a load 110 which is located outside the power storage device 101. The power storage device shown in FIG. 30 differs from the structure in FIG. 2 of Embodiment Mode 1 in that the charging management circuit 3301 is provided between the rectifier circuit 105 and the battery 109.

In the power storage device 101 in FIG. 30, radio signals from the power feeder 201 are received at the antenna circuit 102. In FIG. 30, a signal input to the power supply control circuit 103 from the antenna circuit 102 is input to the power supply circuit 108 through the rectifier circuit 105 and the switch circuit 107. In addition, a signal received at the antenna circuit 102 in FIG. 30 is input to the battery 109 through the rectifier circuit 105 and the charging management circuit 3301, so that the battery 109 is charged.

Note that the antenna circuit 102 may have the structure shown in FIG. 4A in Embodiment Mode 1. In addition, the rectifier circuit 105 may have the structure shown in FIG. 4B in Embodiment Mode 1.

In addition, since the antenna circuit 102 in FIG. 30 is similar to the antenna circuit 102 described in Embodiment Mode 1, description thereof will be omitted.

Note also that in this embodiment mode, power that is stored in the battery is not limited to a radio signal output from the power feeder 201. In addition, it is also possible to employ a structure where a power generation element is supplementarily provided in a part of the battery portion 104 of the power storage device, as shown in FIG. 11 in Embodiment Mode 1. Providing the power generation element is advantageous in that the amount of power supplied for storage in the battery 109 can be increased and the charging rate can be increased.

In addition, in the structure shown in FIG. 30, a plurality of antenna circuits and power feeders may be provided like the structure shown in FIG. 12 in Embodiment Mode 1.

Note that the operation of charging the battery 109 in the power storage device 101 shown in FIG. 30 by using external radio signals is similar to the operation described in Embodiment Mode 1 with reference to FIG. 2. Therefore, description thereof will be omitted in this embodiment mode.

In addition, the structure and the timing chart of the low-frequency-signal generating circuit in this embodiment mode are similar to those shown in FIGS. 7, 8, and 9 in Embodiment Mode 1. Therefore, description thereof will be omitted in this embodiment mode.

Note also that this embodiment mode may employ a structure with the control circuit which is provided in the power supply control circuit 103 described in Embodiment Mode 2. When the control circuit is provided in this embodiment mode, not only can the advantageous effects of providing the booster antenna be obtained, but also another advantage can be provided in that power consumption of the battery can be reduced more by comparing the power of a signal received at the antenna circuit with the power stored in the battery using the control circuit, and thereby selecting one of the power from the antenna circuit and the power from the battery to be supplied to the power supply circuit.

The structure of the charging management circuit 3301 in this embodiment mode will be described, with reference to FIG. 31.

Figure 31:
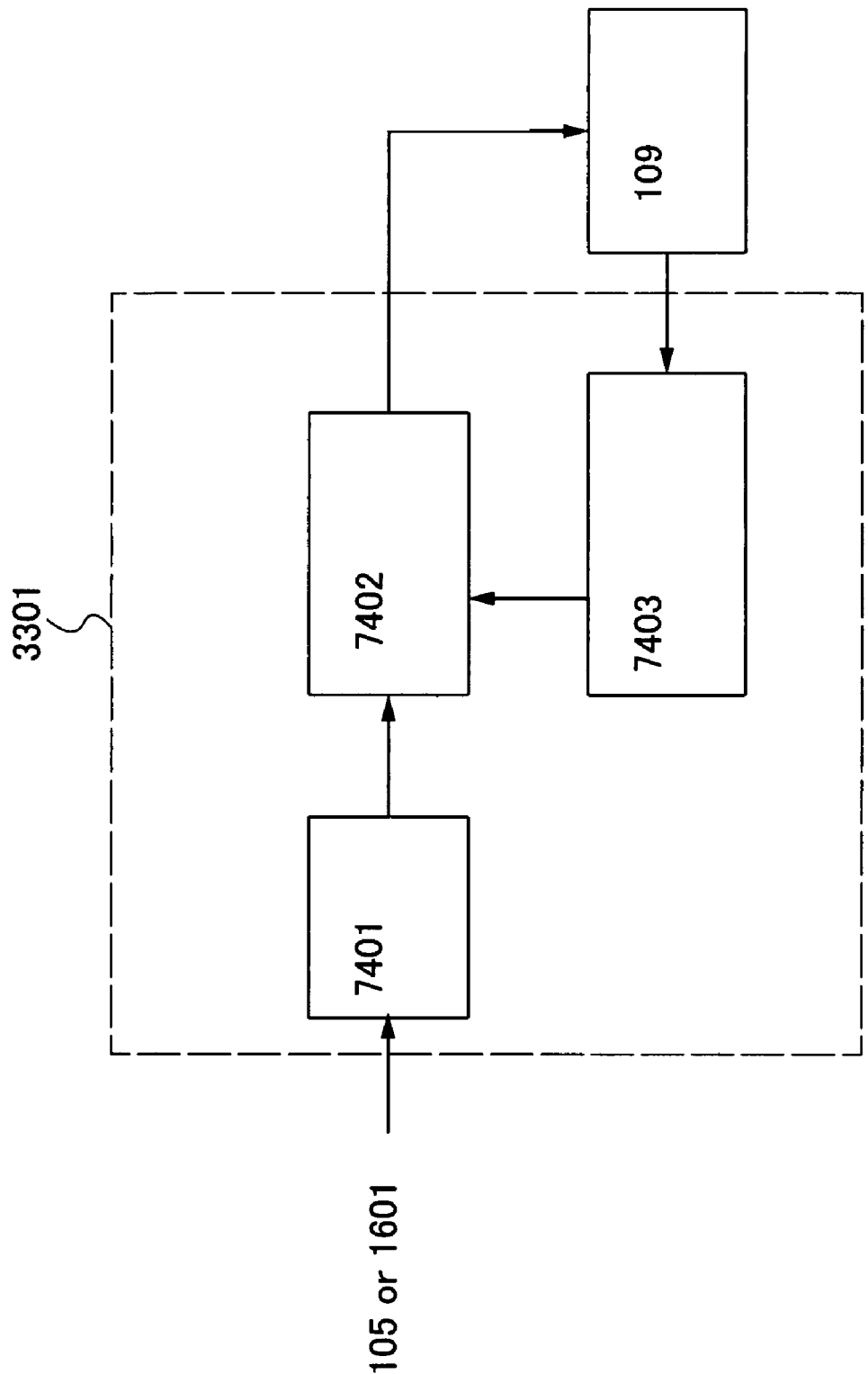
FIG. 31 illustrates a structure of Embodiment Mode 4.

The charging management circuit 3301 shown in FIG. 31 includes a constant current source 7401, a switch circuit 7402, and a charging amount control circuit 7403. Note that the set of the constant current source 7401, the switch circuit 7402, the charging amount control circuit 7403, and the battery 109 correspond to the battery portion 104 shown in FIG. 1 in Embodiment Mode 1. That is, the constant current source 7401 in the charging management circuit 3301 receives a signal from the rectifier circuit 105 in FIG. 1 in Embodiment Mode 1 or a signal from the control circuit 1601 in FIG. 13 in Embodiment Mode 2.

The charging management circuit described in this embodiment mode is only exemplary, and the invention is not limited to the structure. Although the battery is charged with a constant current in this embodiment mode, a power source may be switched at a certain point so that the battery can be charged not only with a constant current but also with a constant voltage. In addition, another method without using a constant current may also be employed. Further, transistors included in the circuits of the block diagram of FIG. 31 which will be described below may be any of thin film transistors, transistors on a single-crystalline substrate, or organic transistors.

Figure 32:
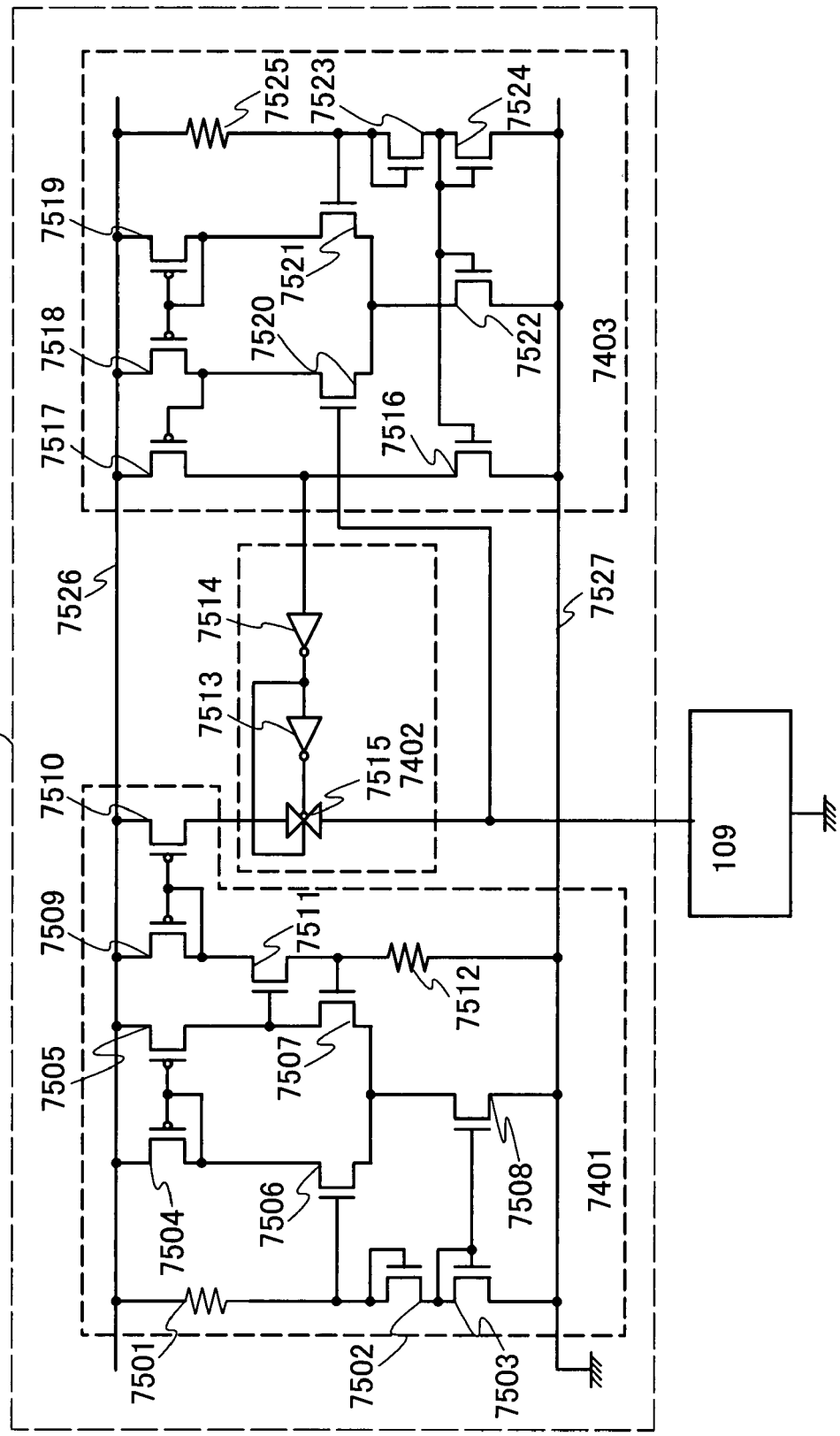
FIG. 32 illustrates a structure of Embodiment Mode 4.

FIG. 32 is a detailed diagram of the block diagram shown in FIG. 31. The operation of the circuit will be described below.

The structure shown in FIG. 32 includes the constant current source 7401, the switch circuit 7402, and the charging amount control circuit 7403. The charging amount control circuit 7403 uses a high potential power supply line 7526 and a low potential power supply line 7527 as power supply lines. In FIG. 32, the low potential power supply line 7527 is used as a GND line. Note that the potential of the low potential power supply line 7527 is not limited to GND, and may be a different potential.

The constant current source 7401 includes transistors 7502 to 7511 and resistors 7501 and 7512. A current flows into the transistors 7502 and 7503 from the high potential power supply line 7526 through the resistor 7501, so that the transistors 7502 and 7503 are turned on.

The transistors 7504 to 7508 constitute a feedback differential amplifier, and the gate potential of the transistor 7502 is almost the same as the gate potential of the transistor 7506. The drain current of the transistor 7511 has a value obtained by dividing a potential difference between the gate potential of the transistor 7507 and the potential of the low potential power supply line 7527 by the resistance value of the resistor 7512. The drain current is input into the current mirror circuit which is constructed from the transistors 7509 and 7510, and an output current of the current mirror circuit is supplied to the switch circuit 7402. The constant current source 7401 is not limited to this structure and a different structure may be used.

The switch circuit 7402 includes a transmission gate 7515 and inverters 7513 and 7514. The input signal of the inverter 7514 controls whether to supply a current to the battery 109 from the constant current source 7401 or not. The switch circuit is not limited to this structure and a different structure may be used.

The charging amount control circuit 7403 includes transistors 7516 to 7524 and a resistor 7525. A current flows into the transistors 7523 and 7524 from the high potential power supply line 7526 through the transistor 7525, so that the transistors 7523 and 7524 are turned on. The transistors 7518 to 7522 constitute a differential comparator. When the gate potential of the transistor 7520 is lower than the gate potential of the transistor 7521, the drain potential of the transistor 7518 has almost the same value as the potential of the high potential power supply line 7526, whereas when the gate potential of the transistor 7520 is higher than the gate potential of the transistor 7521, the drain potential of the transistor 7518 has almost the same value as the source potential of the transistor 7520.

When the drain potential of the transistor 7518 has almost the same value as the potential of the high potential power supply line 7526, the charging amount control circuit 7403 outputs a low-level potential through a buffer which is constructed from the transistors 7516 and 7517.

When the drain potential of the transistor 7518 has almost the same value as the source potential of the transistor 7520, the charging amount control circuit 7403 outputs a high-level potential through the buffer which is constructed from the transistors 7516 and 7517.

When the output of the charging amount control circuit 7403 is low, a current is supplied to the battery 109 through the switch circuit 7402. Meanwhile, when the output of the charging amount control circuit 7403 is high, the switch circuit 7402 is turned off and no current is supplied to the battery 109.

A gate of the transistor 7520 is connected to the battery 109; therefore, when the battery has been charged and the potential of the battery has surpassed the threshold voltage of the comparator of the charging amount control circuit 7403, charging stops. Although the threshold voltage of the comparator in this embodiment mode is set at the gate potential of the transistor 7523, the potential is not limited to this value, and a different potential may be set. The set potential is generally determined in accordance with the intended use of the device and the performance of the battery.

In this embodiment mode, although the charging amount control circuit of the battery is provided in the above manner, the invention is not limited to the structure.

With the above structure, the power storage device of the invention can have a function of managing the charging of the battery 109 in the battery portion 104. Therefore, the power storage device of the invention can be provided as a power storage device which can prevent failures such as overcharging of the battery by the power supply control circuit in the power storage device. In addition, in the power storage device of the invention, power consumption can be sufficiently lowered by intermittently supplying power to the load from the battery through the power supply circuit. In addition, when radio signals that are input from outside of the power storage device are received at the antenna circuit and power obtained thereby is stored in the battery of the power storage device, it is not required to regularly supply power to the load from the antenna circuit. Further, by comparing the power of a signal received at the antenna circuit with the power stored in the battery using the control circuit, and thereby selecting one of the power from the antenna circuit and the power from the battery to be supplied to the power supply circuit, further reduction in power consumption can be achieved, which is advantageous.

Note that this embodiment mode can be freely implemented in combination with any of the other embodiment modes in this specification.

Embodiment 1

Note that "battery" as referred to in this specification means a battery whose continuous operating time can be restored by charging. Further, as a battery, a battery formed in a sheet-like form is preferably used. For example, by using a lithium battery, preferably a lithium polymer battery that uses a gel electrolyte, a lithium ion battery, or the like, miniaturization is possible. Needless to say, any battery may be used as long as it is chargeable. For example, a battery that is chargeable and dischargeable such as a nickel metal hydride battery and a nickel cadmium battery may be used. Alternatively, a high-capacity capacitor or the like may be used.

This embodiment will describe a lithium ion battery as an example of a battery. Lithium ion batteries are widely used because of their advantageous properties such that they have no memory effects and can discharge a large amount of current unlike nickel-cadmium batteries, lead batteries, and the like. In recent years, research has been focused on forming thin lithium ion batteries, and there have been thin lithium ion batteries that are formed to a thickness of 1 µm to several µm (hereinafter referred to as thin-film secondary batteries). When such a thin-film secondary battery is attached to an RFID and the like, the battery can be utilized as a flexible secondary battery.

Figure 33:
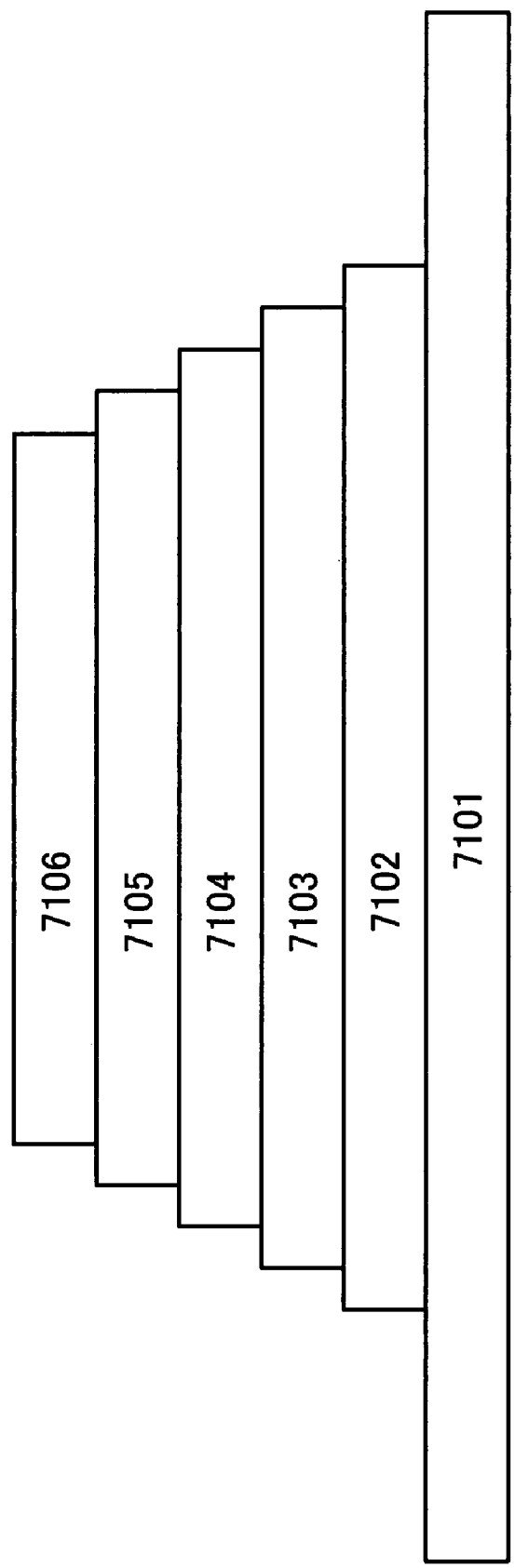
FIG. 33 illustrates a structure of Embodiment 1.

FIG. 33 illustrates an example of a thin-film secondary battery that can be used as a battery of the invention. The example shown in FIG. 33 exemplarily illustrates a cross-section of a thin lithium ion battery.

A stacked structure in FIG. 33 will be described. A current-collecting thin film 7102 to serve as an electrode is formed over a substrate 7101 in FIG. 33. The current-collecting thin film 7102 is required to have high adhesion to a negative electrode active material layer 7103 and also have low resistance. For example, aluminum, copper, nickel, vanadium, or the like can be used. Next, the negative electrode active material layer 7103 is formed over the current-collecting thin film 7102. Generally, vanadium oxide ($V_2O_5$) or the like is used. Next, a solid electrolyte layer 7104 is formed over the negative electrode active material layer 7103. Generally, lithium phosphate ($Li_3PO_4$) or the like is used. Next, a positive electrode active material layer 7105 is formed over the solid electrolyte layer 7104. Generally, lithium manganate ($LiMn_2O_4$) or the like is used. Lithium cobaltate ($LiCoO_2$) or lithium nickel oxide ($LiNiO_2$) can also be used. Next, a current-collecting thin film 7106 to serve as an electrode is formed over the positive electrode active material layer 7105. The current-collecting thin film 7106 is required to have high adhesion to the positive electrode active material layer 7105 and also have low resistance. For example, aluminum, copper, nickel, vanadium, or the like can be used.

Each of the above thin layers of the current-collecting thin film 7102, the negative electrode active material layer 7103, the solid electrolyte layer 7104, the positive electrode active material layer 7105, and the current-collecting thin film 7106 may be formed by using a sputtering technique or a vapor-deposition technique. In addition, each thickness of the current-collecting thin film 7102, the negative electrode active material layer 7103, the solid electrolyte layer 7104, the positive electrode active material layer 7105, and the current-collecting thin film 7106 is preferably 0.1 to 3 µm.

Next, the operation in charging and discharging the battery will be described. In charging the battery, lithium ions are desorbed from the positive electrode active material layer 7105. Then, the lithium ions are absorbed into the negative electrode active material layer 7103 through the solid electrolyte layer 7104. At this time, electrons are released to outside from the positive electrode active material layer 7105.

In discharging the battery, on the other hand, lithium ions are desorbed from the negative electrode active material layer 7103. Then, the lithium ions are absorbed into the positive electrode active material layer 7105 through the solid electrolyte layer 7104. At this time, electrons are released to outside from the negative electrode active material layer 7103. The thin-film secondary battery operates in this manner.

Note that it is preferable to stack another set of thin layers of the current-collecting thin film 7102, the negative electrode active material layer 7103, the solid electrolyte layer 7104, the positive electrode active material layer 7105, and the current-collecting thin film 7106, because higher power can be stored in or released from the battery with such a structure.

By forming a thin-film secondary battery in the above manner, a battery in a sheet-form that is chargeable and dischargeable can be provided.

This embodiment can be freely implemented in combination with any of the other embodiment modes and embodiments in this specification. That is, by regularly charging a battery, shortage of power due to deterioration of the battery over time can be prevented unlike the conventional device. In addition, in the power storage device of the invention, battery charging is performed by using power of a radio signal that is received at the antenna circuit. Therefore, the battery can be charged without being directly connected to a battery charger, but by utilizing the power of electromagnetic waves from outside as the power source for driving an RFID.

In addition to the above advantages obtained by providing the battery in the power storage device of the invention, a switch circuit is provided in the power supply control circuit, so that the power supply to the load is regularly controlled. By controlling the power supply to the load using the switch circuit provided in the power supply control circuit, the power supply to the load can be conducted intermittently. Therefore, reduction in power consumption of the battery can be achieved, and further, the load can be operated for a long time even when there is no power supply via radio signals.

Embodiment 2

This embodiment will describe an example of a method for manufacturing the power storage device shown in the above embodiment modes. In this embodiment, a structure where an antenna circuit, a power supply control circuit, and a battery are formed over the same substrate will be described. Note that when an antenna circuit, a power supply control circuit, and a battery are formed over the same substrate, and also when thin film transistors are used as the transistors included in the power supply control circuit, reduction in size of the power storage device can be achieved, which is advantageous. In addition, in this embodiment, an example is described where the thin-film secondary battery described in the preceding embodiment is used as the battery included in the power storage device.

Note that an antenna circuit in this embodiment will be simply referred to as an antenna because only the shape and the attachment position of the antenna circuit which has been described in the above embodiment mode will be described.

First, a peeling layer 1303 is formed over one surface of a substrate 1301 with an insulating film 1302 interposed therebetween, and then an insulating film 1304 functioning as a base film and a semiconductor film (e.g., a film containing amorphous silicon) 1305 are formed thereover (see FIG. 18A). Note that the insulating film 1302, the peeling layer 1303, the insulating film 1304, and the semiconductor film 1305 can be formed consecutively.

The substrate 1301 is selected from among a glass substrate, a quartz substrate, a metal substrate (e.g., a ceramic substrate or a stainless steel substrate), a semiconductor substrate such as a Si substrate, or the like. Alternatively, a plastic substrate made of polyethylene terephthalate (PET), polyethylene naphthalate (PEN), polyether sulfone (PES), acrylic, or the like can be used. In the step shown in FIG. 18A, although the peeling layer 1303 is provided over the entire surface of the substrate 1301 with the insulating film 1302 interposed therebetween, it is also possible to provide a peeling layer over the entire surface of the substrate 1301 and selectively pattern the peeling layer by photolithography and etching.

The insulating films 1302 and 1304 are formed using an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when each of the insulating films 1302 and 1304 is formed to have a two-layer structure, it is preferable to form a silicon nitride oxide film as a first insulating film and form a silicon oxynitride film as a second insulating film. In addition, it is also possible to form a silicon nitride film as a first insulating film and form a silicon oxide film as a second insulating film. The insulating film 1302 functions as a blocking layer which prevents an impurity element contained in the substrate 1301 from being mixed into the peeling layer 1303 or elements formed thereover. The insulating film 1304 functions as a blocking layer which prevents an impurity element contained in the substrate 1301 or the peeling layer 1303 from being mixed into elements formed over the insulating film 1304. In this manner, providing the insulating films 1302 and 1304 which function as the blocking layers can prevent adverse effects on the elements formed over the peeling layer 1303 or the insulating film 1304, which would otherwise be caused by an alkaline metal such as Na or an alkaline earth metal contained in the substrate 1301 or by the impurity element contained in the peeling layer 1303. Note that when quartz is used for the substrate 1301, for example, the insulating films 1302 and 1304 may be omitted.

The peeling layer 1303 may be formed using a metal film or a stacked structure of a metal film and a metal oxide film. As a metal film, either a single layer or stacked layers are formed using an element selected from among tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rb), palladium (Pd), osmium (Os), and iridium (Ir), or an alloy material or a compound material containing such an element as a main component. In addition, such materials can be deposited by a sputtering method, various CVD methods such as a plasma CVD method, or the like. A stacked structure or a metal film and a metal oxide film can be obtained by the steps of forming the above-described metal film, applying plasma treatment thereto under an oxygen atmosphere or an $N_2O$ atmosphere or applying thermal treatment thereto under an oxygen atmosphere or an $N_2O$ atmosphere, and thereby forming oxide or oxynitride or the metal film on the metal film. For example, when a tungsten film is provided as a metal film by a sputtering method, a CVD method, or the like, a metal oxide film made of tungsten oxide can be formed on the surface of the tungsten film. In that case, the tungsten oxide can be represented by $WO_x$ where x is in the range of 2 to 3. For example, there are cases where x is 2 ($WO_2$), x is 2.5 ($W_2O_5$), x is 2.75 ($W_4O_{11}$), x is 3 ($WO_3$), and the like. When forming tungsten oxide, there is no particular limitation on the value of x, and thus which of the above oxides is to be formed may be determined base on the etching rate of the like. In addition, high-density-plasma treatment may be applied as the plasma treatment, for example. Besides the metal oxide film, metal nitride or metal oxynitride may also be formed. In that case, plasma treatment or thermal treatment may be applied to the metal film under a nitrogen atmosphere or an atmosphere containing nitrogen and oxygen.

The amorphous semiconductor film 1305 is formed to a thickness of 25 to 200 nm (preferably, 30 to 150 nm) by a sputtering method, an LPCVD method, a plasma CVD method, or the like.

Next, the amorphous semiconductor film 1305 is crystallized by laser irradiation. Note that the crystallization of the amorphous semiconductor film 1305 may also be conducted by a method combining the laser crystallization with a thermal crystallization method using RTA or an annealing furnace or with a thermal crystallization method using a metal element which promotes the crystallization. After that, the crystallized semiconductor film is etched into desired shapes, whereby crystalline semiconductor films 1305a to 1305f are formed. Then, a gate insulating film 1306 is formed so as to cover the semiconductor films 1305a to 1305f (see FIG. 18B).

The gate insulating film 1306 is formed using an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. For example, when the gate insulating film 1306 is formed to have a two-layer structure, it is preferable to form a silicon oxynitride film as a first insulating film and form a silicon nitride oxide film as a second insulating film. Alternatively, it is also possible to form a silicon oxide film as a first insulating film and form a silicon nitride film as a second insulating film.

An example of a manufacturing process of the crystalline semiconductor films 1305a to 1305f will be briefly described below. First, an amorphous semiconductor film with a thickness of 50 to 60 nm is formed by a plasma CVD method. Then, a solution containing nickel which is a metal element for promoting crystallization is retained on the amorphous semiconductor film, which is followed by dehydrogenation treatment (500° C. for one hour) and thermal treatment (550° C. for four hours). Thus, a crystalline semiconductor film is formed. Then, the crystalline semiconductor film is irradiated with laser light by a photolithography method and etched, whereby the crystalline semiconductor films 1305a to 1305f are formed. Note that crystallization of the amorphous semiconductor film may be conducted only by using laser crystallization, not using thermal crystallization which uses a metal element for promoting crystallization.

As a laser oscillator used for crystallization, either a continuous wave laser (a CW laser) or a pulsed laser can be used. As a laser that can be used here, there are gas lasers such as an Ar laser, a Kr laser, and an excimer laser; a laser in which single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ is doped with one or more laser media selected from among Nd, Yb, Cr, Ti, Ho, Er, Tm, and Ta as dopant; a glass laser; a ruby laser; an alexandrite laser; a Ti:sapphire laser; a copper vapor laser; and a metal vapor laser. When irradiation is conducted with the fundamental wave of such a laser beam or the second to fourth harmonics of the fundamental wave, crystals with a large grain size can be obtained. For example, the second harmonic (532 nm) or the third harmonic (355 nm) of an Nd:YVO$_4$ laser (the fundamental wave of 1064 nm) can be used. In this case, a laser power density of about 0.01 to 100 MW/cm$^2$ (preferably, 0.1 to 10 MW/cm$^2$) is required, and irradiation is conducted with a scanning rate of about 10 to 2000 cm/sec. Note that the laser in which single-crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ is doped with one or more laser media selected from among Nd, Yb, Cr, Ti, Ho, Er, Tm, and Ta as dopant; an Ar laser, or a Ti:sapphire laser can be used as a CW laser, whereas they can also be used as pulsed laser with a repetition rate of 10 MHz or more by being combined with a Q-switch operation or mode locking. When a laser beam with a repetition rate of 10 MHz or more is used, it is possible for a semiconductor film to be irradiated with the next pulse after it is melted by the previous laser but before it becomes solidified. Therefore, unlike the case of using a pulsed laser with a low repetition rate, a solid-liquid interface in the semiconductor film can be continuously moved. Thus, crystal grains which have grown continuously in the scanning direction can be obtained.

The gate insulating film 1306 can be formed by oxidizing or nitriding the surfaces of the semiconductor films 1305a to 1305f by the above-described high-density-plasma treatment. For example, plasma treatment with a mixed gas of a rare gas such as He, Ar, Kr, or Xe, and oxygen, nitrogen oxide (NO$_2$), ammonia, nitrogen, or hydrogen is used. When plasma is excited by the introduction of microwaves, plasma with a low electron temperature and a high electron density can be generated. With oxygen radicals (which may include OH radicals) or nitrogen radicals (which may include NH radicals) which are produced by the high-density plasma, the surfaces of the semiconductor films can be oxidized or nitrided.

By such high-density-plasma treatment, an insulating film with a thickness of 1 to 20 nm, typically 5 to 10 nm, is formed on the semiconductor films. Since the reaction in this case is a solid-phase reaction, interface state density between the insulating film and the semiconductor films can be quite low. Since such high-density-plasma treatment directly oxidizes (or nitrides) semiconductor films (crystalline silicon or polycrystalline silicon), the insulating film can be formed to have a uniform thickness, which is ideal. In addition, since crystal grain boundaries of crystalline silicon are not strongly oxidized, an excellent state results. That is, by the solid-phase oxidation of the surfaces of the semiconductor films by high-density-plasma treatment which is shown in this embodiment mode, an insulating film with a uniform thickness and low interface state density can be formed without excessive oxidation at the crystal grain boundaries.

As the gate insulating film, only an insulating film formed by high-density-plasma treatment may be used, or it is also possible to use stacked layers which are obtained by depositing an insulating film such as silicon oxide, silicon oxynitride, or silicon nitride on the insulating film by a CVD method using plasma or thermal reaction. In either case, a transistor which includes an insulating film formed by high-density-plasma treatment in a part or the whole of its gate insulating film can have small characteristic variations.

In addition, the semiconductor films 1305a to 1305f, which are obtained by crystallizing the original semiconductor film by scanning in one direction along with the irradiation with CW laser beams or pulsed laser beams with a repetition of 10 MHz or more, have a characteristic in that their crystals have grown in the beam scanning direction. When a transistor is arranged so that its channel length direction (direction in which carriers move when a channel formation region is formed) is aligned with the scan direction, and the above-described gate insulating layer is combined with the semiconductor film, a thin film transistor (TFTs) with high electron field-effect mobility and few variations in characteristics can be obtained.

Next, a first conductive film and a second conductive film are stacked over the gate insulating film 1306. Here, the first conductive film is formed to a thickness of 20 to 100 nm by a CVD method, a sputtering method, or the like. The second conductive film is formed to a thickness of 100 to 400 nm. The first conductive film and the second conductive film are formed with an element selected from among tantalum (Ta), tungsten (W), titanium (Ti), molybdenum (Mo), aluminum (Al), copper (Cu), chromium (Cr), niobium (Nb), or the like, or an alloy material or a compound material containing such an element as a main component. Alternatively, the first conductive film and the second conductive are formed with a semiconductor material typified by polycrystalline silicon doped with an impurity element such as phosphorus. As a combination example of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance. Therefore, after forming the first conductive film and the second conductive film using tungsten and tantalum nitride, thermal treatment can be applied thereto for the purpose of thermal activation. In addition, in the case where a two-layer structure is not employed, but a three-layer structure is employed, it is preferable to use a stacked structure of a molybdenum film, an aluminum film, and a molybdenum film.

Next, a resist mask is formed by a photolithography method, and etching treatment for forming gate electrodes and gate lines is applied. Thus, gate electrodes 1307 are formed above the semiconductor films 1305a to 1305f. Here, a stacked structure of a first conductive film 1307a and a second conductive film 1307b is shown as an example of the gate electrode 1307.

Next, the semiconductor films 1305a, 1305b, 1305d, and 1305f are doped with an n-type impurity element at a low concentration, using the gate electrodes 1307 masks by an ion doping method or an ion implantation method. Then, a resist mask is selectively formed by a photolithography method, and the semiconductor films 1305c and 1305e are doped with a p-type impurity element at a high concentration. As an n-type impurity element, phosphorus (P), arsenic (As), or the like can be used. As a p-type impurity element, boron (B), aluminum (Al), gallium (Ga), or the like can be used. Here, phosphorus (P) is used as an n-type impurity element and is selectively introduced into the semiconductor films 1305a, 1305b, 1305d, and 1305f such that they contain phosphorus at a concentration of $1\times10^{15}$ to $1\times10^{19}$/cm$^3$. Thus, n-type impurity regions 1308 are formed. In addition, boron (B) is used as a p-type impurity element, and is selectively introduced into the semiconductor films 1305c and 1305e such that they contain boron at a concentration of $1\times10^{19}$ to $1\times10^{20}$/cm$^3$. Thus, n-type impurity regions 1309 are formed (see FIG. 18C).

Next, an insulating film is formed so as to cover the gate insulating film 1306 and the gate electrodes 1307. The insulating film is formed to have either a single layer or stacked layers by depositing a film containing an inorganic material such as silicon, silicon oxide, or silicon nitride, or a film containing an organic material such as an organic resin by a plasma CVD method, a sputtering method, or the like. Next, the insulating film is selectively etched by anisotropic etching (mainly in the perpendicular direction), so that insulating films 1310 (also referred to as sidewalls) having a contact with the side surfaces of the gate electrodes 1307 are formed. The insulating films 1310 are used as doping masks for forming LDD (Lightly Doped Drain) regions.

Next, the semiconductor films 1305a, 1305b, 1305d, and 1305f are doped with an n-type impurity element at a high concentration, using the gate electrodes 1307 and the insulating films 1310 as masks. Thus, n-type impurity regions 1311 are formed. Here, phosphorus (P) is used as an n-type impurity element, and is selectively introduced into the semiconductor films 1305a, 1305b, 1305d, and 1305f such that they contain phosphorus at a concentration of $1\times10^{19}$ to $1\times10^{20}$/cm$^3$. Thus, the n-type impurity regions 1311 with a higher concentration of impurity than that of the impurity regions 1308 are formed.

Through the above steps, n-channel transistors 1300a, 1300b, 1300d, and 1300f; and p-channel thin film transistors 1300c and 1300e are formed (see FIG. 18D).

In the n-channel thin film transistor 1300a, a channel formation region is formed in a region of the semiconductor film 1305a which overlaps with the gate electrode 1307; the impurity region 1311 which forms a source or drain region is formed in a region of the semiconductor film 1305a which does not overlap with the gate electrode 1307 and the insulating film 1310; and a low concentration impurity region (LDD region: Lightly Doped Drain region) is formed in a region of the semiconductor film 1305a which overlaps with the insulating film 1310 and between the channel formation region and the impurity region 1311. Similarly, channel formation regions, low concentration impurity regions, and the impurity regions 1311 are formed in the n-channel thin film transistors 1300b, 1300d, and 1300f.

In the p-channel thin film transistor 1300c, a channel formation region is formed in a region of the semiconductor film 1305c which overlaps with the gate electrode 1307, and the impurity region 1309 which forms a source or drain region is formed in a region of the semiconductor film 1305c which does not overlap with the gate electrode 1307. Similarly, a channel formation region and the impurity region 1309 are formed in the p-channel thin film transistor 1300e. Here, although LDD regions are not formed in the p-channel thin film transistors 1300c and 1300e, LDD regions may be provided in the p-channel thin film transistors or a structure without LDD regions may be applied to the n-channel thin film transistors.

Next, an insulating film with a single layer or stacked layers is formed so as to cover the semiconductor films 1305a to 1305f, the gate electrodes 1307, and the like. Then, conductive films 1313 electrically connected to the impurity regions 1309 and 1311 which form the source and drain regions of the thin film transistors 1300a to 1300f are formed over the insulating film (see FIG. 19A). The insulating film is formed either in a single layer or in stacked layers, using an inorganic material such as silicon oxide or silicon nitride, an organic material such as polyimide, polyamide, benzocyclobutene, acrylic, or epoxy, a siloxane material, or the like by a CVD method, a sputtering method, a SOG method, a droplet discharge method, a screen printing method, or the like. Here, the insulating film is formed to have two layers such that a silicon nitride oxide film is formed as a first insulating film 1312a and a silicon oxynitride film is formed as a second insulating film 1312b. In addition, the conductive films 1313 can form the source and drain electrodes of the thin film transistors 1300a to 1300f.

Note that before the insulating films 1312a and 1312b are formed or after one or both of them is/are formed, thermal treatment is preferably applied for recovery of the crystallinity of the semiconductor films, activation of the impurity element which has been added into the semiconductor films, or hydrogenation of the semiconductor films. As the thermal treatment, thermal, annealing, laser annealing, RTA, or the like is preferably applied.

The conductive films 1313 are formed either in a single layer or in stacked layers of an element selected from among aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing such an element as a main component. An alloy material containing aluminum as a main component corresponds to, for example, a material which contains aluminum as a main component and also contains nickel, or a material which contains aluminum as a main component and also contains nickel and one or both of carbon and silicon. The conductive films 1313 are preferably formed to have a stacked structure of a barrier film, an aluminum-silicon (Al—Si) film, and a barrier film or a stacked structure of a barrier film, an aluminum silicon (Al—Si) film, a titanium nitride (TiN) film, and a barrier film. Note that "barrier film" corresponds to a thin film made of titanium, titanium nitride, molybdenum, or molybdenum nitride. Aluminum and aluminum silicon, which have high resistance values and are inexpensive, are the most suitable material for forming the conductive films 1313. When barrier layers are provided in the top layer and the bottom layer, generation of hillocks of aluminum or aluminum silicon can be prevented. In addition, when a barrier film made of titanium which is an element having a high reducing property is formed, even when there is a thin natural oxide film formed on the crystalline semiconductor film, the natural oxide film can be chemically reduced, and a favorable contact between the conductive film 1313 and the crystalline semiconductor film can be obtained.

Next, an insulating film 1314 is formed so as to cover the conductive films 1313, and conductive films 1315a and 1315b electrically connected to the conductive films 1313 which form the source electrode or the drain electrode of the thin film transistors 1300a and 1300f are formed. In addition, a conductive film 1316 electrically connected to the conductive film 1313 which forms the source electrode or the drain electrode of the thin film transistor 1300b is formed. Note that the conductive films 1315a and 1315b and the conductive film 1316 may be formed using the same material. The conductive films 1315a and 1315b and the conductive film 1316 may be formed using any material which has been described for the conductive film 1313 above.

Next, a conductive film 1317 functioning as an antenna is formed to be electrically connected to the conductive film 1316 (see FIG. 19B).

The insulating film 1314 can be provided either in a single layer or in stacked layers, using an insulating film containing oxygen or nitrogen such as silicon oxide ($SiO_x$), silicon nitride ($SiN_x$), silicon oxynitride ($SiO_xN_y$ where x>y>0), or silicon nitride oxide ($SiN_xO_y$ where x>y>0); a film containing carbon such as DLC (Diamond-Like Carbon); an organic material such as epoxy, polyimide, polyamide, polyvinyl phenol, benzocyclobutene, or acrylic; a siloxane material containing a siloxane resin; or the like. Note that a siloxane material corresponds to a material having the bond of Si—O—Si. Siloxane has a skeletal structure with the bond of silicon (Si) and oxygen (O). As a substitutent of siloxane, an organic group containing at least hydrogen (e.g., an alkyl group or aromatic hydrocarbon) is used. Alternatively, a fluoro group may be used as the substitutent, or both a fluoro group and an organic group containing at least hydrogen may be used as the substitutent.

The conductive film 1317 can be formed with a conductive material by a CVD method, a sputtering method, a printing method such as screen printing or gravure printing, a droplet discharge method, a dispensing method, a plating method, or the like. The conductive material can be deposited either in a single layer or in stacked layers, using an element selected from among aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing such an element as a main component.

For example, when the conductive film 1317 functioning as the antenna is formed by a screen printing method, the antenna can be provided by selectively printing a conductive paste in which conductive particles with a particle size of several nm to several tens of μm are dissolved or dispersed in an organic resin. The conductive particles can be at least one of metal particles selected from among silver (Ag), gold (Ag), copper (Cu), nickel (Ni), platinum (Pt), palladium (Pd), tantalum (Ta), molybdenum (Mo), and titanium (Ti); fine particles of silver halide; and dispersive nanoparticles. In addition, the organic resin included in the conductive paste can be one or more of organic resins which function as a binder, a solvent, a dispersing agent, and a coating material for the metal particles. Typically, an organic resin such as an epoxy resin and a silicone resin can be given as examples. In addition, it is preferable to form the conductive film by the steps of extruding a conductive paste and baking it. For example, in the case of using fine particles (e.g., a particle size of 1 to 100 nm) containing silver as a main component as a material of the conductive paste, a conductive film can be obtained by baking and hardening the conductive paste at temperatures in the range of 150 to 300° C. Alternatively, it is also possible to use fine particles containing solder or lead-free solder as a main component. In that case, fine particles with a particle size of 20 μm or less are preferably used. Solder and lead-free solder have the advantage of low cost.

The conductive films 1315a and 1315b can function as wirings which are electrically connected to the battery included in the power storage device of the invention in a later step. In addition, in forming the conductive film 1317 which functions as the antenna, it is also possible to separately form another set of conductive films so as to be electrically connected to the conductive films 1315a and 1315b, so that the conductive films can be utilized as the wirings connected to the battery included in the power storage device of the invention.

Next, after forming an insulating film 1318 so as to cover the conductive film 1317, layers including the thin film transistors 1300a to 1300f, the conductive film 1317, and the like (hereinafter referred to as an "element formation layer 1319") are peeled off the substrate 1301. Here, after forming openings in the element formation layer 1319 excluding the region of the thin film transistors 1300a to 1300f by laser irradiation (e.g., UV light), the element formation layer 1319 can be peeled off the substrate 1301 with a physical force. It is also possible to selectively remove the peeling layer 1303 by introducing an etchant into the openings before peeling the element formation layer 1319 off the substrate 1301. As the etchant, a gas or a liquid containing halogen fluoride or an interhalogen compound is used. For example, when chlorine trifluoride ($ClF_3$) is used as the gas containing halogen fluoride, the element formation layer 1319 can be peeled off the substrate 1301. Note that the peeling layer 1301 may be partially kept remained without being entirely removed. Accordingly, the consumption of the etchant can be suppressed and a process time required for removing the peeling layer can be shortened. In addition, even after removing the peeling layer 1301, the element formation layer 1319 can be held above the substrate 1301. In addition, by reusing the substrate 1301 which the element formation layer 1319 has been peeled off, cost reduction can be achieved.

The insulating film 1318 can be formed either in a single layer or in stacked layers, using an insulating film containing oxygen or nitrogen such as silicon oxide ($SiO_x$), silicon nitride ($SiN_x$), silicon oxynitride ($SiO_xN_y$ where x>y>0), or silicon nitride oxide ($SiN_xO_y$ where x>y>0); a film containing carbon such as DLC (Diamond-Like Carbon); an organic material such as epoxy, polyimide, polyamide, polyvinyl phenol, benzocyclobutene, or acrylic; a siloxane material containing a siloxane resin; or the like by a CVD method, a sputtering method, or the like.

In this embodiment, after forming the openings in the element formation layer 1319 by laser irradiation, a first sheet material 1320 is attached to one surface of the element formation layer 1319 (the surface where the insulating film 1318 is exposed), and then the element formation layer 1319 is peeled off the substrate 1301 (see FIG. 20A).

Next, a second sheet material 1321 is attached to the other surface of the element formation layer 1319 (the surface exposed by peeling), followed by one or both of thermal treatment and pressurization treatment so that the second sheet material 1321 is tightly fixed (see FIG. 20B). As the first sheet material 1320 and the second sheet material 1321, hot-melt films and the like can be used.

As the first sheet material 1320 and the second sheet material 1321, a film on which antistatic treatment for preventing static electricity or the like has been applied (hereinafter referred to as an antistatic film) can be used. As examples of the antistatic film, a film in which an antistatic material is dispersed in a resin, a film to which an antistatic material is attached, and the like can be given. The film provided with an antistatic material can be a film with an antistatic material provided over one of its surfaces, or a film with an antistatic material provided over each of its surfaces. Concerning the film with an antistatic material provided over one of its surfaces, the film may be attached to the element formation layer 1319 so that the antistatic material is placed on the inner side of the film or the outer side of the film. The antistatic material may be provided over the entire surface of the film, or over a part of the film. As an antistatic material, a metal, indium tin oxide (ITO), or a surfactant such as an amphoteric surfactant, a cationic surfactant, or a nonionic surfactant can be used. In addition, as an antistatic material, a resin material which contains a cross-linked copolymer having a carboxyl group and a quaternary ammonium base on its side chain, or the like can be used. By attaching, mixing, or applying such a material to a film, an antistatic film can be formed. By sealing the element formation layer 1319 using the antistatic film, the semiconductor elements can be prevented from adverse effects such as external static electricity when dealt with as a commercial product.

Note that the thin-film secondary battery shown in Embodiment 1 is connected as the battery to the conductive films 1315a and 1315b. Connection between the battery and the conductive films 1315a and 1315b may be conducted before the element formation layer 1319 is peeled off the substrate 1301 (at the stage shown in FIG. 19B or FIG. 19C), after the element formation layer 1319 is peeled off the substrate 1301 (at the stage shown in FIG. 20A), or after the element formation layer 1319 is sealed with the first sheet material and the second sheet material (at the stage shown in FIG. 20B). An example where the element formation layer 1319 and the battery are formed to be connected will be described below with reference to FIGS. 21A to 22B.

Referring to FIG. 19B, conductive films 1331a and 1331b which are electrically connected to the conductive films 1315a and 1315b, respectively are formed at the same time as the conductive film 1317 which functions as the antenna. Then, the insulating film 1318 is formed so as to cover the conductive films 1317, 1331a, and 1331b, followed by formation of openings 1332a and 1332b in the insulating film 1318 such that the surfaces of the conductive films 1331a and 1331b are exposed. After that, openings are formed in the element formation layer 1319 by laser irradiation, and the first sheet material 1320 is attached to one surface of the element formation layer 1319 (the surface where the insulating film 1318 is exposed), so that the element formation layer 1319 is peeled off the substrate 1301 (see FIG. 21A).

Next, the second sheet material 1321 is attached to the other surface of the element formation layer 1319 (the surface exposed by peeling), and the element formation layer 1319 is peeled off the first sheet material 1320. Therefore, a material with low viscosity is used as the first sheet material 1320. Then, conductive films 1334a and 1334b which are electrically connected to the conductive films 1331a and 1331b respectively through the openings 1332a and 1332b are selectively formed (see FIG. 21B).

The conductive films 1334a and 1334b are formed with a conductive material by a CVD method, a sputtering method, a printing method such as screen printing or gravure printing, a droplet discharge method, a dispensing method, a plating method, or the like. The conductive material can be deposited either in a single layer or in stacked layers, using an element selected from among aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing such an element as a main component.

Note that although the example shown herein is the case where the conductive films 1334a and 1334b are formed after peeling the element formation layer 1319 off the substrate 1301, the formation of the conductive films 1334a and 1334b may precede the peeling of the element formation layer 1319 off the substrate 1301.

Next, in the case where a plurality of elements is formed over the substrate, the element formation layer 1319 is cut into individual elements (see FIG. 22A). A laser irradiation apparatus, a dicing apparatus, a scribing apparatus, or the like can be used for the cutting. Here, the plurality of elements formed over one substrate is separated from one another by laser irradiation.

Next, the separated elements are electrically connected to the battery (see FIG. 22B). In this embodiment mode, the thin-film secondary battery shown in Embodiment 1 is used as the battery, in which a current-collecting thin film, a negative electrode active material layer, a solid electrolyte layer, a positive electrode active material layer, and a current-collecting thin film are sequentially stacked.

Conductive films 1336a and 1336b are formed with a conductive material by a CVD method, a sputtering method, a printing method such as screen printing or gravure printing, a droplet discharge method, a dispensing method, a plating method, or the like. The conductive material can be deposited either in a single layer or in stacked layers, using an element selected from among aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing such an element as a main component. Note that the conductive films 1336a and 1336b correspond to the current-collecting thin film 7102 shown in Embodiment 1. Therefore, the conductive material is required to have high adhesion to a negative electrode active material layer and also have low resistance. In particular, aluminum, copper, nickel, vanadium, or the like is preferably used.

The structure of the thin-film secondary battery will be described next. A negative electrode active material layer 1381 is formed over the conductive film 1336a. Generally, vanadium oxide ($V_2O_5$) or the like is used. Next, a solid electrolyte layer 1382 is formed over the negative electrode active material layer 1381. Generally, lithium phosphate ($Li_3PO_4$) or the like is used. Next, a positive electrode active material layer 1383 is formed over the solid electrolyte layer 1382. Generally, lithium manganate ($LiMn_2O_4$) or the like is used. Lithium cobaltate ($LiCoO_2$) or lithium nickel oxide ($LiNiO_2$) can also be used. Next, a current-collecting thin film 1384 to serve as an electrode is formed over the positive electrode active material layer 1383. The current-collecting thin film 1384 is required to have high adhesion to the positive electrode active material layer 1383 and also have low resistance. For example, aluminum, copper, nickel, vanadium, or the like can be used.

Each of the above thin layers of the negative electrode active material layer 1381, the solid electrolyte layer 1382, the positive electrode active material layer 1383, and the current-collecting thin film 1384 may be formed by using a sputtering technique or a vapor-deposition technique. In addition, the thickness of each layer is preferably 0.1 to 3 μm.

Next, an interlayer film 1385 is formed by applying a resin, and a contact hole is formed by etching the interlayer film 1385. The interlayer film is not limited to a resin, and other films such as a CVD oxide film may also be used; however, a resin is preferably used in terms of flatness. In addition, the contact hole may be formed without using etching, but by using a photosensitive resin. Next, a wiring layer 1386 is formed over the interlayer film 1385 and connected to the conductive film 1334b. Thus, an electrical connection between the thin-film secondary battery and the element formation layer 1319 is obtained.

Here, the conductive films 1334a and 1334b which are provided on the element formation layer 1319 are connected to the conductive films 1336a and 1336b respectively, which serve as the connecting terminals of the thin-film secondary battery 1389 which is the battery stacked in advance. Here, an example is shown where an electrical connection between the conductive films 1334a and 1336a or an electrical connection between the conductive films 1334b and 1336b is performed by pressure bonding with an adhesive material such as an anisotropic conductive film (ACF) or an anisotropic conductive paste (ACP). The example shown here is the case where the connection is performed by using conductive particles 1338 included in an adhesive resin 1337. Alternatively, a conductive adhesive such as a silver paste, a copper paste, or a carbon paste; soldering; or the like can be used.

Note that the structure of a transistor can be various and is not limited to the structure shown in this embodiment. For example, a multi-gate structure having two or more gate electrodes may be employed. When a multi-gate structure is employed, a structure where channel regions are connected in series is provided; therefore, a structure where a plurality of transistors is connected in series is provided. When a multi-gate structure is employed, various advantages can be provided such that off-current can be reduced, the withstand voltage of the transistor can be increased so that the reliability is increased, and even if a drain-source voltage fluctuates when the transistor operates in the saturation region, a drain-source current does not change very much, and thus flat characteristics can be obtained. In addition, a structure where gate electrodes are formed above and below a channel may also be employed. When a structure where gate electrodes are formed above and below a channel is employed, the channel region is enlarged and the amount of current flowing therethrough can be increased, Thus, a depletion layer can be easily formed and the S value can be decreased. When gate electrodes are formed above and below a channel, a structure where a plurality of transistors is connected in parallel is provided.

In addition, any of the following structures may be employed: a structure where a gate electrode is formed above a channel; a structure where a gate electrode is formed below a channel; a staggered structure; an inversely staggered structure; and a structure where a channel region is divided into a plurality of regions and the divided regions are connected in parallel or in series. In addition, a channel (or a part of it) may overlap with a source electrode or a drain electrode. However, when a structure where a channel (or a part of it) does not overlap with a source electrode or a drain electrode is employed, electric charges can be prevented from gathering locally in a part of the channel, which would otherwise cause an unstable operation. In addition, an LDD (Lightly Doped Drain) region may be provided. When an LDD region is provided, various advantages can be provided such that off-current can be reduced, the withstand voltage of the transistor can be increased so that the reliability is increased, and even if a drain-source voltage fluctuates when the transistor operates in the saturation region, a drain-source current does not change very much, and thus flat characteristics can be obtained.

Note that this embodiment can be freely implemented in combination with any of the other embodiment modes. That is, by regularly charging a battery, shortage of power due to deterioration of the battery over time can be prevented unlike the conventional device. In addition, in the power storage device of the invention, battery charging is conducted by using power of a radio signal that is received at the antenna circuit. Therefore, the battery can be charged without being directly connected to a battery charger, but by utilizing the power of electromagnetic waves from outside as the power source for driving an RFID.

In addition to the above advantages obtained by providing the battery in the power storage device of the invention, a switch circuit is provided in the power supply control circuit, so that the power supply to the load is regularly controlled. By controlling the power supply to the load using the switch circuit provided in the power supply control circuit, the power supply to the load can be conducted intermittently. Therefore, reduction in power consumption of the battery can be achieved, and further, the load can be operated for a long time even when there is no power supply via radio signals.

Embodiment 3

This embodiment will describe an example of a method for manufacturing the power storage device shown in the above embodiment modes. In this embodiment, a structure where an antenna circuit, a power supply control circuit, and a battery are formed over the same substrate will be described. Note that when an antenna circuit, a power supply control circuit, and a battery are formed over the same substrate, and also when transistors formed on a single-crystalline substrate are used as the transistors included in the power supply control circuit, a power storage device having transistors with few characteristic variations can be formed, which is advantageous. In addition, in this embodiment, an example is described where the thin-film secondary battery described in the preceding embodiment is used as the battery included in the power storage device.

Figure 23A:
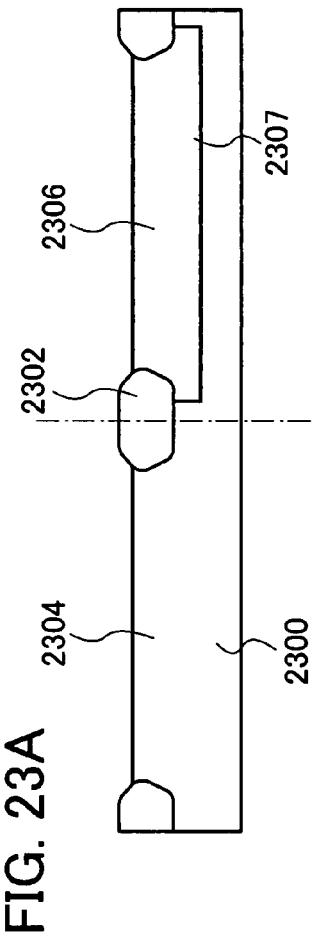
FIGS. 23A to 23C illustrate structures of Embodiment 3.

First, element regions 2304 and 2306 (hereinafter simply referred to as regions 2304 and 2306) are formed in a semiconductor substrate 2300 (see FIG. 23A). The regions 2304 and 2306 provided in the semiconductor substrate 2300 are insulated from each other by an insulating film (also referred to as a field oxide film) 2302. The example shown herein is the case where a single-crystalline Si substrate having n-type conductivity is used as the semiconductor substrate 2300, and a p well 2307 is formed in the region 2306 of the semiconductor substrate 2300.

Any substrate can be used as the substrate 2300 as long as it is a semiconductor. For example, a single-crystalline Si substrate having n-type or p-type conductivity, a compound semiconductor substrate (e.g., a GaAs substrate, an InP substrate, a GaN substrate, a SiC substrate, a sapphire substrate, or a ZnSe substrate), a SOI (Silicon on Insulator) substrate formed by using a bonding method or a SIMOX (Separation by IMplanted OXygen), or the like can be used.

The regions 2304 and 2306 can be formed by a selective oxidation (LOCOS: LOCal Oxidation of Silicon) method, a trench isolation method, or the like.

In addition, the p well 2307 formed in the region 2306 of the semiconductor substrate 2300 can be formed by selectively doping the semiconductor substrate 2300 with a p-type impurity element. As a p-type impurity element, boron (B), aluminum (Al), gallium (Ga), or the like can be used.

In this embodiment, although the region 2304 is not doped with an impurity element because an n-type semiconductor substrate is used as the semiconductor substrate 2300, an n well may be formed in the region 2304 by introducing an n-type impurity element. As an n-type impurity element, phosphorus (P), arsenic (As), or the like can be used. When a p-type semiconductor substrate is used, on the other hand, a structure may be employed in which the region 2304 is doped with an n-type impurity element to form an n well, whereas the region 2306 is not doped with an impurity element.

Figure 23B:
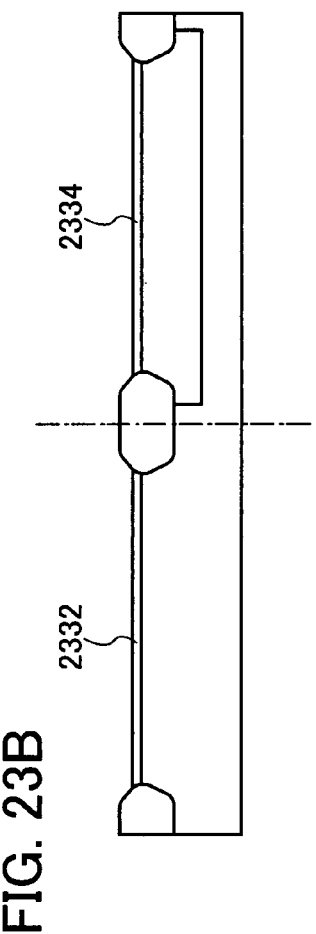

Next, insulating films 2332 and 2334 are formed so as to cover the regions 2304 and 2306, respectively (see FIG. 23B).

The insulating films 2332 and 2334 can be formed by, for example, forming silicon oxide films by oxidizing the surfaces of the regions 2304 and 2306 by thermal treatment. Alternatively, the insulating films 2332 and 2334 can be formed to have a stacked structure of a silicon oxide film and a film containing oxygen and nitrogen (a silicon oxynitride film) by conducting the steps of forming a silicon oxide film by a thermal oxidation method and then nitriding the surface of the silicon oxide film by nitridation treatment.

Further alternatively, the insulating films 2332 and 2334 can be formed by using plasma treatment as described above. For example, the insulating films 2332 and 2334 can be formed using a silicon oxide ($SiO_x$) film or a silicon nitride ($SiN_x$) film which is obtained by applying high-density-plasma oxidation or nitridation treatment to the surfaces of the regions 2304 and 2304 provided in the semiconductor substrate 2300. Further, after applying high-density-plasma oxidation treatment to the surfaces of the regions 2304 and 2306, high-density-plasma nitridation treatment may be conducted. In that case, silicon oxide films are formed on the surfaces of the regions 2304 and 2306 and then silicon oxynitride films are formed on the silicon oxide films. Thus, the insulating films 2332 and 2334 are each formed to have a stacked structure of the silicon oxide film and the silicon oxynitride film. In addition, it is also possible to conduct the steps of forming silicon oxide films on the surfaces of the regions 2304 and 2306 by a thermal oxidation method, and then applying high-density-plasma oxidation or nitridation treatment to the silicon oxide films.

The insulating films 2332 and 2334 formed over the regions 2304 and 2306 of the semiconductor substrate 2300 function as the gate insulating films of transistors which are completed later.

Figure 23C:
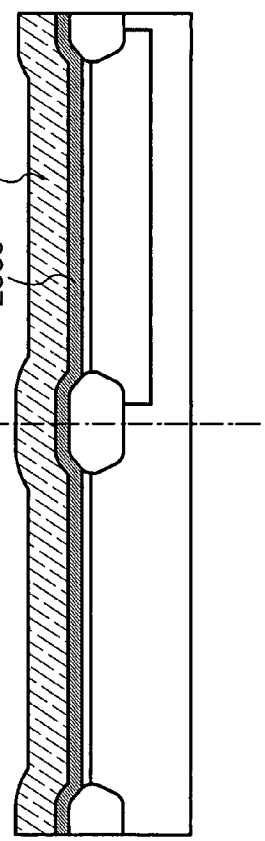

Next, a conductive film is formed so as to cover the insulating films 2332 and 2334 which are formed over the regions 2304 and 2306 (see FIG. 23C). Here, an example is shown where conductive films 2336 and 2338 are sequentially stacked as the conductive film. Needless to say, the conductive film may be formed to have a single layer or a stacked structure of more than two layers.

As a material of the conductive films 2336 and 2338, an element selected from among tantalum (Ta), tungsten (W), titanium (Ti), molybdenum (Mo), aluminum (Al), copper (Cu), chromium (Cr), niobium (Nb), and the like, or an alloy material or a compound material containing such an element as a main component can be used. Alternatively, a metal nitride film obtained by nitriding the above element can also be used. Further, a semiconductor material typified by polycrystalline silicon doped with an impurity element such as phosphorus can also be used.

Here, a stacked structure is employed in which the conductive film 2336 is formed using tantalum nitride and the conductive film 2338 is formed thereover using tungsten. Alternatively, it is also possible to form the conductive film 2336 using a single-layer film or a stacked film of tantalum nitride, tungsten nitride, molybdenum nitride, and/or titanium nitride and form the conductive film 2338 using a single-layer film or a stacked film of tungsten, tantalum, molybdenum, and/or titanium.

Next, the stacked conductive films 2336 and 2338 are selectively removed by etching, so that the conductive films 2336 and 2338 partially remain above the regions 2304 and 2306, respectively. Thus, gate electrodes 2340 and 2342 are formed (see FIG. 24A).

Next, a resist mask 2348 is selectively formed so as to cover the region 2304, and the region 2306 is doped with an impurity element using the resist mask 2348 and the gate electrode 2342 as masks, whereby impurity regions are formed (see FIG. 24B). As an impurity element, an n-type impurity element or a p-type impurity element is used. As an n-type impurity element, phosphorus (P), arsenic (As), or the like can be used. As a p-type impurity element, boron (B), aluminum (Al), gallium (Ga), or the like can be used. Here, phosphorus (P) is used as the impurity element.

In FIG. 24B, with the impurity element introduced, impurity regions 2352 which form source and drain regions and a channel formation region 2350 are formed in the region 2306.

Next, a resist mask 2366 is selectively formed so as to cover the region 2306, and the region 2304 is doped with an impurity element using the resist mask 2366 and the gate electrode 2340 as masks, whereby impurity regions are formed (see FIG. 24C). As the impurity element, an n-type impurity region or a p-type impurity region is used. As an n-type impurity element, phosphorus (P), arsenic (As), or the like can be used. As a p-type impurity element, boron (B), aluminum (Al), gallium (Ga), or the like can be used. Here, an impurity element (e.g., boron (B)) of a conductivity type opposite to that of the impurity element which has been introduced into the region 2306 in FIG. 24B is used. As a result, impurity regions 2370 which form source and drain regions and a channel formation region 2368 are formed in the region 2304.

Next, a second insulating film 2372 is formed so as to cover the insulating films 2332 and 2334 and the gate electrodes 2340 and 2342. Then, wirings 2374, which are electrically connected to the impurity regions 2352 and 2370 formed in the regions 2340 and 2360, are formed over the second insulating film 2372 (see FIG. 25A).

The second insulating film 2372 can be formed either in a single layer or in stacked layers, using an insulating film containing oxygen or nitrogen such as silicon oxide ($SiO_x$), silicon nitride ($SiN_x$), silicon oxynitride ($SiO_xN_y$ where x>y>0), or silicon nitride oxide ($SiN_xO_y$ where x>y>0); a film containing carbon such as DLC (Diamond-Like Carbon); an organic material such as epoxy, polyimide, polyamide, polyvinyl phenol, benzocyclobutene, or acrylic; a siloxane material containing a siloxane resin; or the like. Note that a siloxane material corresponds to a material having the bond of Si—O—Si. Siloxane has a skeletal structure with the bond of silicon (Si) and oxygen (O). As a substitutent of siloxane, an organic group containing at least hydrogen (e.g., an alkyl group or aromatic hydrocarbon) is used. Alternatively, a fluoro group may be used as the substitutent, or both a fluoro group and an organic group containing at least hydrogen may be used.

The wirings 2374 are formed either in a single layer or stacked layers of an element selected from among aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing such an element as a main component. An alloy material containing aluminum as a main component corresponds to, for example, a material which contains aluminum as a main component and also contains nickel, or a material which contains aluminum as a main component and also contains nickel and one or both of carbon and silicon. The wirings 2374 are preferably formed to have a stacked structure of a barrier film, an aluminum-silicon (Al—Si) film, and a barrier film or a stacked structure of a barrier film, an aluminum silicon (Al—Si) film, a titanium nitride (TiN) film, and a barrier film. Note that "barrier film" corresponds to a thin film made of titanium, titanium nitride, molybdenum, or molybdenum nitride. Aluminum and aluminum silicon, which have high resistance values and are inexpensive, are the most suitable material for forming the wirings 2374. When barrier layers are provided in the top layer and the bottom layer, generation of hillocks of aluminum or aluminum silicon can be prevented. When a barrier film made of titanium which is an element having a high reducing property is formed, even when there is a thin natural oxide film formed on the crystalline semiconductor film, the natural oxide film can be chemically reduced, and a favorable contact between the wirings 2374 and the crystalline semiconductor film can be obtained.

Note that the structure of the transistor of the invention is not limited to the one shown in the drawings. For example, a transistor with an inversely staggered structure, a fin FET structure, or the like can be used. A fin FET structure is advantageous in that it can suppress a short channel effect which would occur with the reduction of transistor size.

The power storage device of the invention includes a battery. As the battery, the thin-film secondary battery shown in the preceding embodiment is preferably used. In this embodiment, a connection between the transistor formed in this embodiment and a thin-film secondary battery will be described.

In this embodiment, a thin-film secondary battery is stacked over the wiring 2374 connected to the transistor. The thin-film secondary battery has a structure where a current-collecting thin film, a negative electrode active material layer, a solid electrolyte layer, a positive electrode active material layer, and a current-collecting thin film are sequentially stacked (see FIG. 25B). Therefore, the material of the wiring 2374 which also has a function of the current-collecting thin film of the thin-film secondary battery is required to have high adhesion to the negative electrode active material layer and also have low resistance. In particular, aluminum, copper, nickel, vanadium, or the like is preferably used.

The structure of the thin-film secondary battery will be described next. A negative electrode active material layer 2391 is formed over the wiring 2374. Generally, vanadium oxide ($V_2O_5$) or the like is used. Next, a solid electrolyte layer 2392 is formed over the negative electrode active material layer 2391. Generally, lithium phosphate ($Li_3PO_4$) or the like is used. Next, a positive electrode active material layer 2393 is formed over the solid electrolyte layer 2392. Generally, lithium manganate ($LiMn_2O_4$) or the like is used. Lithium cobaltate ($LiCoO_2$) or lithium nickel oxide ($LiNiO_2$) can also be used. Next, a current-collecting thin film 2394 to serve as an electrode is formed over the positive electrode active material layer 2393. The current-collecting thin film 2394 is required to have high adhesion to the positive electrode active material layer 2393 and also have low resistance. For example, aluminum, copper, nickel, vanadium, or the like can be used.

Each of the above thin layers of the negative electrode active material layer 2391, the solid electrolyte layer 2392, the positive electrode active material layer 2393, and the current-collecting thin film 2394 may be formed by using a sputtering technique or a vapor-deposition technique. In addition, the thickness of each layer is preferably 0.1 to 3 μm.

Next, an interlayer film 2396 is formed by applying a resin, and a contact hole is formed by etching the interlayer film 2396. The interlayer film is not limited to a resin, and other films such as a CVD oxide film may also be used; however, a resin is preferably used in terms of flatness. In addition, the contact hole may be formed without using etching, but by using a photosensitive resin. Next, a wiring layer 2395 is formed over the interlayer film 2396 and connected to the wiring 2397. Thus, an electrical connection between the thin-film secondary battery and the transistor is obtained.

With the above structure, the power storage device of the invention can have a structure where transistors are formed on a single-crystalline substrate and a thin-film secondary battery is formed thereover. Thus, the power storage device of the invention can be provided as a thin, compact, and flexible power storage device.

Note that this embodiment can be freely implemented in combination with any of the other embodiment modes. That is, by regularly charging a battery, shortage of power due to deterioration of the battery over time can be prevented unlike the conventional device. In addition, in the power storage device of the invention, battery charging is conducted by using power of a radio signal that is received at the antenna circuit. Therefore, the battery can be charged without being directly connected to a battery charger, but by utilizing the power of electromagnetic waves from outside as the power to be supplied to a load.

In addition to the above advantages obtained by providing the battery in the power storage device of the invention, a switch circuit is provided in the power supply control circuit, so that the power supply to the load is regularly controlled. By controlling the power supply to the load using the switch circuit provided in the power supply control circuit, the power supply to the load can be conducted intermittently. Therefore, reduction in power consumption of the battery can be achieved, and further, the load can be operated for a long time even when there is no power supply via radio signals.

Embodiment 4

This embodiment will describe an example of a method for manufacturing a storage device, which differs from Embodiment Mode 3. In this embodiment mode, a structure where an antenna circuit, a power supply control circuit, and a battery are formed over the same substrate will be described. Note that when an antenna circuit, a power supply control circuit, and a battery are formed over the same substrate, and also when transistors formed on a single-crystalline substrate are used as the transistors included in the power supply control circuit, a power storage device having transistors with few characteristic variations can be formed, which is advantageous. In addition, in this embodiment, an example is described where the thin-film secondary battery described in the preceding embodiment is used as the battery included in the power storage device.

Figure 26A:
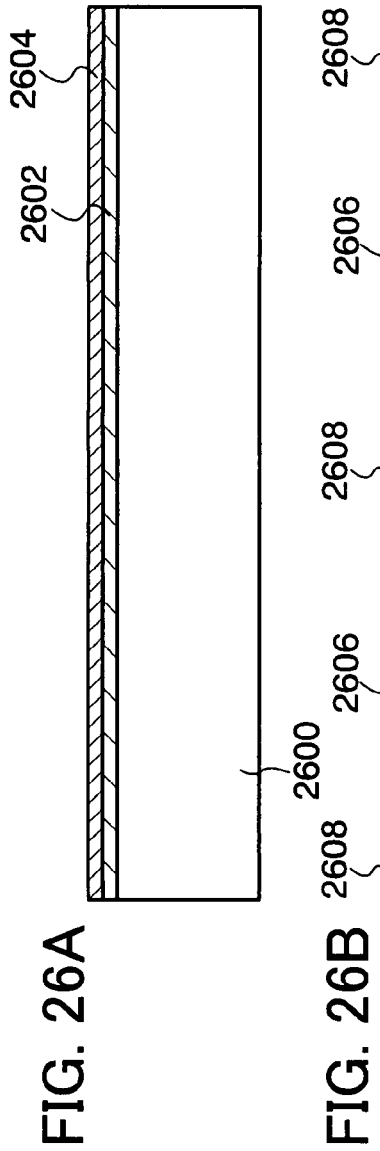
FIGS. 26A to 26C illustrate structures of Embodiment 4.

First, an insulating film is formed over a substrate 2600. Here, a single-crystalline Si having n-type conductivity is used as the substrate 2600, and insulating films 2602 and 2604 are formed over the substrate 2600 (see FIG. 26A). For example, silicon oxide ($SiO_x$) is formed as the insulating film 2602 by applying thermal treatment to the substrate 2600, and then silicon nitride ($SiN_x$) is formed over the insulating film 2602 by a CVD method.

Any substrate can be used as the substrate 2600 as long as it is a semiconductor. For example, a single-crystalline Si substrate having n-type or p-type conductivity, a compound semiconductor substrate (e.g., a GaAs substrate, an InP substrate, a GaN substrate, a SiC substrate, a sapphire substrate, or a ZnSe substrate), a SOI (Silicon on Insulator) substrate formed by using a bonding method or a SIMOX (Separation by IMplanted OXygen), or the like can be used.

Alternatively, after forming the insulating film 2602, the insulating film 2604 may be formed by nitriding the surface of the insulating film 2602 by high-density-plasma treatment. Note that the insulating film provided over the substrate 2600 may have either a single-layer structure or a stacked structure of more than two layers.

Figure 26B:
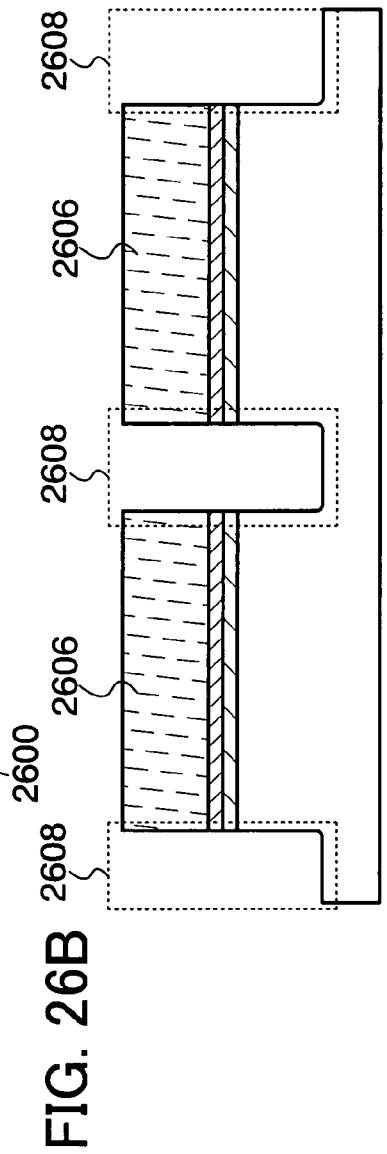

Next, patterns of a resist mask 2606 are selectively formed over the insulating film 2604, and selective etching is conducted using the resist mask 2606 as a mask, whereby recessed portions 2608 are selectively formed in the substrate 2600 (see FIG. 26B). For the etching of the substrate 2600 and the insulating films 2602 and 2604, plasma dry etching can be used.

Figure 26C:
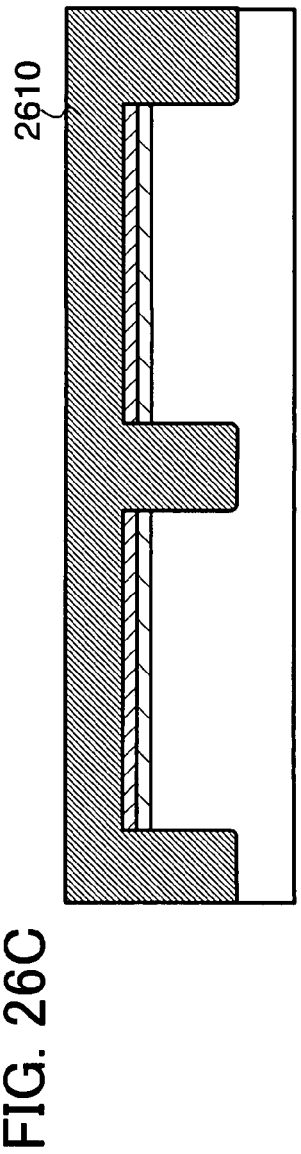

Next, the patterns of the resist mask 2606 are removed, and then an insulating film 2610 is formed so as to fill the recessed portions 2608 formed in the substrate 2600 (see FIG. 26C).

The insulating film 2610 is formed using an insulating material such as silicon oxide, silicon nitride, silicon oxynitride ($SiO_xN_y$, where x>y>0), or silicon nitride oxide ($SiN_xO_y$, where x>y>0) by a CVD method, a sputtering method, or the like. Here, a silicon oxide film is formed by an atmospheric pressure CVD method or a low-pressure CVD method using a TEOS (tetraethyl orthosilicate) gas.

Next, the surface of the substrate 2600 is exposed by grinding or polishing such as CMP (Chemical Mechanical Polishing). Here, by exposing the surface of the substrate 2600, regions 2612 and 2613 are formed between insulating films 2611 which are formed in the recessed portions 2608 of the substrate 2600. Note that the insulating films 2611 are obtained by partially removing the insulating film 2610 formed over the surface of the substrate 2600 by grinding or polishing such as CMP. Subsequently, by selectively introducing a p-type impurity element, a p well 2615 is formed in the region 2613 of the substrate 2600 (see FIG. 27A).

As a p-type impurity element, boron (B), aluminum (Al), gallium (Ga), or the like can be used. Here, boron (B) is introduced into the region 2613 as the impurity element.

In this embodiment, although the region 2612 is not doped with an impurity element because an n-type semiconductor substrate is used as the substrate 2600, an n well may be formed in the region 2612 by introducing an n-type impurity element. As an n-type impurity element, phosphorus (P), arsenic (As), or the like can be used.

When a p-type semiconductor substrate is used, on the other hand, a structure may be used in which the region 2612 is doped with an n-type impurity element to form an n well, whereas the region 2613 is not doped with an impurity element.

Next, insulating films 2632 and 2634 are formed over the surfaces of the regions 2612 and 2613 in the substrate 2600, respectively (see FIG. 27B).

The insulating films 2632 and 2634 can be formed by, for example, oxidizing the surfaces of the regions 2612 and 2613 provided in the substrate 2600 by thermal treatment. Alternatively, the insulating films 2632 and 2634 can be formed to have a stacked structure of a silicon oxide film and a film containing oxygen and nitrogen (a silicon oxynitride film) by conducting the steps of forming a silicon oxide film by a thermal oxidation method and then nitriding the surface of the silicon oxide film by nitridation treatment.

Further alternatively, the insulating films 2632 and 2634 can be formed by using plasma treatment as described above. For example, the insulating films 2632 and 2634 can be formed using a silicon oxide ($SiO_x$) film or a silicon nitride ($SiN_x$) film which is obtained by applying high-density-plasma oxidation or nitridation treatment to the surfaces of the regions 2612 and 2613 provided in the substrate 2600. Further, after applying high-density-plasma oxidation treatment to the surfaces of the regions 2612 and 2613, high-density-plasma nitridation treatment may be conducted. In that case, silicon oxide films are formed on the surfaces of the regions 2612 and 2613 and then silicon oxynitride films are formed on the silicon oxide films. Thus, the insulating films 2632 and 2634 are each formed to have a stacked structure of the silicon oxide film and the silicon oxynitride film. In addition, it is also possible to conduct the steps of forming silicon oxide films on the surfaces of the regions 2612 and 2613 by a thermal oxidation method, and then applying high-density-plasma oxidation or nitridation treatment to the silicon oxide films.

Note that the insulating films 2632 and 2634 formed over the regions 2612 and 2613 of the substrate 2600 function as the gate insulating films of transistors which are completed later.

Next, a conductive film is formed so as to cover the insulating films 2632 and 2634 which are formed over the regions 2612 and 2613 provided in the substrate 2600 (see FIG. 27C). Here, an example is shown where conductive films 2636 and 2638 are sequentially stacked as the conductive film. Needless to say, the conductive film may be formed to have a single layer or a stacked structure of more than two layers.

As a material of the conductive films 2636 and 2638, an element selected from among tantalum (Ta), tungsten (W), titanium (Ti), molybdenum (Mo), aluminum (Al), copper (Cu), chromium (Cr), niobium (Nb), and the like, or an alloy material or a compound material containing such an element as a main component can be used. Alternatively, a metal nitride film obtained by nitriding the above element can also be used. Further, a semiconductor material typified by polycrystalline silicon doped with an impurity element such as phosphorus can also be used.

Here, a stacked structure is employed in which the conductive film 2636 is formed using tantalum nitride and the conductive film 2638 is formed thereover using tungsten. Alternatively, it is also possible to form the conductive film 2636 using a single-layer film or a stacked film of tantalum nitride, tungsten nitride, molybdenum nitride, and/or titanium nitride and form the conductive film 2638 using a single-layer film or a stacked film of tungsten, tantalum, molybdenum, and/or titanium.

Figure 28A:
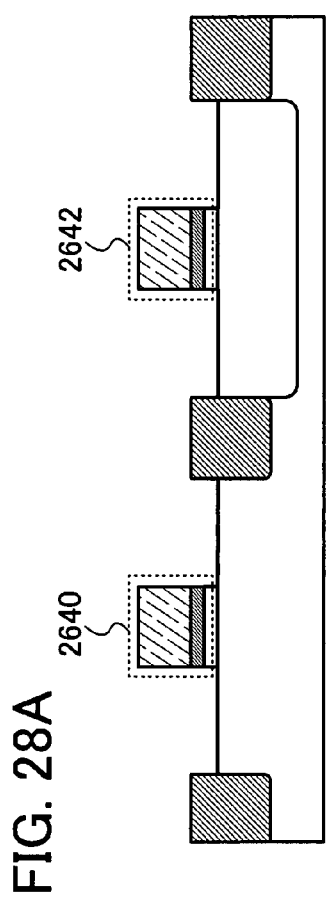
FIGS. 28A to 28C illustrate structures of Embodiment 4.

Next, the stacked conductive films 2636 and 2638 are selectively removed by etching, so that the conductive films 2636 and 2638 partially remain above the regions 2612 and 2613 of the substrate 2600. Thus, conductive films 2640 and 3642 functioning as gate electrodes are formed (see FIG. 28A). Here, a part of the regions 2612 and 2613 of the substrate 2600 which does not overlap with the conductive films 2640 and 2642 is exposed at its surface.

Specifically, a part of the insulating film 2632 formed over the region 2612 of the substrate 2600, which does not overlap with the conductive film 2640, is selectively removed, so that the ends of the conductive film 2640 and the ends of the insulating film 2632 approximately correspond to each other. In addition, a part of the insulating film 2634 formed over the region 2613 of the substrate 2600, which does not overlap with the conductive film 2642, is selectively removed, so that the ends of the conductive film 2642 and the ends of the insulating film 2634 approximately correspond to each other.

In this case, the part of the insulating films which do not overlap with the conductive films 2640 and 2642 may be removed at the same time as the formation of the conductive films 2640 and 2642. Alternatively, the part of the insulating films which do not overlap with the conductive films 2640 and 2642 may be removed by using resist masks which are left after forming the conductive films 2640 and 2642 as masks, or by using the conductive films 2640 and 2642 as masks.

Figure 28B:
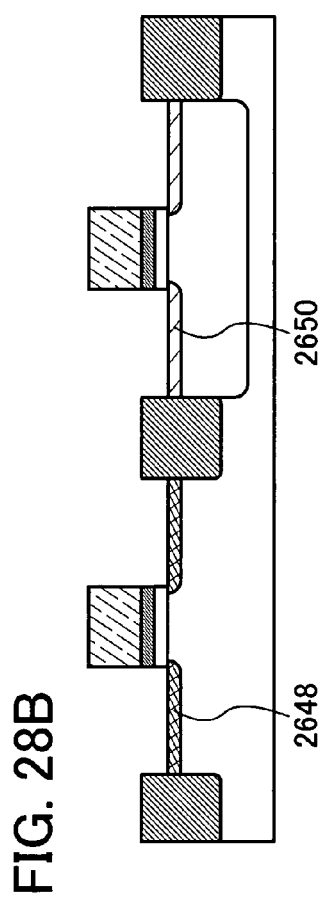

Then, the regions 2612 and 2613 of the substrate 2600 are selectively doped with an impurity element (see FIG. 28B). Here, the region 2613 is selectively doped with an n-type impurity element at a low concentration, using the conductive film 2642 as a mask, whereas the region 2612 is selectively doped with a p-type impurity element at a low concentration, using the conductive film 2640 as a mask. As an n-type impurity element, phosphorus (P), arsenic (As), or the like can be used. As a p-type impurity element, boron (B), aluminum (Al), gallium (Ga), or the like can be used.

Next, sidewalls 2643 having a contact with the side surfaces of the conductive films 2640 and 2642 are formed. Specifically, a film containing an inorganic material such as silicon, silicon oxide, or silicon nitride, or a film containing an organic material such as an organic resin is formed in a single layer or in stacked layers. Then, the insulating film is selectively etched by anisotropic etching (mainly in the perpendicular direction), so that the sidewalls 2654 can be formed so as to be in contact with the side surfaces of the conductive films 240 and 2642. The sidewalls 2654 are used as doping masks for forming LDD (Lightly Doped Drain) regions. In addition, the sidewalls 2654 are formed to be in contact with the insulating films formed below the conductive films 2640 and 2642.

Figure 28C:
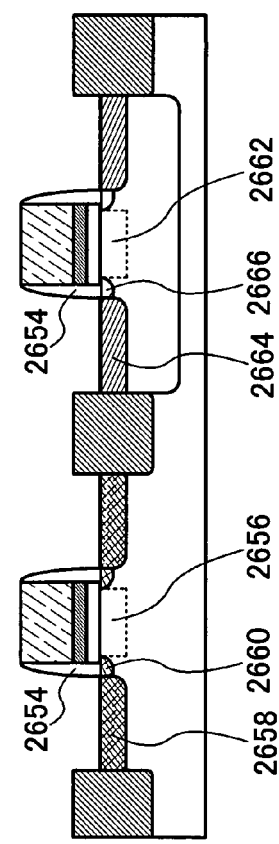

Next, by doping the regions 2612 and 2613 of the substrate 2600 with an impurity element, using the sidewalls 2654 and the conductive films 2640 and 2642 as masks, impurity regions which function as source and drain regions are formed (see FIG. 28C). Here, the region 2613 of the substrate 2600 is doped with an n-type impurity element at a high concentration, using the sidewalls 2654 and the conductive film 2642 as masks, whereas the region 2612 is doped with a p-type impurity element at a high concentration, using the sidewalls 2654 and the conductive film 2640 as masks.

As a result, impurity regions 2658 which form source and drain regions, low concentration impurity regions 2660 which form LDD regions, and a channel formation region 2656 are formed in the region 2612 of the substrate 2600. Meanwhile, impurity regions 2664 which form source and drain regions, low concentration impurity regions 2666 which form LDD regions, and a channel formation region 2662 are formed in the region 2613 of the substrate 2600.

Note that in this embodiment, the impurity elements are introduced with the condition that a part of the regions 2612 and 2613 of the substrate 2600 which does overlap with the conductive films 2640 and 2642 is exposed. Accordingly, the channel formation regions 2656 and 2662 which are formed in the regions 2612 and 2613 of the substrate 2600 respectively can be formed in a self-aligned manner with respect to the conductive films 2640 and 2642.

Figure 29A:
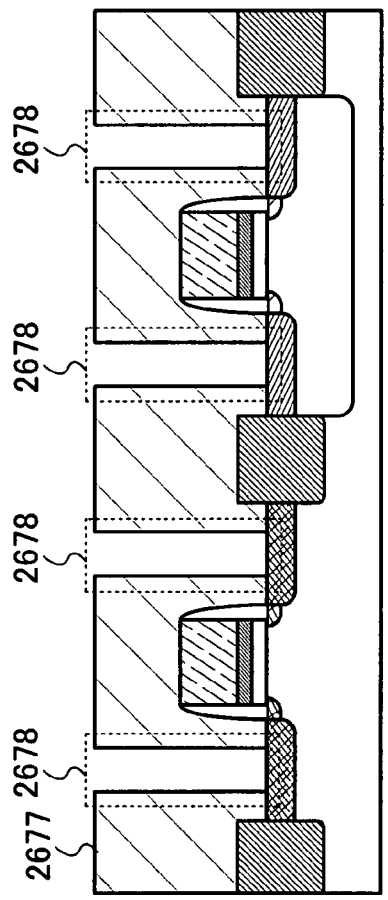
FIGS. 29A and 29B illustrate structures of Embodiment 4.

Next, a second insulating film 2677 is formed so as to cover the insulating films, the conductive films, and the like which are provided over the regions 2612 and 2613 of the substrate 2600, and openings 2678 are formed in the second insulating film 2677 (see FIG. 29A).

The second insulating film 2677 can be formed either in a single layer or in stacked layers, using an insulating film containing oxygen or nitrogen such as silicon oxide ($SiO_x$), silicon nitride ($SiN_x$), silicon oxynitride ($SiO_xN_y$ where x>y>0), or silicon nitride oxide ($SiN_xO_y$ where x>y>0); a film containing carbon such as DLC (Diamond-Like Carbon); an organic material such as epoxy, polyimide, polyamide, polyvinyl phenol, benzocyclobutene, or acrylic; a siloxane material containing a siloxane resin; or the like. Note that a siloxane material corresponds to a material having the bond of Si—O—Si. Siloxane has a skeletal structure with the bond of silicon (Si) and oxygen (O). As a substitutent of siloxane, an organic group containing at least hydrogen (e.g., an alkyl group or aromatic hydrocarbon) is used. Alternatively, a fluoro group may be used as the substitutent, or both a fluoro group and an organic group containing at least hydrogen may be used as the substitutent.

Figure 29B:
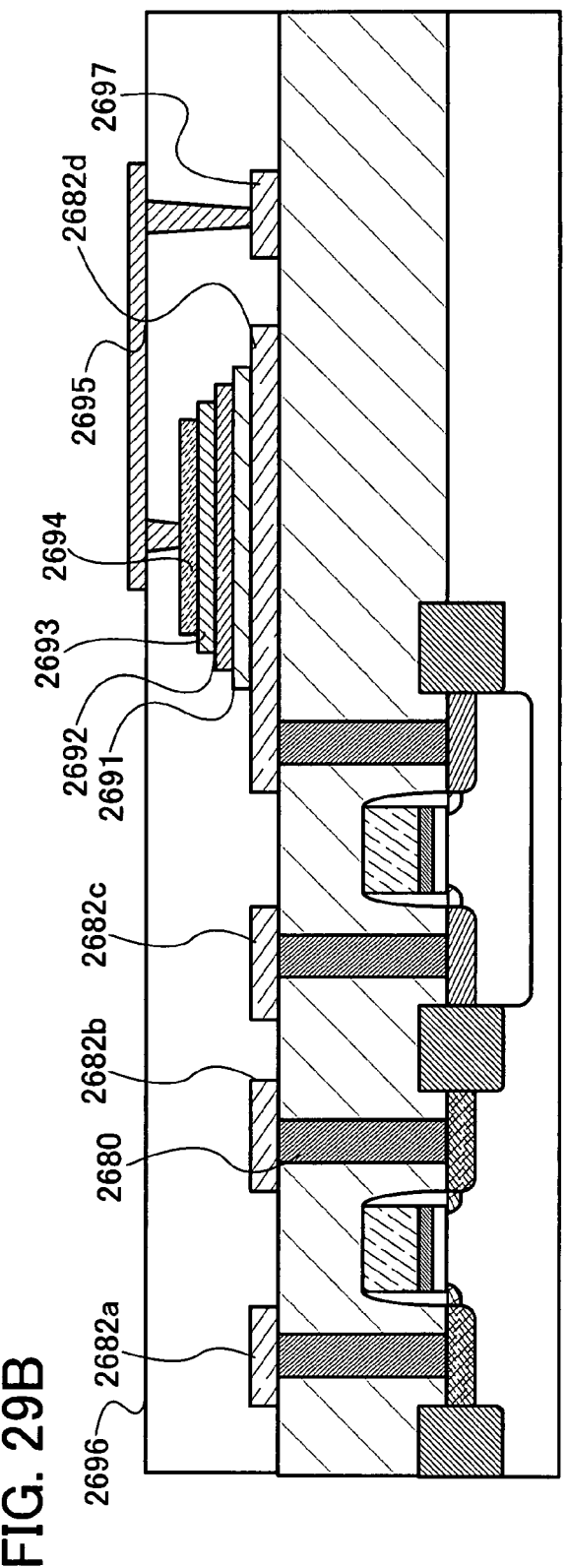

Next, conductive films 2680 are formed in the openings 2678 by a CVD method. Then, conductive films 2682a to 2682d are selectively formed over the insulating film 2677 so as to be electrically connected to the conductive films 2680 (see FIG. 29B).

The conductive films 2680 and 2682a to 2682d are formed either in a single layer or stacked layers of an element selected from among aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing such an element as a main component. An alloy material containing aluminum as a main component corresponds to, for example, a material which contains aluminum as a main component and also contains nickel, or a material which contains aluminum as a main component and also contains nickel and one or both of carbon and silicon. Each of the conductive films 2680 and 2682 to 2682d is preferably formed to have a stacked structure of a barrier film, an aluminum-silicon (Al—Si) film, and a barrier film or a stacked structure of a barrier film, an aluminum silicon (Al—Si) film, a titanium nitride (TiN) film, and a barrier film. Note that "barrier film" corresponds to a thin film made of titanium, titanium nitride, molybdenum, or molybdenum nitride. Aluminum and aluminum silicon, which have high resistance values and are inexpensive, are the most suitable material for forming the conductive films 2680 and 2682a to 2682d. When barrier layers are provided in the top layer and the bottom layer, generation of hillocks of aluminum or aluminum silicon can be prevented. When a barrier film made of titanium which is an element having a high reducing property is formed, even when there is a thin natural oxide film formed on the crystalline semiconductor film, the natural oxide film can be chemically reduced, and a favorable contact between the conductive film 2680 and the crystalline semiconductor film can be obtained. Here, the conductive films 2680 and 2682a to 2682d can be formed by selectively growing tungsten (W) by a CVD method.

Through the above steps, a p-channel transistor formed in the region 2612 of the substrate 2600 and an n-channel transistor formed in the region 2613 of the substrate 2600 can be obtained.

Note that the structure of the transistor of the invention is not limited to the one shown in the drawings. For example, a transistor with an inversely staggered structure, a fin FET structure, or the like can be used. A fin FET structure is advantageous in that it can suppress a short channel effect which would occur with the reduction of transistor size.

The power storage device of the invention includes a battery. As the battery, the thin-film secondary battery shown in the preceding embodiment is preferably used. In this embodiment, a connection between the transistor formed in this embodiment and a thin-film secondary battery will be described.

In this embodiment, a thin-film secondary battery is stacked over the conductive film 2682d connected to the transistor. The thin-film secondary battery has a structure where a current-collecting thin film, a negative electrode active material layer, a solid electrolyte layer, a positive electrode active material layer, and a current-collecting thin film are sequentially stacked (see FIG. 29B). Therefore, the material of the conductive film 2682d which also has a function of the current-collecting thin film of the thin-film secondary battery is required to have high adhesion to the negative electrode active material layer and also have low resistance. In particular, aluminum, copper, nickel, vanadium, or the like is preferably used.

The structure of the thin-film secondary battery will be described next. A negative electrode active material layer 2691 is formed over the conductive film 2682d. Generally, vanadium oxide ($V_2O_5$) or the like is used. Next, a solid electrolyte layer 2692 is formed over the negative electrode active material layer 2691. Generally, lithium phosphate ($Li_3PO_4$) or the like is used. Next, a positive electrode active material layer 2693 is formed over the solid electrolyte layer 2692. Generally, lithium manganate ($LiMn_2O_4$) or the like is used. Lithium cobaltate ($LiCoO_2$) or lithium nickel oxide ($LiNiO_2$) can also be used. Next, a current-collecting thin film 2694 to serve as an electrode is formed over the positive electrode active material layer 2693. The current-collecting thin film 2694 is required to have high adhesion to the positive electrode active material layer 2693 and also have low resistance. For example, aluminum, copper, nickel, vanadium, or the like can be used.

Each of the above thin layers of the negative electrode active material layer 2691, the solid electrolyte layer 2692, the positive electrode active material layer 2693, and the current-collecting thin film 2694 may be formed by using a sputtering technique or a vapor-deposition technique. In addition, the thickness of each layer is preferably 0.1 to 3 μm.

Next, an interlayer film 2696 is formed by applying a resin, and a contact hole is formed by etching the interlayer film 2696. The interlayer film 2696 is not limited to a resin, and other films such as a CVD oxide film may also be used; however, a resin is preferably used in terms of flatness. In addition, the contact hole may be formed without using etching, but by using a photosensitive resin. Next, a wiring layer 2695 is formed over the interlayer film 2696 and connected to the wiring 2697. Thus, an electrical connection between the thin-film secondary battery and the transistor is obtained.

With the above structure, the power storage device of the invention can have a structure where transistors are formed on a single-crystalline substrate and a thin-film secondary battery is formed thereover. Thus, the power storage device of the invention can be provided as a thin, compact, and flexible power storage device.

Note that this embodiment can be freely implemented in combination with any of the other embodiment modes. That is, by regularly charging a battery, shortage of power due to deterioration of the battery over time can be prevented unlike the conventional device. In addition, in the power storage device of the invention, battery charging is conducted by using power of a radio signal that is received at the antenna circuit. Therefore, the battery can be charged without being directly connected to a battery charger, but by utilizing the power of electromagnetic waves from outside as the power to be supplied to a load.

In addition to the above advantages obtained by providing the battery in the power storage device of the invention, a switch circuit is provided in the power supply control circuit, so that the power supply to the load is regularly controlled. By controlling the power supply to the load using the switch circuit provided in the power supply control circuit, the power supply to the load can be conducted intermittently. Therefore, reduction in power consumption of the battery can be achieved, and further, the load can be operated for a long time even when there is no power supply via radio signals.

Embodiment 5

This embodiment will describe the application of the power storage device of the invention which charges a battery via radio signals. The power storage device of the invention can be applied to, for example, electronic devices such as digital video cameras, computers, portable information terminals (e.g., mobile computers, portable telephones, portable game machines, or electronic books), or image reproducing devices provided with recording media (specifically, a device which reproduces the content of a recording medium such as a digital versatile disc (DVD) and which has a display for displaying the reproduced image), or IC labels, IC tags, or IC cards which are attached to bills, coins, securities, bearer bonds, certificates (e.g., drivers' licenses or residents' cards) packaging containers (e.g., wrapping paper or plastic bottles), recording media (e.g., DVD software or video tapes), means of transportation (e.g., bicycles), personal belongings (e.g., shoes or glasses), foods, plants, animals, human bodies, clothes, daily articles, or electronic devices.

Note that in this specification, "IC cards" mean cards which are formed by embedding a thin semiconductor integrated circuit (an IC chip) in a plastic card so as to store data. IC cards can be categorized as a "contact type" or a "non-contact type" depending on the method of reading/writing data. A non-contact type card has a built-in antenna and can communicate with a terminal by utilizing weak electromagnetic waves. In addition, an IC tag refers to a small IC chip used for identification of objects, which stores data such as its own identification code, and is capable of communicating data with a management system via electric waves. The IC tag has a size of several tens of millimeters and can communicate with a reader via electromagnetic waves. An IC tag of the invention that is applied to an RFID which performs wireless data communication can be used in various applications such as cart-form objects, labels (called IC labels), or certificates.

This embodiment will describe examples where an RFID having the power storage device of the invention is applied to an IC label, an IC tag, or an IC card, and some examples of products having the IC label, the IC tag, or the IC card.

Figure 34A:
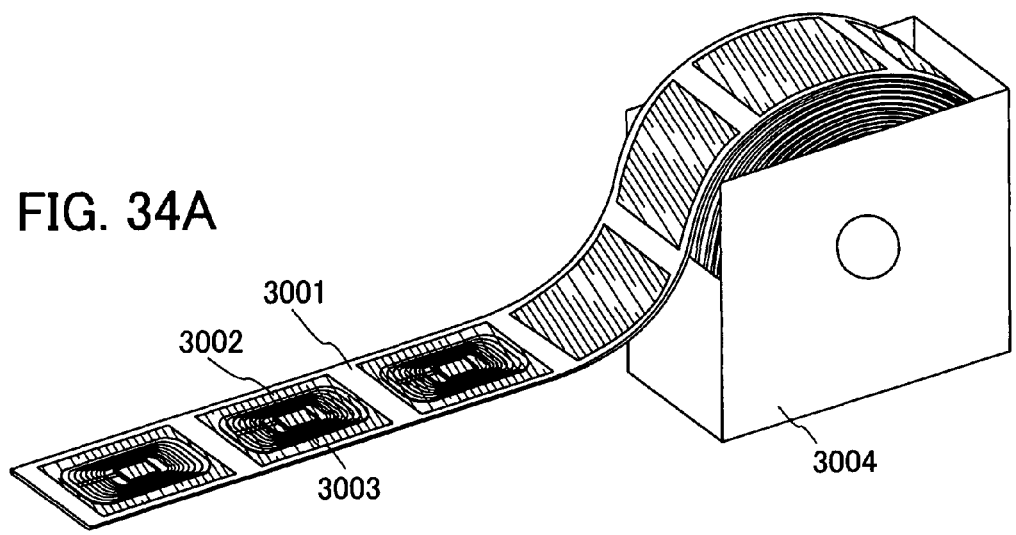
FIGS. 34A to 34E illustrate structures of Embodiment 5.

FIG. 34A illustrates an example of an IC label with a built-in RFID which includes the power storage device of the invention. A plurality of IC labels 3003 with a built-in RFID 3002 is formed on a label sheet (separate sheet) 3001. The IC labels 3003 are stored in a box 3004. In addition, information on a product or service related to them (e.g., product names, brands, trademarks, owners of the trademarks, sellers, and manufacturers) are written on the IC label 3003, while an ID number that is unique to the product (or the kind of the product) is assigned to the built-in RFID in order to easily figure out forgery, infringement of intellectual property rights such as patents and trademarks, and illegality such as unfair competition. In addition, a large volume of information that cannot be written on a container of the product or the label, e.g., the production area, selling area, quality, raw material, efficacy, use, quantity, shape, price, production method, directions for use, time of the production, time of the use, expiration date, instructions of the product, information on the intellectual property of the product and the like can be input into the RFID in advance so that traders and consumers can access the information using a simple reader. Although producers can easily rewrite or delete the information, traders and consumers are not allowed to rewrite or delete the information.

Figure 34B:
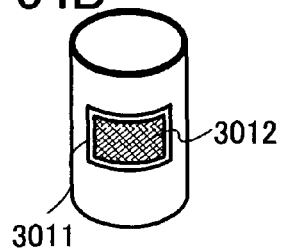

FIG. 34B shows a label-form IC tag 3011 with a built-in RFID 3012 which includes the power storage device of the invention. By attaching the IC tag 3011 to a product, management of the product becomes easier. For example, when a product is stolen, the stealer can be easily found out by tracing the product. In this manner, by providing IC tags on products, products that are highly traceable can be distributed in the market. In addition, in the IC tag shown in FIG. 34B which includes the power storage device of the invention, a thin-film secondary battery or a high-capacity capacitor can be used as a battery. Therefore, the invention is advantageous even when attached to a product with a curved shape as shown in FIG. 34B.

Figure 34C:
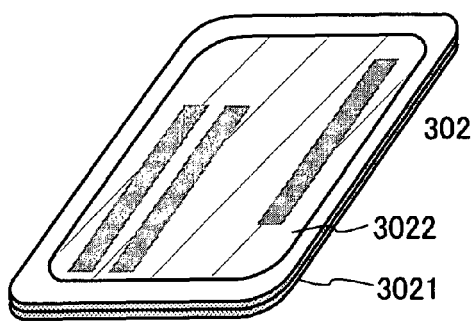

FIG. 34C shows an example of a finished product of an IC card 3021 with a built-in RFID 3022 which includes the power storage device of the invention. As the IC card 3021, various kinds of cards can be used such as cash cards, credit cards, prepaid cards, electronic tickets, electronic money, telephone cards, and membership cards.

Figure 34D:
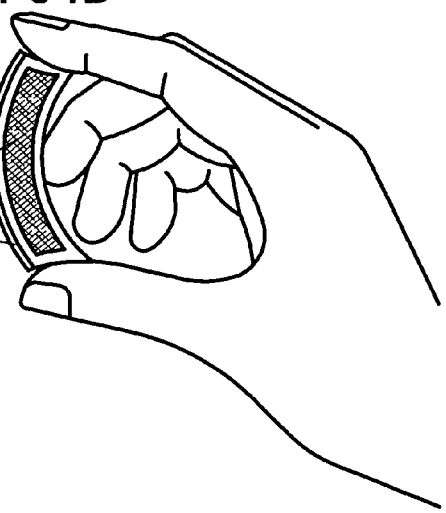

Note that in the IC card shown in FIG. 34C which includes the power storage device of the invention, a thin-film secondary battery or a high-capacity capacitor can be used as a battery. Therefore, the invention is quite advantageous because it can be used even when bent as shown in FIG. 34D.

Figure 34E:
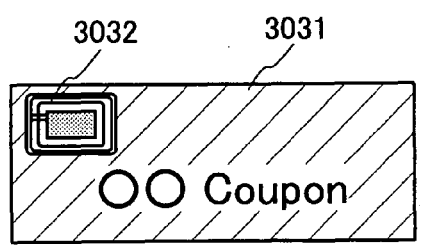

FIG. 34E shows a finished product of a bearer bond 3031. The bearer bond 3031 is embedded with an RFID 3032 which includes the power storage device of the invention, and the periphery of the RFID 3032 is covered with a resin so that the RFID is protected. Here, a filler is dispersed in the resin. The bearer bond 3031 can be formed in the same way as IC labels, IC tags, and IC cards of the invention. The bearer bonds include stamps, tickets, admission tickets, merchandise coupons, book coupons, stationery coupons, beer coupons, rice coupons, various gift coupons, various service coupons, and the like; needless to say, the invention is not limited to these. In addition, when the RFID 3032 of the invention is provided in bills, coins, securities, bearer bonds, certificates, or the like, an authentication function can be provided. With the authentication function, forgery can be prevented.

As described above, the RFID which includes the power storage device of the invention can be provided for any objects (including creatures).

This embodiment can be freely implemented in combination with any of the other embodiment modes in this specification. That is, by regularly charging a battery, shortage of power due to deterioration of the battery over time can be prevented unlike the conventional device. In addition, in the power storage device of the invention, battery charging is performed by using power of a radio signal that is received at the antenna circuit. Therefore, the battery can be charged without being directly connected to a battery charger, but by utilizing the power of electromagnetic waves from outside as the power to be supplied to a load.

In addition to the above advantages obtained by providing the battery in the power storage device of the invention, a switch circuit is provided in the power supply control circuit, so that the power supply to the load is regularly controlled. By controlling the power supply to the load using the switch circuit provided in the power supply control circuit, the power supply to the load can be conducted intermittently. Therefore, reduction in power consumption of the battery can be achieved, and further, the load can be operated for a long time even when there is no power supply via radio signals.

The present application is based on Japanese Priority application No. 2006-154422 filed on Jun. 2, 2006 with the Japanese Patent Office, the entire contents of which are hereby incorporated by reference.

What is claimed is:

1. A power storage device comprising: an antenna circuit, a power supply control circuit, and a battery portion,
wherein the power supply control circuit includes a rectifier circuit configured to rectify a signal received at the antenna circuit, a switch circuit, a low-frequency-signal generating circuit, and a power supply circuit,
wherein the battery portion includes a battery configured to be charged with a signal rectified by the rectifier circuit, and
wherein the switch circuit is configured to control power supplied to the power supply circuit from the battery or from the antenna circuit, using a signal from the low-frequency-signal generating circuit.

2. A power storage device comprising: an antenna circuit, a power supply control circuit, and a battery portion,
wherein the power supply control circuit includes a rectifier circuit configured to rectify a signal received at the antenna circuit, a control circuit, a switch circuit, a low-frequency-signal generating circuit, and a power supply circuit,
wherein the battery portion includes a battery configured to be charged with a signal rectified by the rectifier circuit,
wherein the control circuit is configured to select power to be supplied to the switch circuit by comparing power supplied from the antenna circuit with power supplied from the battery, and
wherein the switch circuit is configured to control the power selected by the control circuit to be output to the power supply circuit, using a signal from the low-frequency-signal generating circuit.

3. A power storage device comprising: an antenna circuit, a power supply control circuit, and a battery portion,
wherein the power supply control circuit includes a rectifier circuit configured to rectify a signal received at the antenna circuit, a switch circuit, a low-frequency-signal generating circuit, and a power supply circuit,
wherein the battery portion includes a battery configured to be charged with a signal rectified by the rectifier circuit, and a charging management circuit,
wherein the charging management circuit is configured to manage a charged amount of the battery, and
wherein the switch circuit is configured to control power supplied to the power supply circuit from the battery or from the antenna circuit, using a signal from the low-frequency-signal generating circuit.

4. A power storage device comprising: an antenna circuit, a power supply control circuit, and a battery portion,
wherein the power supply control circuit includes a rectifier circuit configured to rectify a signal received at the antenna circuit, a control circuit, a switch circuit, a low-frequency-signal generating circuit, and a power supply circuit,
wherein the battery portion includes a battery configured to be charged with a signal rectified by the rectifier circuit, and a charging management circuit,
wherein the charging management circuit is configured to manage a charged amount of the battery,
wherein the control circuit is configured to select power to be supplied to the switch circuit by comparing power supplied from the antenna circuit with power supplied from the battery, and
wherein the switch circuit is configured to control the power selected by the control circuit to be output to the power supply circuit, using a signal from the low-frequency-signal generating circuit.

5. The power storage device according to claim 2,
wherein the control circuit is configured to connect the battery and the switch circuit when the power from the antenna circuit is lower than the power from the battery, and
wherein the control circuit is configured not to connect the battery and the switch circuit when the power from the battery is lower than the power from the antenna circuit.

6. The power storage device according to claim 4,
wherein the control circuit is configured to connect the battery and the switch circuit when the power from the antenna circuit is lower than the power from the battery, and
wherein the control circuit is configured not to connect the battery and the switch circuit when the power from the battery is lower than the power from the antenna circuit.

7. The power storage device according to claim 1, wherein the battery is one selected from the group consisting of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and a capacitor.

8. The power storage device according to claim 2, wherein the battery is one selected from the group consisting of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and a capacitor.

9. The power storage device according to claim 3, wherein the battery is one selected from the group consisting of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and a capacitor.

10. The power storage device according to claim 4, wherein the battery is one selected from the group consisting of a lithium battery, a lithium polymer battery, a lithium ion battery, a nickel metal hydride battery, a nickel cadmium battery, an organic radical battery, a lead-acid battery, an air secondary battery, a nickel-zinc battery, a silver-zinc battery, and a capacitor.

11. The power storage device according to claim 1, wherein the battery includes a first current-collecting thin film, a negative electrode active material layer over the first current-collecting thin film, a solid electrolyte layer over the negative electrode active material layer, a positive electrode active material layer over the solid electrolyte layer, and a second current-collecting thin film over the positive electrode active material layer.

12. The power storage device according to claim 2, wherein the battery includes a first current-collecting thin film, a negative electrode active material layer over the first current-collecting thin film, a solid electrolyte layer over the negative electrode active material layer, a positive electrode active material layer over the solid electrolyte layer, and a second current-collecting thin film over the positive electrode active material layer.

13. The power storage device according to claim 3, wherein the battery includes a first current-collecting thin film, a negative electrode active material layer over the first current-collecting thin film, a solid electrolyte layer over the negative electrode active material layer, a positive electrode active material layer over the solid electrolyte layer, and a second current-collecting thin film over the positive electrode active material layer.

14. The power storage device according to claim 4, wherein the battery includes a first current-collecting thin film, a negative electrode active material layer over the first current-collecting thin film, a solid electrolyte layer over the negative electrode active material layer, a positive electrode active material layer over the solid electrolyte layer, and a second current-collecting thin film over the positive electrode active material layer.

15. The power storage device according to claim 1, wherein the antenna circuit is configured to receive a radio signal by an electromagnetic induction method.

16. The power storage device according to claim 2, wherein the antenna circuit is configured to receive a radio signal by an electromagnetic induction method.

17. The power storage device according to claim 3, wherein the antenna circuit is configured to receive a radio signal by an electromagnetic induction method.

18. The power storage device according to claim 4, wherein the antenna circuit is configured to receive a radio signal by an electromagnetic induction method.

19. The power storage device according to claim 1, further comprising a booster antenna, wherein the antenna circuit is configured to receive a signal for charging the battery via the booster antenna.

20. The power storage device according to claim 2, further comprising a booster antenna, wherein the antenna circuit is configured to receive a signal for charging the battery via the booster antenna.

21. The power storage device according to claim 3, further comprising a booster antenna, wherein the antenna circuit is configured to receive a signal for charging the battery via the booster antenna.

22. The power storage device according to claim 4, further comprising a booster antenna, wherein the antenna circuit is configured to receive a signal for charging the battery via the booster antenna.

23. The power storage device according to claim 1, wherein the antenna circuit includes a plurality of antennas.

24. The power storage device according to claim 2, wherein the antenna circuit includes a plurality of antennas.

25. The power storage device according to claim 3, wherein the antenna circuit includes a plurality of antennas.

26. The power storage device according to claim 4, wherein the antenna circuit includes a plurality of antennas.

27. The power storage device according to claim 1, wherein the low-frequency-signal generating circuit is is configured to generate a signal to be output to the switch circuit by dividing a frequency of a generated clock signal.

28. The power storage device according to claim 2, wherein the low-frequency-signal generating circuit is is configured to generate a signal to be output to the switch circuit by dividing a frequency of a generated clock signal.

29. The power storage device according to claim 3, wherein the low-frequency-signal generating circuit is is configured to generate a signal to be output to the switch circuit by dividing a frequency of a generated clock signal.

30. The power storage device according to claim 4, wherein the low-frequency-signal generating circuit is is configured to generate a signal to be output to the switch circuit by dividing a frequency of a generated clock signal.

31. The power storage device according to claim 1, wherein the power storage device is applied to an electronic device selected from the group consisting of a digital video camera, a computer, a portable information terminal and an image reproducing device provided with recording media; an IC label, an IC tag, or an IC card which are attached to a bill, a coin, a security, a bearer bond, a certificate, a packaging container, a recording media, means of transportation, personal belongings, foods, plants, animals, human bodies, clothes, daily articles or electronic devices.

32. The power storage device according to claim 2, wherein the power storage device is applied to an electronic device selected from the group consisting of a digital video camera, a computer, a portable information terminal and an image reproducing device provided with recording media; an IC label, an IC tag, or an IC card which are attached to a bill, a coin, a security, a bearer bond, a certificate, a packaging container, a recording media, means of transportation, personal belongings, foods, plants, animals, human bodies, clothes, daily articles or electronic devices.

33. The power storage device according to claim 3, wherein the power storage device is applied to an electronic device selected from the group consisting of a digital video camera, a computer, a portable information terminal and an image reproducing device provided with recording media; an IC label, an IC tag, or an IC card which are attached to a bill, a coin, a security, a bearer bond, a certificate, a packaging container, a recording media, means of transportation, personal belongings, foods, plants, animals, human bodies, clothes, daily articles or electronic devices.

34. The power storage device according to claim 4, wherein the power storage device is applied to an electronic device selected from the group consisting of a digital video camera, a computer, a portable information terminal and an image reproducing device provided with recording media; an IC label, an IC tag, or an IC card which are attached to a bill, a coin, a security, a bearer bond, a certificate, a packaging container, a recording media, means of transportation, personal belongings, foods, plants, animals, human bodies, clothes, daily articles or electronic devices.

* * * * *